US009616562B2

(12) United States Patent
Hoppe et al.

(10) Patent No.: US 9,616,562 B2
(45) Date of Patent: Apr. 11, 2017

(54) TOOL STORAGE DEVICES

(71) Applicant: Milwaukee Electric Tool Corporation, Brookfield, WI (US)

(72) Inventors: Christopher S. Hoppe, Milwaukee, WI (US); Steven W. Hyma, Milwaukee, WI (US); Grant T. Squiers, Cudahy, WI (US); Michael Stearns, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 14/802,539

(22) Filed: Jul. 17, 2015

(65) Prior Publication Data
US 2016/0023349 A1 Jan. 28, 2016

Related U.S. Application Data

(60) Provisional application No. 62/027,566, filed on Jul. 22, 2014, provisional application No. 62/068,415, (Continued)

(51) Int. Cl.
*A45C 5/14* (2006.01)
*B25H 3/02* (2006.01)
(Continued)

(52) U.S. Cl.
CPC ............... *B25H 3/02* (2013.01); *A45C 5/14* (2013.01); *A45C 7/0045* (2013.01);
(Continued)

(58) Field of Classification Search
CPC ....... A45C 5/14; A45C 7/0018; A45C 13/262; A45C 13/267
See application file for complete search history.

(56) References Cited

U.S. PATENT DOCUMENTS 1,275,862 A 8/1918 Danz
2,042,387 A 5/1936 Cobb
(Continued)

FOREIGN PATENT DOCUMENTS

EP 0195651 9/1986
EP 0517803 10/1996
(Continued)

OTHER PUBLICATIONS

Chinese Patent Office Action for Application No. 201520524586.1 dated Mar. 18, 2016 (2 pages).
(Continued)

*Primary Examiner* — Hau Phan
*Assistant Examiner* — Jacob Meyer
(74) *Attorney, Agent, or Firm* — Michael Best & Friedrich LLP

(57) ABSTRACT

Tool storage devices. A tool storage device may include a handle assembly including a support arm connected between a body and a handle portion and having a substantially rectangular cross section oriented with first walls extending transverse to the axis having a greater width than second walls extending parallel to the axis. A width of the handle portion may be at least about 50% of a width of the body. The body may include a frame assembly formed of a rigid material, a wall formed of a flexible material and at least partially defining the storage compartment with an open top, and a cover formed of a rigid material connected to the frame assembly to selectively close the open top. A wheel well portion receives each wheel and may cover the width of the wheel and a portion of the circumference of the wheel. A radial clearance between the wheel and a lower end of the wheel well may be no more than about 0.5 inches.

21 Claims, 58 Drawing Sheets

Related U.S. Application Data filed on Oct. 24, 2014, provisional application No. 62/079,190, filed on Nov. 13, 2014.

(51) Int. Cl.

| | | |
|---|---|---|
| *A45C 13/00* | (2006.01) | |
| *A45C 13/26* | (2006.01) | |
| *B62B 1/12* | (2006.01) | |
| *A45C 7/00* | (2006.01) | |
| *A45C 13/02* | (2006.01) | |
| *A45C 13/36* | (2006.01) | |
| *A45C 13/30* | (2006.01) | |
| *A45F 3/14* | (2006.01) | |

(52) U.S. Cl.
CPC .......... *A45C 7/0086* (2013.01); *A45C 13/005* (2013.01); *A45C 13/02* (2013.01); *A45C 13/262* (2013.01); *A45C 13/36* (2013.01); *B62B 1/125* (2013.01); *A45C 2013/026* (2013.01); *A45C 2013/267* (2013.01); *A45C 2013/306* (2013.01); *A45F 2003/146* (2013.01); *A45F 2200/0575* (2013.01)

(56) References Cited

U.S. PATENT DOCUMENTS

| | | |
|---|---|---|
| 2,125,856 A | 8/1938 | De Witt |
| 2,145,143 A | 1/1939 | Trecartin |
| 2,463,713 A | 3/1949 | Partiot |
| 2,799,306 A | 7/1957 | Martin |
| 2,826,426 A | 3/1958 | Vaughn |
| 2,883,184 A | 4/1959 | Brewington |
| 3,177,023 A | 4/1965 | Nuckols |
| 3,259,411 A | 7/1966 | Griffiths |
| 3,394,955 A | 7/1968 | Martin |
| 3,446,304 A | 5/1969 | Alimanestiano |
| 3,606,372 A | 9/1971 | Browning |
| 3,817,419 A | 6/1974 | Moller et al. |
| 3,842,953 A | 10/1974 | Royet |
| 3,851,756 A | 12/1974 | Brown |
| 3,924,844 A | 12/1975 | Bachtel, Jr. |
| 3,948,365 A | 4/1976 | Gregg et al. |
| 3,989,128 A | 11/1976 | Walker |
| 3,997,038 A | 12/1976 | Walker |
| 4,036,336 A | 7/1977 | Burtley |
| 4,062,429 A | 12/1977 | Tabor et al. |
| 4,087,102 A | 5/1978 | Sprague |
| 4,105,112 A | 8/1978 | Graf |
| 4,222,580 A | 9/1980 | Krokonko |
| 4,228,877 A | 10/1980 | Cothary |
| D258,705 S | 3/1981 | Wheeler |
| 4,254,850 A | 3/1981 | Knowles |
| 4,261,447 A | 4/1981 | Arias et al. |
| D259,154 S | 5/1981 | White, Jr. et al. |
| 4,278,187 A | 7/1981 | Luedtke |
| 4,288,134 A | 9/1981 | Knaack et al. |
| 4,353,182 A | 10/1982 | Junkas et al. |
| D272,203 S | 1/1984 | Di Bartolo |
| 4,561,526 A | 12/1985 | Winter et al. |
| 4,566,616 A | 1/1986 | Rise |
| 4,575,109 A | 3/1986 | Cowdery |
| 4,588,055 A | 5/1986 | Chen |
| 4,630,837 A | 12/1986 | Kazmark |
| 4,846,493 A | 7/1989 | Mason |
| 4,852,705 A | 8/1989 | Cowan, Jr. |
| 4,890,414 A | 1/1990 | Bridenthal et al. |
| 4,923,105 A | 5/1990 | Snyder |
| D309,981 S | 8/1990 | French et al. |
| D316,485 S | 4/1991 | Seber |
| 5,035,523 A | 7/1991 | Allinder |
| 5,042,193 A | 8/1991 | Steiner |
| 5,048,649 A | 9/1991 | Carpenter et al. |
| 5,108,119 A | 4/1992 | Huang |
| 5,116,289 A | 5/1992 | Pond et al. |
| D326,815 S | 6/1992 | Meisner et al. |
| 5,147,019 A | 9/1992 | Van Hooreweder et al. |
| 5,165,148 A | 11/1992 | Fleischer et al. |
| 5,167,306 A | 12/1992 | Carrigan, Jr. |
| 5,167,354 A | 12/1992 | Cohanfard |
| D333,215 S | 2/1993 | Brown |
| D333,487 S | 2/1993 | Papp |
| 5,184,477 A | 2/1993 | Brown et al. |
| 5,207,440 A | 5/1993 | Liang |
| 5,209,327 A | 5/1993 | Wright et al. |
| 5,228,609 A | 7/1993 | Gregory |
| 5,228,706 A | 7/1993 | Boville |
| 5,249,438 A * | 10/1993 | Rhaney .................... A45C 5/14 16/113.1 |
| 5,295,742 A | 3/1994 | Knutson |
| 5,310,079 A | 5/1994 | Sandy et al. |
| 5,316,096 A | 5/1994 | Good |
| D347,731 S | 6/1994 | Hayakawa et al. |
| 5,323,886 A | 6/1994 | Chen |
| 5,323,887 A | 6/1994 | Scicluna et al. |
| 5,330,141 A | 7/1994 | Kim |
| 5,358,082 A | 10/1994 | Armstrong, IV |
| 5,368,143 A | 11/1994 | Pond et al. |
| 5,377,795 A | 1/1995 | Berman |
| 5,379,887 A | 1/1995 | Conley, Jr. |
| D355,849 S | 2/1995 | Trower et al. |
| 5,386,907 A | 2/1995 | Kahl et al. |
| 5,394,965 A | 3/1995 | Kho |
| 5,396,974 A | 3/1995 | Pedlar |
| 5,429,287 A | 7/1995 | Frano |
| 5,431,262 A | 7/1995 | Rekuc et al. |
| 5,435,423 A | 7/1995 | Rekuc et al. |
| 5,447,216 A | 9/1995 | Freyvogel |
| 5,447,261 A | 9/1995 | Mitomi et al. |
| 5,452,778 A | 9/1995 | Wang |
| 5,469,944 A | 11/1995 | Wang |
| 5,470,000 A | 11/1995 | Muñoz |
| 5,474,162 A | 12/1995 | Shyr et al. |
| 5,482,147 A | 1/1996 | Wang |
| D368,159 S | 3/1996 | Calmeise et al. |
| 5,498,010 A | 3/1996 | Stube |
| 5,499,702 A | 3/1996 | Wang |
| 5,501,308 A | 3/1996 | King |
| 5,501,379 A | 3/1996 | Muñoz |
| 5,511,682 A * | 4/1996 | Pace ........................ B65F 1/06 220/230 |
| 5,513,066 A | 4/1996 | Berman |
| 5,518,139 A | 5/1996 | Trower et al. |
| D370,619 S | 6/1996 | Hall et al. |
| 5,524,737 A | 6/1996 | Wang |
| 5,524,920 A | 6/1996 | Tsai |
| 5,528,453 A | 6/1996 | Berman et al. |
| 5,529,230 A | 6/1996 | Smith |
| 5,529,322 A | 6/1996 | Barton |
| 5,542,510 A | 8/1996 | Rekuc et al. |
| 5,553,692 A | 9/1996 | Sheiman |
| D374,772 S | 10/1996 | Hotaling et al. |
| 5,560,458 A | 10/1996 | Franklin et al. |
| 5,560,459 A | 10/1996 | Lin |
| 5,562,208 A | 10/1996 | Hasler et al. |
| 5,564,538 A | 10/1996 | Sadow |
| 5,564,805 A | 10/1996 | Dickinson |
| 5,568,848 A | 10/1996 | Liang |
| D375,834 S | 11/1996 | Meisner et al. |
| 5,570,824 A | 11/1996 | Lyon et al. |
| 5,575,391 A | 11/1996 | Gerch |
| 5,579,877 A | 12/1996 | Homayoon |
| 5,580,137 A | 12/1996 | Doan et al. |
| 5,588,569 A | 12/1996 | Mitomi et al. |
| D377,118 S | 1/1997 | Carbone et al. |
| 5,593,009 A | 1/1997 | King |
| 5,595,228 A | 1/1997 | Meisner et al. |
| 5,605,263 A | 2/1997 | Pursley et al. |
| D378,247 S | 3/1997 | Meisner et al. |
| 5,609,278 A | 3/1997 | Fresco |
| 5,620,212 A | 4/1997 | Bourne et al. |
| 5,630,488 A | 5/1997 | Chen |
| 5,639,003 A | 6/1997 | Utzinger, III |
| 5,641,170 A | 6/1997 | Helm |

(56) References Cited

U.S. PATENT DOCUMENTS

| | | |
|---|---|---|
| 5,645,146 A | 7/1997 | Bieber et al. |
| 5,653,337 A | 8/1997 | Cirigliano |
| 5,660,276 A | 8/1997 | Winnard |
| 5,667,172 A | 9/1997 | Kim |
| 5,671,832 A | 9/1997 | London et al. |
| 5,672,145 A | 9/1997 | Pollington et al. |
| D385,110 S | 10/1997 | Yemini |
| 5,678,666 A | 10/1997 | Shyr et al. |
| 5,685,402 A | 11/1997 | Lin |
| D386,903 S | 12/1997 | Curry et al. |
| 5,709,008 A | 1/1998 | Dickinson |
| D390,358 S | 2/1998 | Calmeise |
| 5,715,759 A | 2/1998 | Lee |
| 5,732,987 A | 3/1998 | Wright et al. |
| 5,755,311 A | 5/1998 | Younessian et al. |
| 5,762,170 A * | 6/1998 | Shyr ............... A45C 5/14 190/109 |
| 5,762,411 A | 6/1998 | Yemini |
| 5,788,032 A | 8/1998 | Krulik |
| 5,788,260 A | 8/1998 | Huang |
| 5,810,132 A | 9/1998 | Chang |
| 5,819,892 A | 10/1998 | Deliman et al. |
| 5,833,039 A | 11/1998 | Kotkins, Jr. |
| 5,833,095 A | 11/1998 | Russell et al. |
| 5,836,497 A | 11/1998 | Pelish |
| D402,106 S | 12/1998 | Buckingham et al. |
| 5,862,898 A | 1/1999 | Chang |
| D405,956 S | 2/1999 | Meisner et al. |
| 5,865,281 A | 2/1999 | Wang |
| 5,890,570 A | 4/1999 | Sadow |
| 5,893,495 A | 4/1999 | Godshaw et al. |
| 5,915,553 A | 6/1999 | Brown et al. |
| 5,915,554 A | 6/1999 | Hung |
| 5,924,533 A | 7/1999 | Cnockaert et al. |
| 5,927,837 A | 7/1999 | Schmidt |
| 5,934,425 A | 8/1999 | Sadow |
| 5,941,437 A | 8/1999 | Okumura |
| 5,943,936 A | 8/1999 | Deliman et al. |
| D414,038 S | 9/1999 | van Rhienen |
| 5,967,270 A | 10/1999 | Shyr |
| 5,971,101 A | 10/1999 | Taggart |
| 5,992,588 A | 11/1999 | Morszeck |
| 5,997,116 A | 12/1999 | Schmidt |
| 6,006,906 A | 12/1999 | Winnard |
| D418,977 S | 1/2000 | Streich |
| 6,015,064 A | 1/2000 | Liu |
| 6,038,747 A | 3/2000 | Hamilton et al. |
| 6,050,374 A | 4/2000 | Johnston |
| 6,062,357 A | 5/2000 | Bogert |
| 6,073,766 A | 6/2000 | Winnard |
| 6,073,944 A | 6/2000 | Moore |
| 6,076,666 A | 6/2000 | Santa-Maria |
| 6,081,695 A | 6/2000 | Wallace et al. |
| 6,082,538 A | 7/2000 | Snider et al. |
| 6,098,768 A | 8/2000 | Tsai |
| 6,102,172 A | 8/2000 | Dercole |
| 6,109,403 A | 8/2000 | Godshaw |
| 6,129,254 A | 10/2000 | Yu |
| 6,167,680 B1 | 1/2001 | Horn |
| 6,167,994 B1 | 1/2001 | Kuo et al. |
| 6,176,559 B1 * | 1/2001 | Tiramani ............... B25H 3/023 280/47.19 |
| 6,179,185 B1 | 1/2001 | Dancyger |
| D437,684 S | 2/2001 | Streich et al. |
| 6,182,981 B1 | 2/2001 | Kuo |
| 6,186,295 B1 | 2/2001 | Lin et al. |
| 6,203,075 B1 | 3/2001 | Wells, Jr. et al. |
| 6,206,063 B1 | 3/2001 | Lin |
| 6,213,296 B1 | 4/2001 | Streich et al. |
| 6,227,339 B1 | 5/2001 | Bogert |
| 6,230,887 B1 | 5/2001 | Snider |
| 6,244,485 B1 | 6/2001 | Holland et al. |
| 6,244,486 B1 | 6/2001 | Holland et al. |
| D447,340 S | 9/2001 | Snider |
| D447,630 S | 9/2001 | Snider |
| D448,162 S | 9/2001 | Snider |
| 6,289,554 B1 | 9/2001 | Wang |
| D449,442 S | 10/2001 | Snider |
| D449,738 S | 10/2001 | Snider et al. |
| 6,301,746 B1 | 10/2001 | Myers et al. |
| 6,305,514 B1 | 10/2001 | Lin et al. |
| 6,318,713 B1 | 11/2001 | Levi |
| D451,275 S | 12/2001 | Snider et al. |
| D452,071 S | 12/2001 | Snider |
| 6,328,320 B1 | 12/2001 | Walski et al. |
| D453,624 S | 2/2002 | Itzkovitch |
| 6,343,708 B1 | 2/2002 | Riso |
| 6,343,815 B1 | 2/2002 | Poe |
| 6,347,847 B1 * | 2/2002 | Tiramani ............... B25H 3/00 190/18 A |
| 6,357,567 B1 | 3/2002 | Tsai |
| D455,263 S | 4/2002 | Schoen et al. |
| 6,367,603 B1 | 4/2002 | Tiramani et al. |
| 6,371,320 B2 | 4/2002 | Sagol |
| 6,371,346 B1 | 4/2002 | Sharma |
| 6,390,348 B1 | 5/2002 | Godshaw et al. |
| D459,073 S | 6/2002 | Lee |
| 6,405,864 B1 | 6/2002 | Streich et al. |
| 6,408,996 B1 | 6/2002 | Lin |
| 6,415,924 B1 | 7/2002 | Lee |
| 6,435,389 B1 | 8/2002 | Sucher |
| D462,168 S | 9/2002 | Klemmensen et al. |
| 6,443,274 B1 | 9/2002 | Klamm |
| 6,446,988 B1 * | 9/2002 | Kho ............... A45C 5/14 16/405 |
| 6,460,668 B1 | 10/2002 | Godshaw et al. |
| 6,471,019 B1 | 10/2002 | Miller |
| D465,923 S | 11/2002 | Pangerc et al. |
| 6,474,665 B1 | 11/2002 | Fink et al. |
| 6,478,463 B2 | 11/2002 | Snider |
| 6,484,362 B1 | 11/2002 | Kuo |
| D467,070 S | 12/2002 | Snider et al. |
| 6,502,882 B2 | 1/2003 | Snider et al. |
| 6,505,843 B1 | 1/2003 | Williams |
| D470,659 S | 2/2003 | Story et al. |
| 6,520,514 B2 | 2/2003 | Clegg |
| D471,360 S | 3/2003 | Huang |
| 6,527,309 B1 | 3/2003 | Gaydos et al. |
| 6,530,507 B2 | 3/2003 | Oh |
| 6,533,138 B2 | 3/2003 | Chwen-Ru |
| D472,385 S | 4/2003 | Bauer |
| D472,774 S | 4/2003 | Pelstring et al. |
| 6,550,651 B1 | 4/2003 | Murdoch et al. |
| 6,561,327 B1 | 5/2003 | Godshaw |
| 6,561,402 B2 | 5/2003 | Holland et al. |
| 6,571,998 B2 | 6/2003 | Godshaw et al. |
| 6,578,708 B2 | 6/2003 | Barnett |
| 6,595,334 B1 | 7/2003 | Saetia |
| 6,614,337 B1 | 9/2003 | Winnard |
| 6,622,856 B2 | 9/2003 | Gallo et al. |
| D480,867 S | 10/2003 | Snider et al. |
| 6,637,562 B2 | 10/2003 | Oh |
| 6,666,363 B2 | 12/2003 | Godshaw et al. |
| 6,675,965 B2 | 1/2004 | Holland et al. |
| 6,675,967 B2 | 1/2004 | Huang |
| 6,688,614 B2 | 2/2004 | Hsu |
| 6,692,011 B2 | 2/2004 | Carlson et al. |
| 6,695,142 B2 | 2/2004 | Chen et al. |
| 6,698,609 B2 | 3/2004 | Pangerc et al. |
| 6,722,524 B1 | 4/2004 | Huang et al. |
| 6,736,265 B2 * | 5/2004 | Kipper ............... B25H 3/023 206/373 |
| 6,739,150 B2 | 5/2004 | Mompo Garcia |
| 6,742,684 B2 | 6/2004 | Oh |
| 6,755,302 B1 | 6/2004 | Streich et al. |
| 6,755,448 B2 | 6/2004 | Jackson et al. |
| 6,758,534 B2 | 7/2004 | Lampugnani |
| 6,761,366 B1 | 7/2004 | Klemmensen et al. |
| 6,789,670 B2 | 9/2004 | Cooper et al. |
| 6,820,878 B2 | 11/2004 | Safari et al. |
| 6,840,359 B2 | 1/2005 | Godshaw |
| 6,860,059 B1 | 3/2005 | Hoover |
| D505,548 S | 5/2005 | Yang |
| 6,910,560 B2 | 6/2005 | Dulin |

(56) References Cited

U.S. PATENT DOCUMENTS

| | | |
|---|---|---|
| 6,915,902 B2 | 7/2005 | Brouard |
| 6,923,352 B2 | 8/2005 | Oh |
| 6,926,129 B2 | 8/2005 | Hoberman |
| D509,656 S | 9/2005 | Pangerc et al. |
| 6,938,740 B2 | 9/2005 | Gandy |
| 6,938,741 B2 | 9/2005 | Hsien et al. |
| 6,948,724 B2 | 9/2005 | Davis |
| 6,955,381 B2 | 10/2005 | Parker et al. |
| 6,976,566 B1 | 12/2005 | Skriloff |
| 6,978,890 B2 | 12/2005 | Pangerc et al. |
| 7,004,481 B1 | 2/2006 | Stanish |
| D516,310 S | 3/2006 | Brunson et al. |
| D516,808 S | 3/2006 | Brunson et al. |
| D516,812 S | 3/2006 | Pangerc et al. |
| 7,008,031 B2 | 3/2006 | Doerflinger et al. |
| 7,021,637 B2 | 4/2006 | Snider et al. |
| D520,746 S | 5/2006 | Meyer et al. |
| 7,036,641 B2 | 5/2006 | Russo et al. |
| 7,048,133 B2 | 5/2006 | Pangerc et al. |
| 7,066,311 B2 | 6/2006 | O'Shea |
| 7,073,694 B2 | 7/2006 | King et al. |
| 7,104,555 B1 | 9/2006 | Davis |
| 7,108,131 B2 | 9/2006 | Dreher et al. |
| 7,111,853 B2 | 9/2006 | Tracewell et al. |
| 7,117,991 B2 | 10/2006 | Waring |
| 7,121,407 B2 | 10/2006 | Hurt et al. |
| 7,144,020 B2 | 12/2006 | Huguet |
| 7,147,089 B2 | 12/2006 | Godshaw et al. |
| 7,158,376 B2 | 1/2007 | Richardson et al. |
| 7,168,713 B2 | 1/2007 | Udall et al. |
| 7,201,243 B2 | 4/2007 | Konstant |
| 7,225,923 B2 | 6/2007 | Hallee et al. |
| 7,228,983 B2 | 6/2007 | Pangerc et al. |
| 7,237,673 B2 | 7/2007 | Wikle et al. |
| 7,237,688 B2 | 7/2007 | Pangerc et al. |
| 7,240,909 B2 | 7/2007 | Robens |
| 7,246,704 B2 | 7/2007 | Brunson et al. |
| 7,270,223 B2 | 9/2007 | Miller |
| 7,296,808 B2 | 11/2007 | Huguet |
| 7,316,309 B2 | 1/2008 | Streich et al. |
| 7,318,542 B2 | 1/2008 | Godshaw et al. |
| 7,322,470 B2 | 1/2008 | Brunson |
| 7,322,583 B2 | 1/2008 | Kim et al. |
| 7,326,428 B2 | 2/2008 | Weir |
| 7,331,454 B2 * | 2/2008 | Godshaw ............ A45C 5/14 190/117 |
| 7,334,680 B2 | 2/2008 | Cunningham et al. |
| D563,669 S | 3/2008 | Bosak et al. |
| 7,357,250 B2 | 4/2008 | Hagemann et al. |
| 7,357,268 B2 | 4/2008 | Yang |
| 7,367,451 B2 | 5/2008 | Pendergraph et al. |
| 7,370,891 B1 | 5/2008 | Schmitt et al. |
| 7,374,183 B1 * | 5/2008 | Yen-Lung ............ A45C 13/262 280/37 |
| 7,387,304 B1 | 6/2008 | Rich et al. |
| 7,387,305 B2 | 6/2008 | Vanderberg et al. |
| 7,387,350 B2 | 6/2008 | Killinger et al. |
| 7,389,997 B2 | 6/2008 | Johnson et al. |
| D572,479 S | 7/2008 | Buck et al. |
| D572,480 S | 7/2008 | Buck et al. |
| 7,401,698 B2 | 7/2008 | Dost et al. |
| 7,401,700 B2 | 7/2008 | Dost et al. |
| 7,416,066 B2 | 8/2008 | Chernoff |
| 7,418,846 B2 | 9/2008 | James et al. |
| 7,438,084 B2 | 10/2008 | Trettin et al. |
| 7,438,308 B2 | 10/2008 | Kim et al. |
| 7,458,601 B2 | 12/2008 | Miller et al. |
| 7,461,730 B2 | 12/2008 | Costa et al. |
| 7,467,695 B2 | 12/2008 | Gormick et al. |
| 7,478,711 B2 | 1/2009 | Liang |
| D588,811 S | 3/2009 | Wenchel et al. |
| 7,500,547 B2 | 3/2009 | Bettua et al. |
| 7,503,439 B2 | 3/2009 | O'Shea et al. |
| 7,503,440 B2 | 3/2009 | Gormick et al. |
| 7,503,569 B2 | 3/2009 | Duvigneau |
| D589,703 S | 4/2009 | Wenchel et al. |
| 7,516,502 B1 | 4/2009 | Larson et al. |
| 7,540,364 B2 * | 6/2009 | Sanderson ......... A45C 13/1084 190/119 |
| 7,552,560 B2 | 6/2009 | Hoover |
| 7,552,950 B2 | 6/2009 | Scheffy et al. |
| 7,571,915 B1 | 8/2009 | Simmons |
| D599,112 S | 9/2009 | Wenchel et al. |
| D600,015 S | 9/2009 | Wenchel et al. |
| D600,912 S | 9/2009 | Brunner |
| 7,581,736 B1 | 9/2009 | Garza, Jr. |
| 7,591,627 B2 | 9/2009 | Westover |
| 7,594,569 B2 | 9/2009 | Bass et al. |
| D601,797 S | 10/2009 | Wenchel et al. |
| 7,597,341 B2 | 10/2009 | Russo |
| 7,600,618 B2 | 10/2009 | Fenton et al. |
| 7,600,640 B2 | 10/2009 | Hallee et al. |
| D605,403 S | 12/2009 | Santamarina et al. |
| 7,631,380 B1 | 12/2009 | Larson |
| D608,094 S | 1/2010 | Concari et al. |
| D609,911 S | 2/2010 | Twig |
| D609,913 S | 2/2010 | Landau |
| 7,661,530 B1 | 2/2010 | Hewitt |
| 7,661,683 B2 | 2/2010 | Fernandez |
| D616,200 S | 5/2010 | Riedel et al. |
| D618,911 S | 7/2010 | Brunner |
| D621,153 S | 8/2010 | Parsley et al. |
| D621,610 S | 8/2010 | Parsley et al. |
| 7,780,051 B2 | 8/2010 | Godshaw et al. |
| D624,317 S | 9/2010 | Wenchel et al. |
| D625,515 S | 10/2010 | Parsley et al. |
| D625,915 S | 10/2010 | Parsley et al. |
| D627,968 S | 11/2010 | Brunner |
| 7,823,991 B2 | 11/2010 | Purdy |
| 7,837,053 B2 | 11/2010 | Arnett et al. |
| 7,837,206 B1 | 11/2010 | Lee |
| D629,607 S | 12/2010 | Sabbag et al. |
| 7,845,653 B2 | 12/2010 | Katz |
| 7,850,020 B2 | 12/2010 | Konsant |
| 7,854,321 B2 | 12/2010 | Twig et al. |
| D630,435 S | 1/2011 | Brunner |
| D630,851 S | 1/2011 | Landau et al. |
| 7,874,328 B2 | 1/2011 | Dancyger |
| 7,883,096 B2 | 2/2011 | Katz et al. |
| D635,769 S | 4/2011 | Sosnovsky |
| D636,996 S | 5/2011 | Kokawa et al. |
| D637,812 S | 5/2011 | Horiyama et al. |
| 7,938,412 B2 | 5/2011 | Katz |
| 7,946,609 B2 | 5/2011 | Johnson et al. |
| D639,554 S | 6/2011 | Sosnovsky et al. |
| D641,552 S | 7/2011 | Sosnovsky |
| 7,984,820 B2 | 7/2011 | Dancyger |
| 7,997,591 B2 * | 8/2011 | Arthur ............... B62B 1/22 280/35 |
| D647,301 S | 10/2011 | Sosnovsky |
| 8,037,983 B2 | 10/2011 | Leung |
| D648,532 S | 11/2011 | Sosnovsky |
| D648,533 S | 11/2011 | Sosnovsky |
| D649,350 S | 11/2011 | Shitrit |
| 8,056,919 B1 | 11/2011 | Huston et al. |
| 8,056,943 B2 | 11/2011 | Scheffy et al. |
| 8,061,536 B2 | 11/2011 | Lin et al. |
| D649,783 S | 12/2011 | Brunner |
| 8,087,513 B2 | 1/2012 | Kriesel |
| 8,123,007 B2 | 2/2012 | Murdoch et al. |
| 8,123,068 B2 | 2/2012 | Sturrock |
| 8,132,289 B2 | 3/2012 | Hahn |
| 8,132,819 B2 * | 3/2012 | Landau ............... B25H 3/028 280/47.131 |
| 8,152,037 B2 | 4/2012 | Sabbag |
| D661,858 S | 6/2012 | Lifshitz et al. |
| D661,903 S | 6/2012 | Kokawa et al. |
| 8,191,910 B2 | 6/2012 | Landau et al. |
| D664,354 S | 7/2012 | Crevling, Jr. et al. |
| 8,210,387 B2 | 7/2012 | Twig et al. |
| 8,256,591 B2 | 9/2012 | Majeau |
| 8,262,106 B1 | 9/2012 | Suszynsky |
| 8,267,230 B2 | 9/2012 | Johnson |
| 8,267,245 B2 | 9/2012 | Kotula et al. |

(56) References Cited

U.S. PATENT DOCUMENTS

| | | |
|---|---|---|
| 8,267,247 B1 | 9/2012 | Horiyama |
| 8,272,628 B2 | 9/2012 | Winnard |
| D668,867 S | 10/2012 | Yamamot |
| D668,868 S | 10/2012 | Lehovetzki |
| D668,869 S | 10/2012 | Yamamoto et al. |
| 8,282,113 B2 | 10/2012 | Veal et al. |
| D670,500 S | 11/2012 | Sosnovsky |
| D672,555 S | 12/2012 | Shitrit |
| 8,327,576 B2 | 12/2012 | Sellers |
| 8,328,247 B2 | 12/2012 | Tonelli |
| 8,328,530 B2 | 12/2012 | Fronzoni |
| D673,774 S | 1/2013 | Neuhaus et al. |
| 8,342,543 B2 | 1/2013 | Fernandez |
| 8,365,886 B2 | 2/2013 | Mehta |
| 8,376,177 B2 | 2/2013 | Castner et al. |
| 8,434,617 B1 | 5/2013 | Wang |
| 8,439,174 B1 | 5/2013 | Miranda |
| 8,469,195 B2 | 6/2013 | Gosselink et al. |
| 8,505,729 B2 | 8/2013 | Sosnovsky et al. |
| 8,517,155 B2 | 8/2013 | Tong |
| 8,517,400 B2 | 8/2013 | Kim |
| 8,534,434 B2 * | 9/2013 | Crull ............... A45C 13/26 16/113.1 |
| 8,567,796 B2 | 10/2013 | Bar-Erez et al. |
| 8,657,307 B2 * | 2/2014 | Lifshitz ............ B25H 3/028 280/47.17 |
| 8,662,268 B2 | 3/2014 | Keir |
| D701,696 S | 4/2014 | Shitrit et al. |
| 8,695,770 B2 | 4/2014 | Santy |
| 8,708,351 B2 * | 4/2014 | Kinskey ............ B25H 3/022 190/124 |
| 8,752,683 B2 | 6/2014 | Scicluna |
| 8,844,689 B2 | 9/2014 | Murdoch et al. |
| 8,851,282 B2 | 10/2014 | Brunner |
| 8,869,960 B2 | 10/2014 | Mangano |
| 8,888,111 B2 | 11/2014 | Udall et al. |
| 8,919,896 B1 | 12/2014 | Shewchuck |
| 8,936,140 B2 | 1/2015 | Herold |
| 8,936,258 B2 | 1/2015 | Bar-Erez et al. |
| 8,960,959 B2 * | 2/2015 | Chen ............... A45C 13/26 16/113.1 |
| 8,979,073 B2 | 3/2015 | Lykins et al. |
| 8,979,100 B2 * | 3/2015 | Bensman ............ B62B 5/00 280/47.18 |
| 9,060,577 B2 | 6/2015 | Farrelly et al. |
| 9,066,565 B2 | 6/2015 | Farrelly |
| 9,067,614 B2 | 6/2015 | Vanderberg et al. |
| 9,095,193 B1 | 8/2015 | Al-Hashemi et al. |
| D744,750 S | 12/2015 | Sabbag et al. |
| 9,260,129 B2 * | 2/2016 | Thompson ........... B62B 19/04 |
| D750,890 S | 3/2016 | Quehl |
| 9,295,313 B2 * | 3/2016 | Kinskey ............ A45C 5/14 |
| 2001/0022257 A1 | 9/2001 | Sadow |
| 2002/0008125 A1 | 1/2002 | Caputi |
| 2002/0014507 A1 | 2/2002 | Snider et al. |
| 2002/0017752 A1 | 2/2002 | Levi |
| 2002/0043534 A1 | 4/2002 | Uke |
| 2002/0074332 A1 | 6/2002 | Sagol |
| 2002/0084159 A1 | 7/2002 | Hamlin |
| 2002/0125160 A1 | 9/2002 | Itzkovitch |
| 2002/0162716 A1 | 11/2002 | Fabritz |
| 2002/0163284 A1 * | 11/2002 | Levy ............... B25H 3/00 312/302 |
| 2003/0034636 A1 | 2/2003 | Ng |
| 2003/0042091 A1 | 3/2003 | Oh |
| 2003/0042093 A1 | 3/2003 | Godshaw et al. |
| 2003/0075468 A1 | 4/2003 | Story et al. |
| 2003/0132080 A1 | 7/2003 | Dababneh |
| 2003/0151218 A1 | 8/2003 | Swaffield |
| 2004/0004332 A1 | 1/2004 | Tsai |
| 2004/0026199 A1 | 2/2004 | Chen |
| 2004/0026294 A1 | 2/2004 | Platte, III |
| 2004/0036240 A1 | 2/2004 | Chen |
| 2004/0108179 A1 | 6/2004 | Scicluna et al. |
| 2004/0112777 A1 | 6/2004 | Huang |
| 2004/0144606 A1 | 7/2004 | Han |
| 2004/0154889 A1 | 8/2004 | Gifford et al. |
| 2004/0163910 A1 | 8/2004 | Lee |
| 2004/0188201 A1 | 9/2004 | Chuo |
| 2004/0188205 A1 | 9/2004 | Badaan |
| 2004/0195791 A1 | 10/2004 | Brookes-Inglis |
| 2004/0206431 A1 | 10/2004 | Metzig et al. |
| 2004/0245735 A1 | 12/2004 | Pins |
| 2005/0023096 A1 | 2/2005 | Tiramani |
| 2005/0056511 A1 | 3/2005 | Hsieh |
| 2005/0109650 A1 | 5/2005 | Huang |
| 2005/0121275 A1 | 6/2005 | Platte, III |
| 2005/0121868 A1 | 6/2005 | Hartman et al. |
| 2005/0194756 A1 | 9/2005 | Farley |
| 2005/0224305 A1 | 10/2005 | Davis |
| 2005/0279123 A1 * | 12/2005 | Maldonado ............ A45C 5/02 62/457.7 |
| 2006/0017293 A1 | 1/2006 | Tonelli |
| 2006/0124505 A1 | 6/2006 | Hanson |
| 2006/0144732 A1 | 7/2006 | Kaplan et al. |
| 2006/0151967 A1 | 7/2006 | Conway et al. |
| 2006/0196744 A1 | 9/2006 | Greiner |
| 2006/0201834 A1 | 9/2006 | Lutz |
| 2006/0213735 A1 | 9/2006 | Weinstein et al. |
| 2007/0045370 A1 | 3/2007 | Hsieh |
| 2007/0045974 A1 | 3/2007 | Young |
| 2007/0051765 A1 | 3/2007 | Hsieh |
| 2007/0074941 A1 | 4/2007 | Liang |
| 2007/0137960 A1 | 6/2007 | Redzisz |
| 2007/0164064 A1 | 7/2007 | Nathan |
| 2007/0170671 A1 | 7/2007 | Safari et al. |
| 2007/0194543 A1 * | 8/2007 | Duvigneau .......... A45C 7/0045 280/47.26 |
| 2007/0200309 A1 | 8/2007 | Coppedge |
| 2007/0215425 A1 | 9/2007 | Slater |
| 2007/0241113 A1 | 10/2007 | Williams |
| 2007/0267371 A1 | 11/2007 | Farley |
| 2007/0290466 A1 | 12/2007 | Lenz |
| 2008/0017463 A1 | 1/2008 | Huang |
| 2008/0017537 A1 | 1/2008 | Inskeep et al. |
| 2008/0035508 A1 | 2/2008 | Streich et al. |
| 2008/0035510 A1 | 2/2008 | Brunson |
| 2008/0067206 A1 | 3/2008 | Kuhn |
| 2008/0135364 A1 | 6/2008 | Chang et al. |
| 2008/0135366 A1 | 6/2008 | Katz et al. |
| 2008/0136130 A1 | 6/2008 | Washington |
| 2008/0152944 A1 | 6/2008 | Bonini et al. |
| 2008/0164842 A1 | 7/2008 | Bergner |
| 2008/0169739 A1 | 7/2008 | Goldenberg |
| 2008/0217130 A1 * | 9/2008 | Louis ............... A45C 5/14 190/18 A |
| 2008/0230416 A1 | 9/2008 | Brouard |
| 2009/0014974 A1 | 1/2009 | VanVorst et al. |
| 2009/0080809 A1 | 3/2009 | Pham et al. |
| 2009/0139813 A1 | 6/2009 | Francis |
| 2009/0166141 A1 | 7/2009 | Davis et al. |
| 2009/0211932 A1 | 8/2009 | Schmitt et al. |
| 2009/0212536 A1 | 8/2009 | Tadeo |
| 2009/0236810 A1 | 9/2009 | Anderson et al. |
| 2009/0250365 A1 | 10/2009 | Goto et al. |
| 2009/0301833 A1 | 12/2009 | Hymas |
| 2010/0000805 A1 | 1/2010 | Pan |
| 2010/0012538 A1 | 1/2010 | Brunner |
| 2010/0012655 A1 | 1/2010 | Dathy |
| 2010/0033325 A1 | 2/2010 | Vilkomirski et al. |
| 2010/0101908 A1 | 4/2010 | Chun |
| 2010/0108451 A1 | 5/2010 | Pain et al. |
| 2010/0108452 A1 * | 5/2010 | Williams ............ A45C 5/14 190/18 A |
| 2010/0175960 A1 | 7/2010 | Moskowitz et al. |
| 2010/0224527 A1 | 9/2010 | Huang |
| 2010/0258465 A1 | 10/2010 | Gomas |
| 2010/0320245 A1 | 12/2010 | Vilkomirski et al. |
| 2011/0067967 A1 | 3/2011 | Herrera |
| 2011/0084075 A1 | 4/2011 | Arnett et al. |
| 2011/0094910 A1 | 4/2011 | Fleury et al. |
| 2011/0121695 A1 | 5/2011 | Purdy |
| 2011/0132046 A1 | 6/2011 | Tonelli |

(56) References Cited

U.S. PATENT DOCUMENTS

| | | | |
|---|---|---|---|
| 2011/0155526 A1 | 6/2011 | Cheng | |
| 2011/0174648 A1 | 7/2011 | Huang et al. | |
| 2011/0214957 A1 | 9/2011 | Barnard et al. | |
| 2011/0268374 A1 | 11/2011 | Hotta et al. | |
| 2012/0018330 A1 | 1/2012 | Kato et al. | |
| 2012/0138403 A1* | 6/2012 | Tong | A45C 5/02 190/18 A |
| 2012/0152944 A1 | 6/2012 | Vilkomirski et al. | |
| 2012/0160626 A1 | 6/2012 | Yang | |
| 2012/0206907 A1 | 8/2012 | Seidel | |
| 2012/0210596 A1 | 8/2012 | Lebel | |
| 2012/0255824 A1* | 10/2012 | Schnell | A45C 5/14 190/18 A |
| 2012/0257379 A1 | 10/2012 | Herr et al. | |
| 2012/0267374 A1 | 10/2012 | Kotula et al. | |
| 2012/0292213 A1 | 11/2012 | Brunner | |
| 2012/0312708 A1 | 12/2012 | Roehm et al. | |
| 2012/0317933 A1 | 12/2012 | Crull | |
| 2012/0318792 A1 | 12/2012 | Larson et al. | |
| 2012/0326406 A1 | 12/2012 | Lifshitz et al. | |
| 2012/0326669 A1 | 12/2012 | Horiyama et al. | |
| 2013/0007979 A1 | 1/2013 | Wolfe et al. | |
| 2013/0008753 A1 | 1/2013 | Moon | |
| 2013/0099648 A1 | 4/2013 | Moore | |
| 2013/0161143 A1* | 6/2013 | Kinskey | A45C 5/14 190/18 A |
| 2013/0186795 A1 | 7/2013 | Borrelli | |
| 2013/0233660 A1 | 9/2013 | Bettua et al. | |
| 2013/0240314 A1 | 9/2013 | Pitchforth | |
| 2013/0284553 A1 | 10/2013 | Daniels | |
| 2013/0292221 A1 | 11/2013 | Ryan et al. | |
| 2013/0327608 A1* | 12/2013 | Murdoch | A45C 5/14 190/18 A |
| 2014/0021232 A1 | 1/2014 | Lazarevich et al. | |
| 2014/0027227 A1 | 1/2014 | Stern | |
| 2014/0102928 A1 | 4/2014 | Sabbag et al. | |
| 2014/0166414 A1 | 6/2014 | Moore | |
| 2014/0166516 A1* | 6/2014 | Martinez | B25H 3/02 206/372 |
| 2014/0197059 A1 | 7/2014 | Evans et al. | |
| 2014/0311844 A1 | 10/2014 | Meersschaert et al. | |
| 2014/0326562 A1 | 11/2014 | Pickens et al. | |
| 2014/0353104 A1 | 12/2014 | Sheikh et al. | |
| 2015/0047941 A1 | 2/2015 | Wax | |
| 2015/0060221 A1 | 3/2015 | Bourette | |
| 2015/0102573 A1 | 4/2015 | Hillaert et al. | |
| 2015/0107949 A1 | 4/2015 | McDonald et al. | |
| 2015/0129384 A1 | 5/2015 | Mertens et al. | |
| 2015/0130148 A1 | 5/2015 | Meersschaert et al. | |
| 2015/0136554 A1 | 5/2015 | Herold | |
| 2015/0150348 A1 | 6/2015 | Wax | |
| 2015/0173475 A1 | 6/2015 | Dermody | |
| 2015/0208774 A1 | 7/2015 | Leimenstoll | |

FOREIGN PATENT DOCUMENTS

| | | |
|---|---|---|
| EP | 0686008 | 4/2001 |
| EP | 0591484 | 11/2001 |
| EP | 0874564 | 3/2002 |
| EP | 0717705 | 4/2003 |
| EP | 1259137 | 5/2003 |
| EP | 1107674 | 10/2003 |
| EP | 1340598 | 1/2006 |
| EP | 1332693 | 3/2007 |
| EP | 1395140 | 8/2007 |
| EP | 1724069 | 3/2009 |
| EP | 2407047 | 1/2012 |
| EP | 2266866 | 3/2012 |
| EP | 2502518 | 9/2012 |
| EP | 2024218 | 10/2012 |
| EP | 2522248 | 11/2012 |
| EP | 2561772 | 2/2013 |
| EP | 2051602 | 5/2013 |
| EP | 2710916 | 3/2014 |
| EP | 1853503 | 4/2014 |
| EP | 2730189 | 5/2014 |
| EP | 2594152 | 7/2014 |
| EP | 1852031 | 9/2014 |
| EP | 2537641 | 3/2015 |
| EP | 2862473 | 4/2015 |
| EP | 2783341 | 5/2015 |
| EP | 2873342 | 5/2015 |
| FR | 2657915 | 8/1991 |
| WO | WO 95/19119 | 7/1995 |
| WO | WO 95/22266 | 8/1995 |
| WO | WO 96/31930 | 10/1996 |
| WO | WO 02/37999 | 5/2002 |
| WO | WO 02/052975 | 7/2002 |
| WO | WO 03/063637 | 8/2003 |
| WO | WO 03/096838 | 11/2003 |
| WO | WO 2004/045329 | 6/2004 |
| WO | WO 2004/054399 | 7/2004 |
| WO | WO 2004/088163 | 10/2004 |
| WO | WO 2005/011429 | 2/2005 |
| WO | WO 2006/007266 | 1/2006 |
| WO | WO 2006/102585 | 9/2006 |
| WO | WO 2009/021146 | 2/2009 |
| WO | WO 2009/088853 | 7/2009 |
| WO | WO 2009/124302 | 10/2009 |
| WO | WO 2010/033133 | 3/2010 |
| WO | WO 2011/089376 | 7/2011 |
| WO | WO 2012/056030 | 5/2012 |
| WO | WO 2012/068075 | 5/2012 |
| WO | WO 2012/113056 | 8/2012 |
| WO | WO 2012/126949 | 9/2012 |
| WO | WO 2013/142452 | 9/2013 |
| WO | WO 2014/177863 | 11/2014 |
| WO | WO 2015/049121 | 4/2015 |
| WO | WO 2015/110667 | 7/2015 |

OTHER PUBLICATIONS

United States Patent Office Final Rejection for U.S. Appl. No. 14/134,468 dated Apr. 21, 2016 (17 pages).

United States Patent Office Action for U.S. Appl. No. 14/134,468 dated Oct. 23, 2015 (11 pages).

Skb cases, I Series Indestructible Catalog (2010) 16 pages.

Barska, "Barska Loaded Gear HD-400 Watertight Dry Box" website available as early as Mar. 13, 2013.

JR Shooting Sports, "Genuine Browning Shooting Accessories Utility Cases" website available as early as Aug. 20, 2003.

United States Patent Office Notice of Allowance for U.S. Appl. No. 14/134,468 dated Aug. 10, 2016 (8 pages).

\* cited by examiner

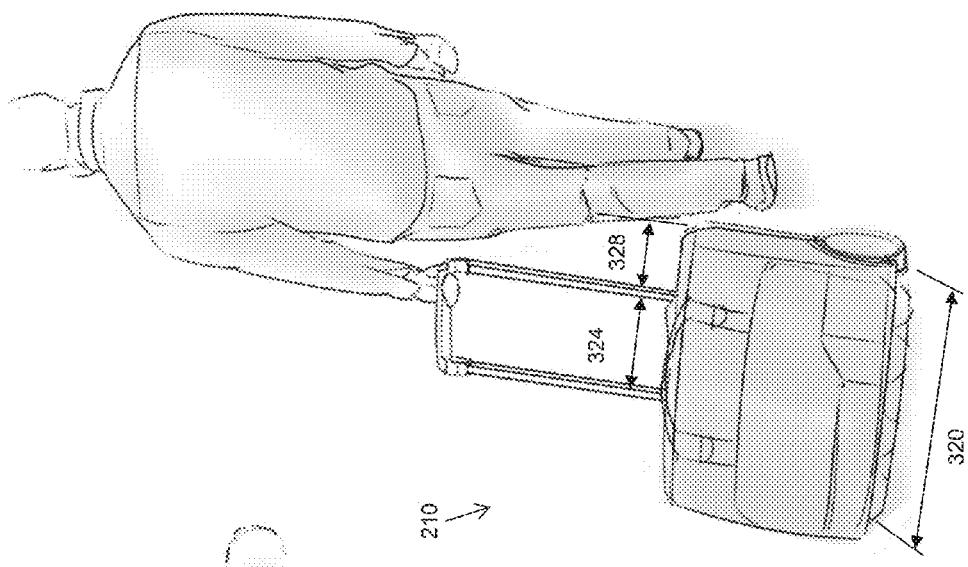
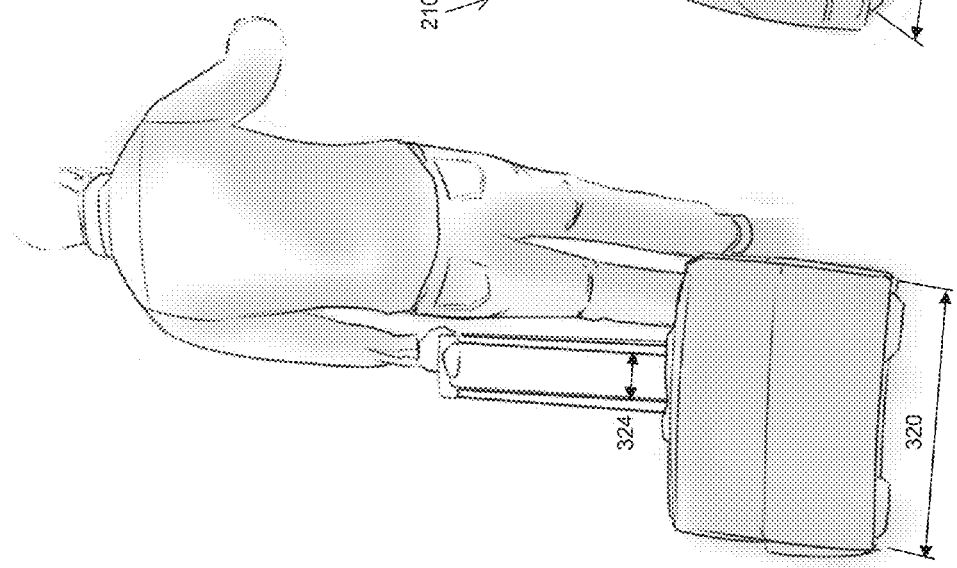

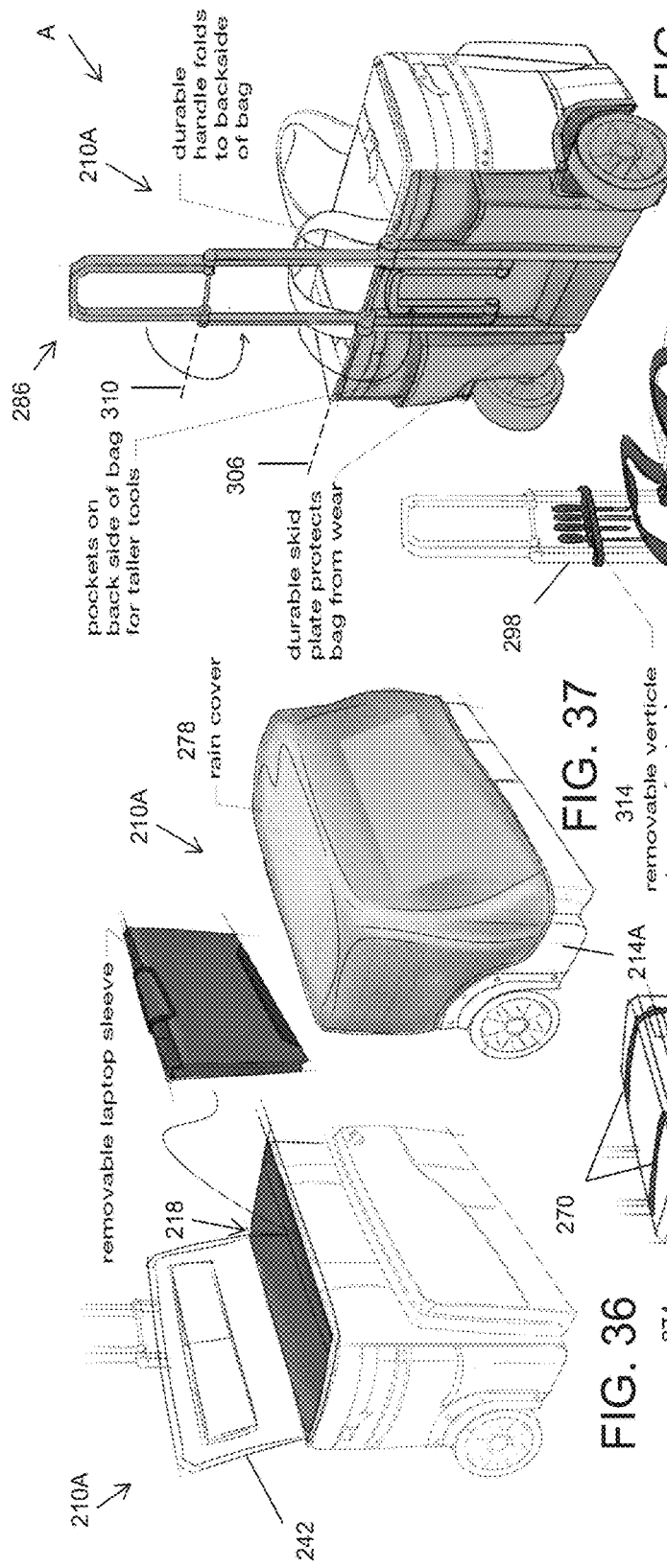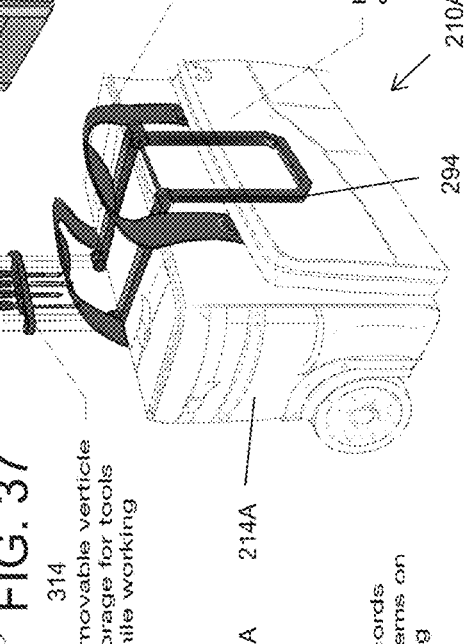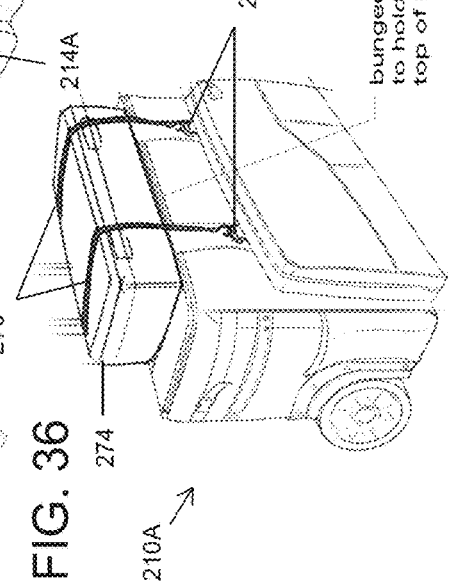

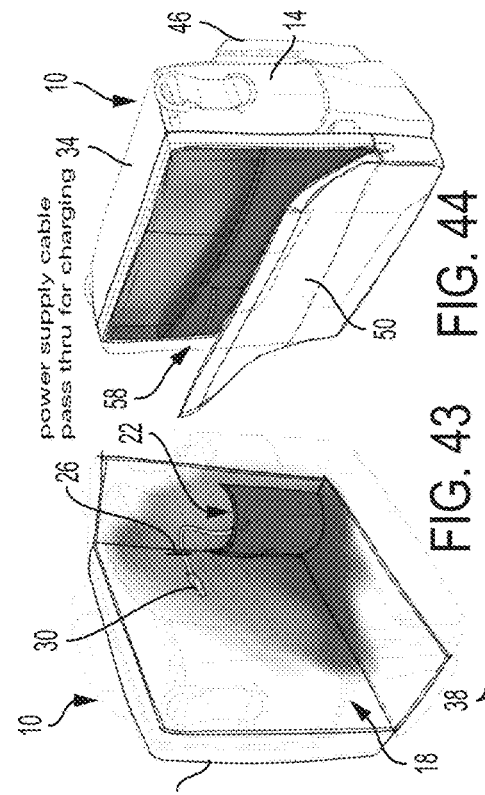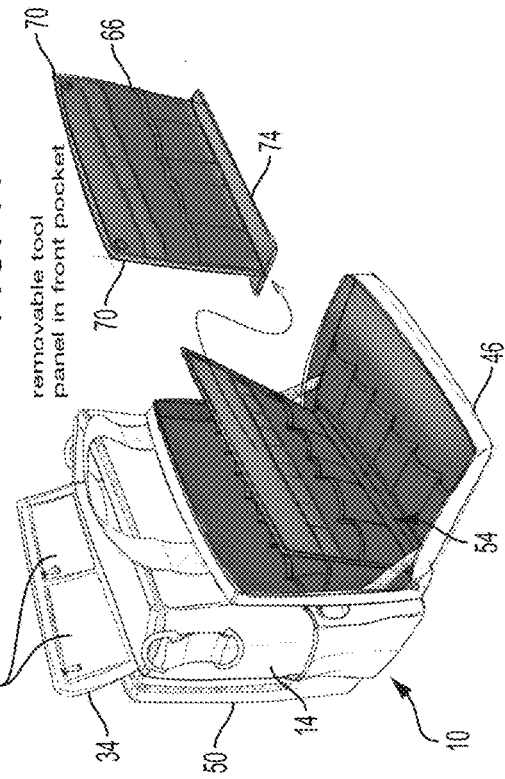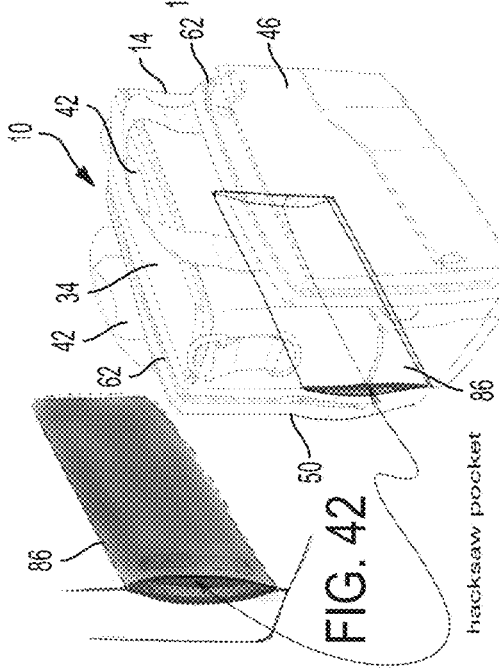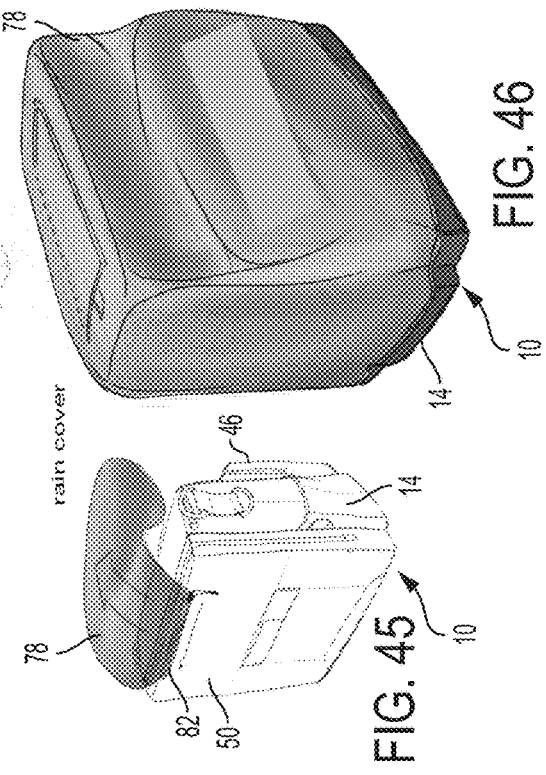

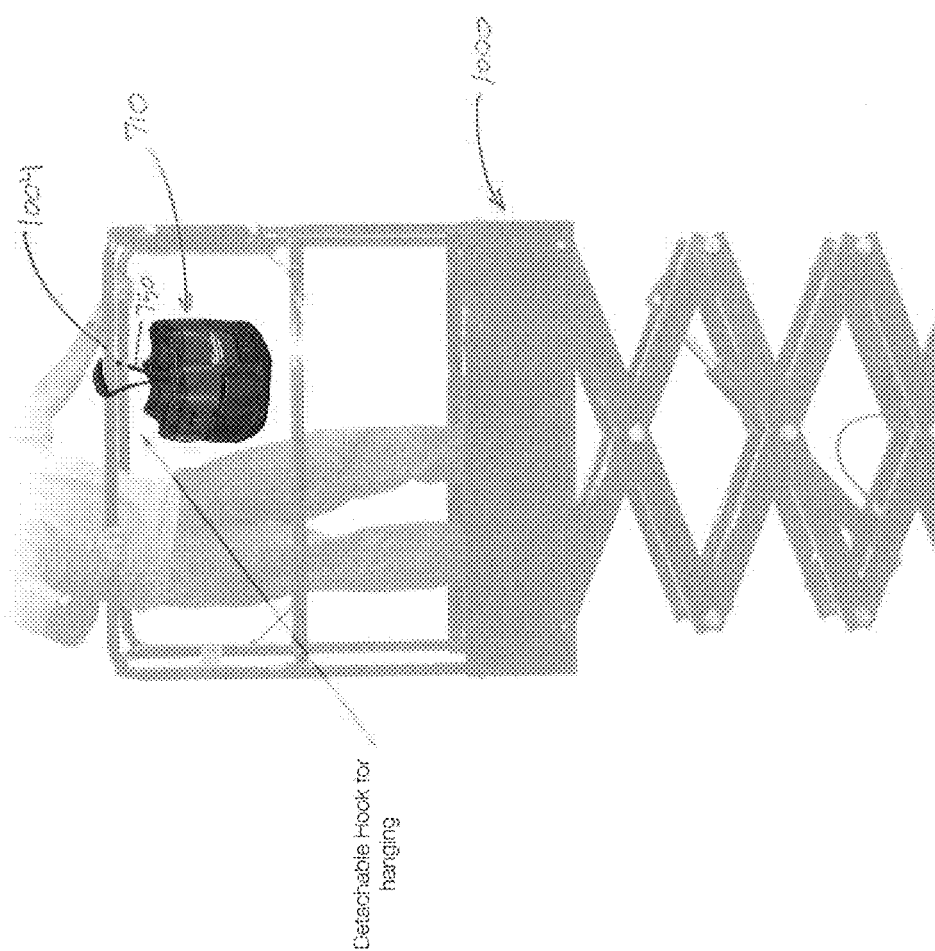

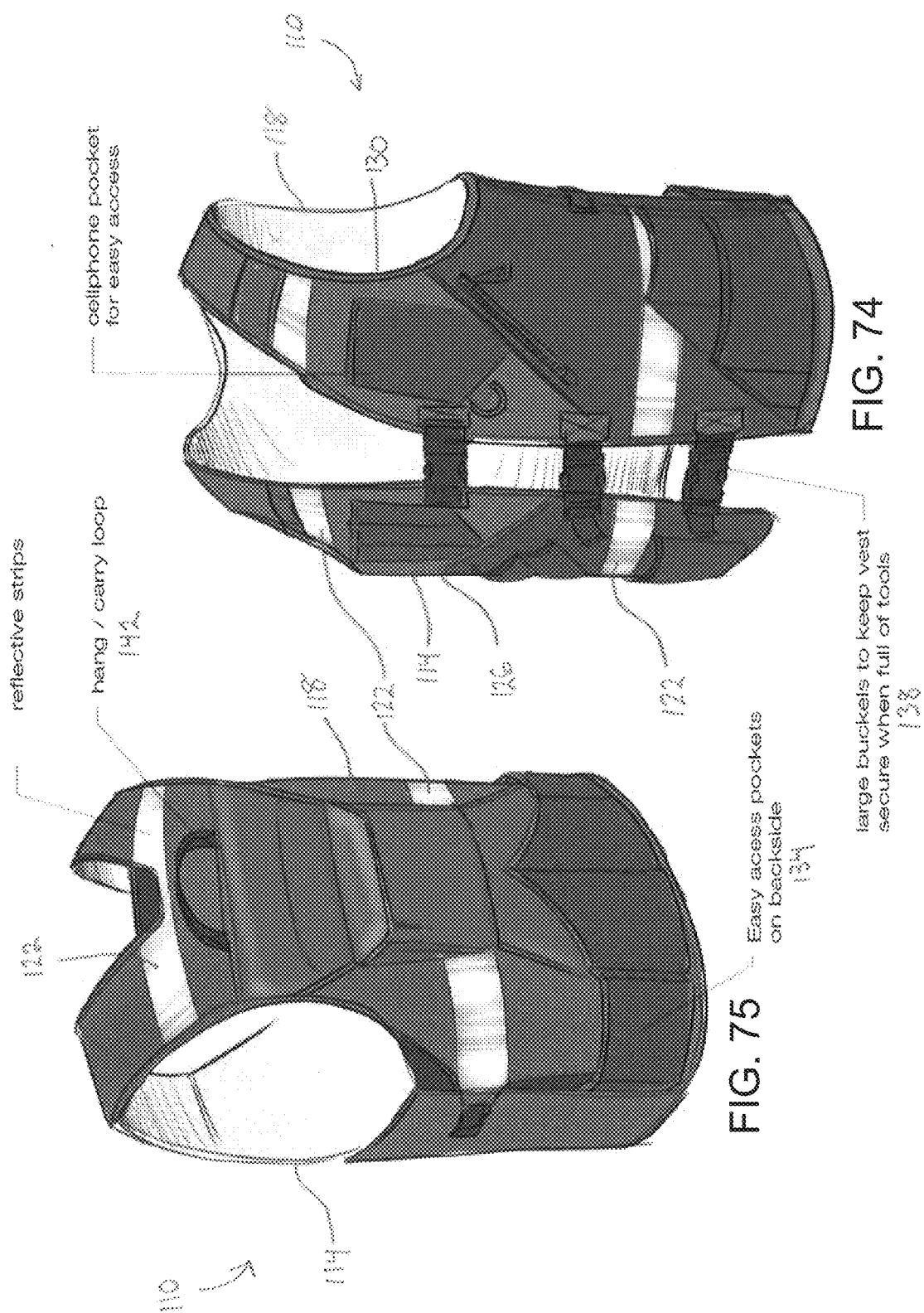

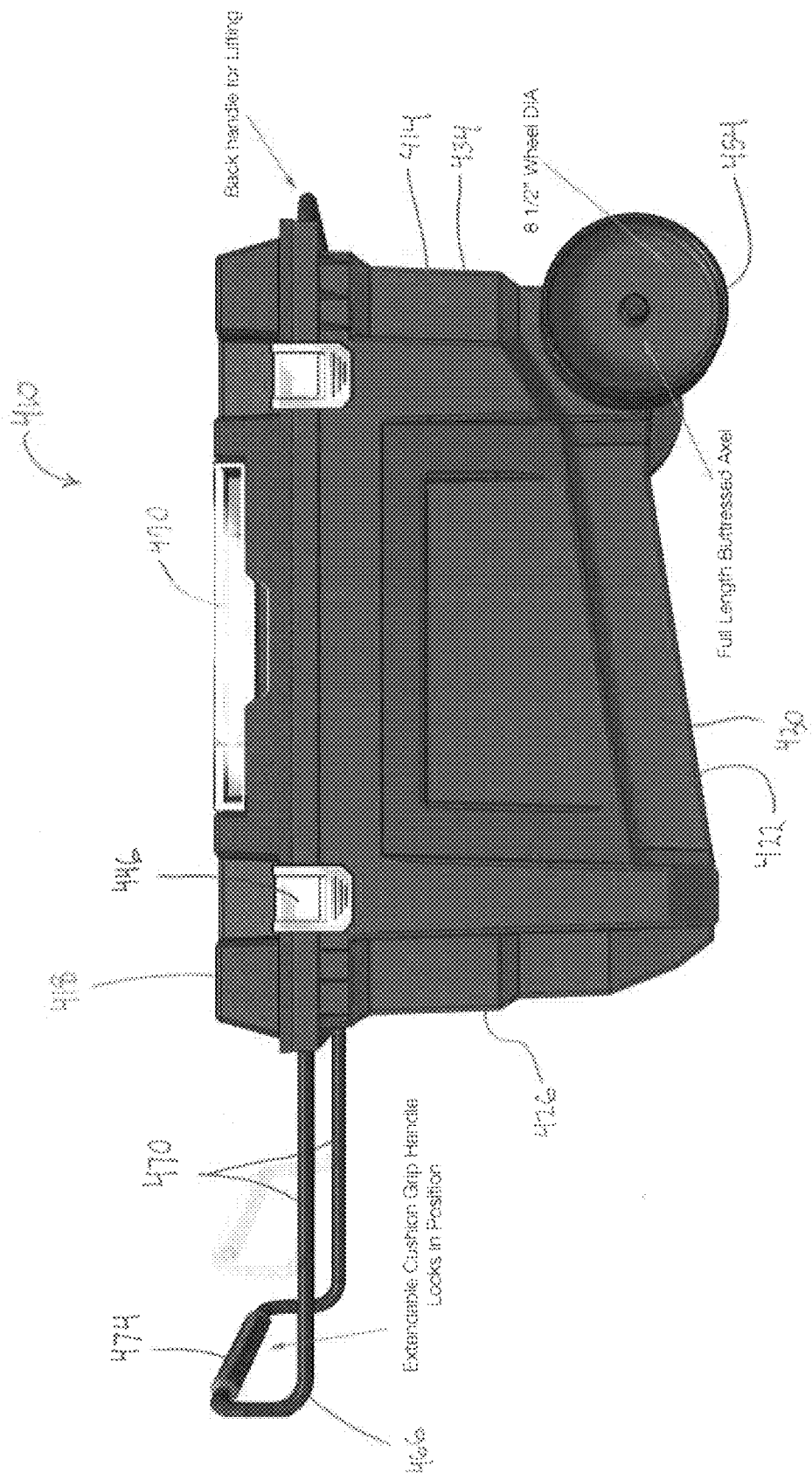

TOOL STORAGE DEVICES

RELATED APPLICATIONS

The present application claims priority to U.S. Provisional Patent Application No. 62/027,566, filed Jul. 22, 2014; U.S. Provisional Patent Application No. 62/068,415, filed Oct. 24, 2014; and U.S. Provisional Patent Application No. 62/079,190, filed Nov. 13, 2014, the entire contents of all of which are hereby incorporated by reference.

FIELD

The present invention relates to tool storage devices, including tool boxes, tool bags, tool belts, etc.

SUMMARY

Tool storage devices, such as tool boxes, belts, pouches, totes, bags, etc., are most commonly used to conveniently store and organize tools and accessories. Tools and accessories are often transported between and around worksites, so portability is a consideration for tool storage devices. Durability is also a factor because tool storage devices may be used in various terrains and in various weather conditions at worksites. Accessibility is another design consideration because tools and/or accessories that are difficult to access or remove from the tool storage device at the worksite can cause project delays, increased cost, aggravation, etc. A variety of tool storage devices are described and illustrated in commonly-owned U.S. Patent Application Publication No. U.S. 2014/0166516 A1, the entire contents of which are incorporated by reference.

In one independent aspect, a tool storage device may generally include a body defining a storage compartment; wheels supporting the body for movement over ground, the wheels being rotatable about an axis; and a handle assembly. The handle assembly may include a handle portion engageable by a user to pull the storage device in a direction transverse to the axis, and a support arm connected between the body and the handle portion. The support arm may have a substantially rectangular cross section oriented with first walls extending transverse to the axis having a greater width than second walls extending parallel to the axis.

In another independent aspect, a tool storage device may generally include a body defining a storage compartment; wheel supporting the body for movement over ground, the wheels being rotatable about an axis; and a handle connected to the body. The handle may be engageable by a user to pull the storage device in a direction transverse to the axis. The body may have a body width in a direction parallel to the axis, and the handle may have handle width in a direction parallel to the axis. The handle width may be at least about 50% of the body width.

In yet another independent aspect, a tool storage device may generally include a body defining a storage compartment; wheels supporting the body for movement over ground; and a handle connected to the body and engageable by a user to pull the storage device. The body may include a frame assembly formed of a rigid material, a wall formed of a flexible material and at least partially defining the storage compartment with an open top, and a cover formed of a rigid material connected to the frame assembly and operable to selectively close the open top.

In a further independent aspect, a tool storage device may generally include a body defining a storage compartment; wheels supporting the body for movement over ground, each wheel being rotatable about an axis and having a circumference and an axial width; a wheel well portion operable to receive each wheel, each wheel well portion being connected to the body; and a handle connected to the body and engageable by a user to pull the storage device. Each wheel well portion may cover the axial width of the wheel and a portion of the circumference of the wheel, and a radial clearance between the wheel and a lower end of the well may be no more than about 0.5 inches.

In another independent aspect, a tool storage device may generally include a generally cylindrical body having a bottom wall and a side wall extending from the bottom wall to an open top, the bottom wall and the side wall cooperating to define a storage compartment, the body being formed of a flexible material; a central support extending from the bottom wall; and a plurality of dividers, each divider extending between the central support and the side wall, adjacent dividers cooperating with the side wall to define a divided section of the storage compartment.

Other independent features and independent aspects of the invention will become apparent by consideration of the following detailed description, claims and accompanying drawings.

BRIEF DESCRIPTION OF THE DRAWINGS

FIG. 1A is a cross-sectional view of a support arm of a handle support arm of the tool storage device of FIG. 1 taken generally along line 1A-1A.

FIG. 33 is a perspective view of the tool storage device of FIG. 1, illustrating the tool storage device being rolled behind a user.

FIG. 34 is a perspective view of another tool storage device, such as a roller bag, illustrating the roller bag being rolled behind a user.

FIG. 36 is a front perspective view of the tool storage device of FIG. 35, illustrating a removable laptop sleeve.

FIG. 37 is a front perspective view of the tool storage device of FIG. 35, illustrating a rain cover.

FIG. 38-40 are additional views of the tool storage device of FIG. 35.

FIG. 42 is a perspective view of the tool storage device of FIG. 41, illustrating an elongate pocket.

FIG. 43 is a perspective view of the tool storage device of FIG. 41, illustrating an internal compartment.

FIG. 44 is a perspective view of the tool storage device of FIG. 41, illustrating an internal compartment.

FIG. 45 is a perspective view of the tool storage device of FIG. 41, illustrating a rain cover stored within a pocket.

FIG. 46 is a perspective view of the tool storage device of FIG. 41, illustrating a rain cover.

FIG. 47 is a perspective view of the tool storage device of FIG. 41, illustrating a removable tool panel in a front pocket of the tool storage device.

FIG. 59-60 are views of another tool storage device, such as a parachute tool bag.

FIG. 61 illustrates the tool storage device of FIG. 59 contained within a bucket.

FIG. 62 illustrates the tool storage device of FIG. 59 in a hanging position.

FIG. 74-75 are views of another tool storage device, such as a tool vest.

FIG. 76-77 are views of another tool storage device, such as a rolling job box.

DETAILED DESCRIPTION

Figure 1:
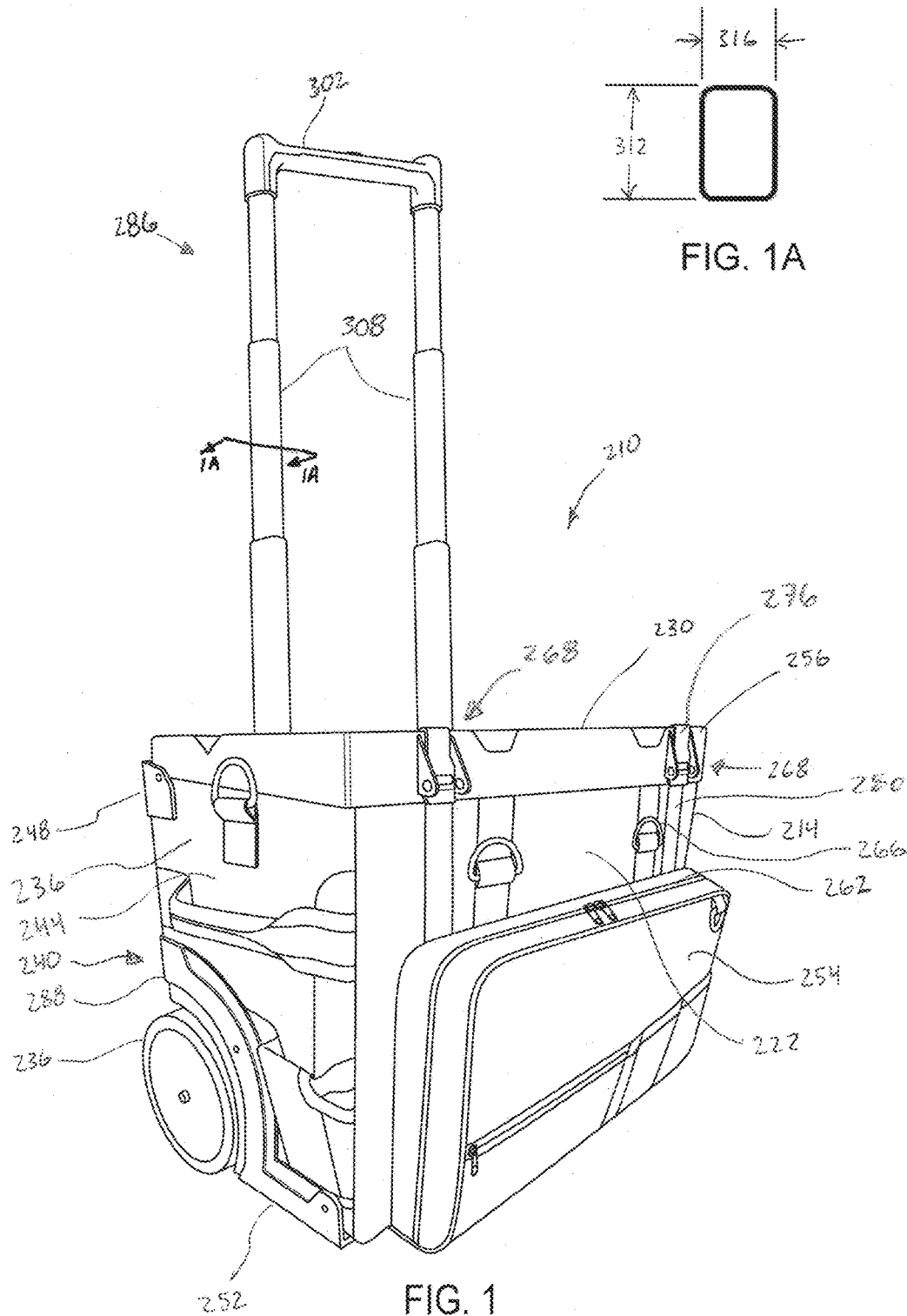
FIG. 1 is a front perspective view of a tool storage device, such as a rolling bag.
Figure 2:
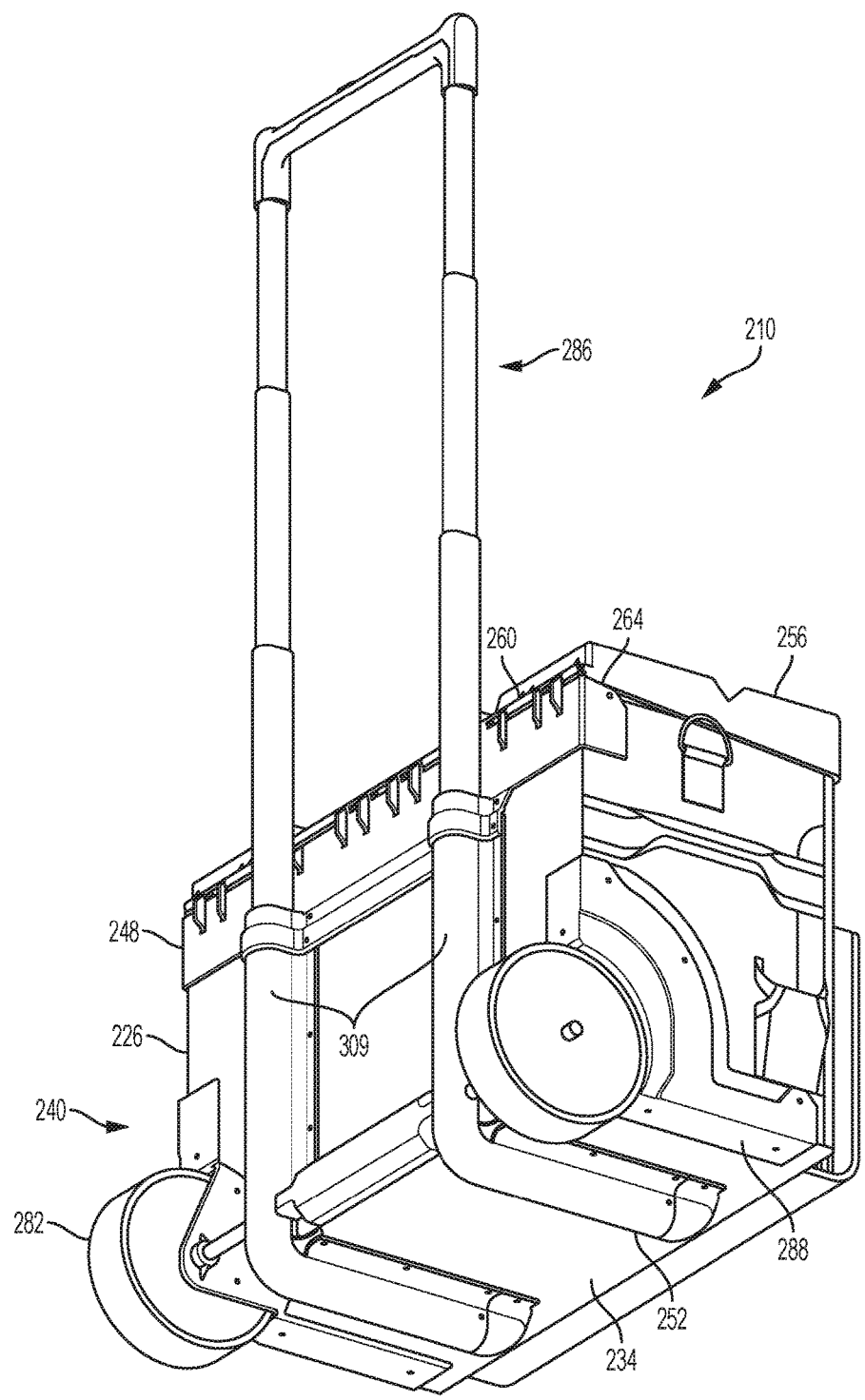
FIG. 2 is a rear perspective view of the tool storage device of FIG. 1 illustrating a front compartment.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

FIGS. 1-8 and 12-17 illustrate one construction of a tool storage device, such as a portable rolling tool bag 210, transportable between and around worksites (e.g., construction sites, garages, etc.) and capable of storing tools and accessories in an organized manner.

The tool bag 210 includes a body 214 defining an interior storage compartment or space 218 (see FIG. 14) and having a front 222, a rear 226, a top 230, a bottom 234, and opposite, sides 236. The body 214 includes a frame assembly 240 formed of rigid material and a wall 244 formed of a flexible material. The flexible wall 244 forms the front 222 and also at least partially forms the rear 226, the bottom 324, and the sides 236 of the body 214. The top 230 is open to provide access to the storage space 218.

The frame assembly 240 is formed of a rigid material, such as plastic, metal, combinations thereof, to, for example, provide structural support so that the body 214 maintains its shape and to carry a load on the top 230. The frame assembly 240 includes a main frame portion 248 at least partially providing the rear 226 and connected to and providing support to the flexible wall 244 (e.g., to the rear 226 and a portion of each side 236). A bottom frame portion 252 at least partially provides the bottom 234 and is connected to and providing support to the flexible wall 244 (e.g., to the bottom 234).

In an alternate embodiment (see FIGS. 9-11 in which common components have common reference numbers with a letter "C"), a frame assembly 240C, substantially similar to the frame assembly 240 shown in FIGS. 1-8 and 12-17, may have increased structure, to provide sufficient structural support to the body 214C. The illustrated structure also provides vertical pockets 253 for long items, such as a level, a conduit bender, materials (e.g., tubing, conduit, etc.).

The storage space 218 may include pockets or dividers formed on the flexible wall 244 to provide compartmentalized storage. Padding (e.g., ethyl vinyl acetate (EVA)-based foam, polyurethane-based foam, neoprene, etc.) may be included in one or more portions of the flexible wall 244 of the body 214 to provide additional protection to any items stored within the storage space 218.

With reference to FIGS. 1-3 and 7, the bag 210 includes a cover 256 closing the top 230 and openable (e.g., pivotable) to provide access to the storage space 218. The cover 256 is formed of a rigid material (e.g., plastic, metal, combinations thereof) and is connected to the frame assembly 240 (e.g., to the main frame portion 248) via inter-engaging hinge portions 260. The hinge portions 260 pivotally support the cover 256 on the main frame portion 248 for movement between an open position (see FIG. 12) and a closed position (see FIG. 1).

Figure 20:
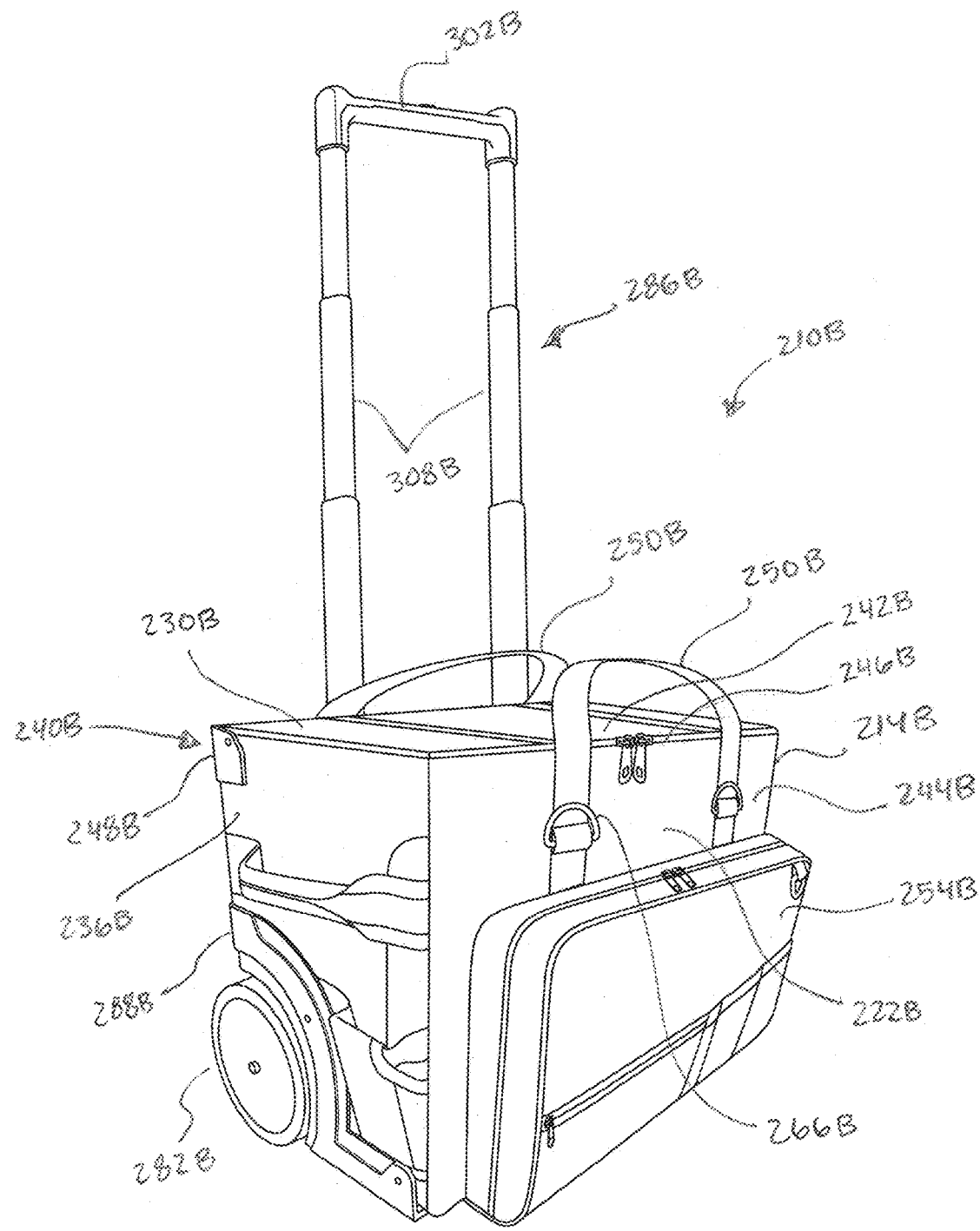
FIG. 20 is a front perspective view of another alternative tool storage device, such as a rolling bag.
Figure 21:
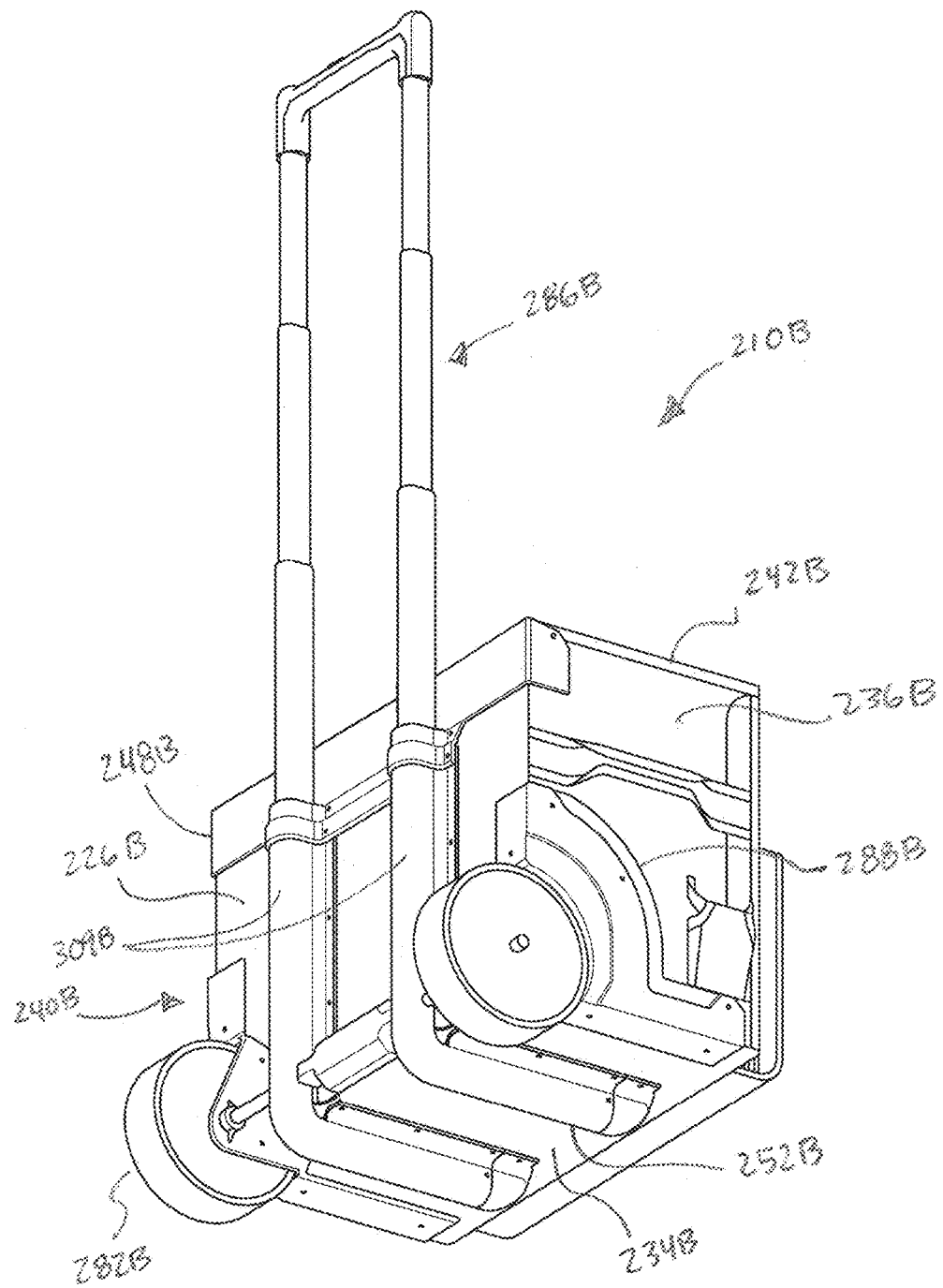
FIG. 21 is a rear perspective view of the tool storage device of FIG. 20 illustrating a front compartment.
Figure 22:
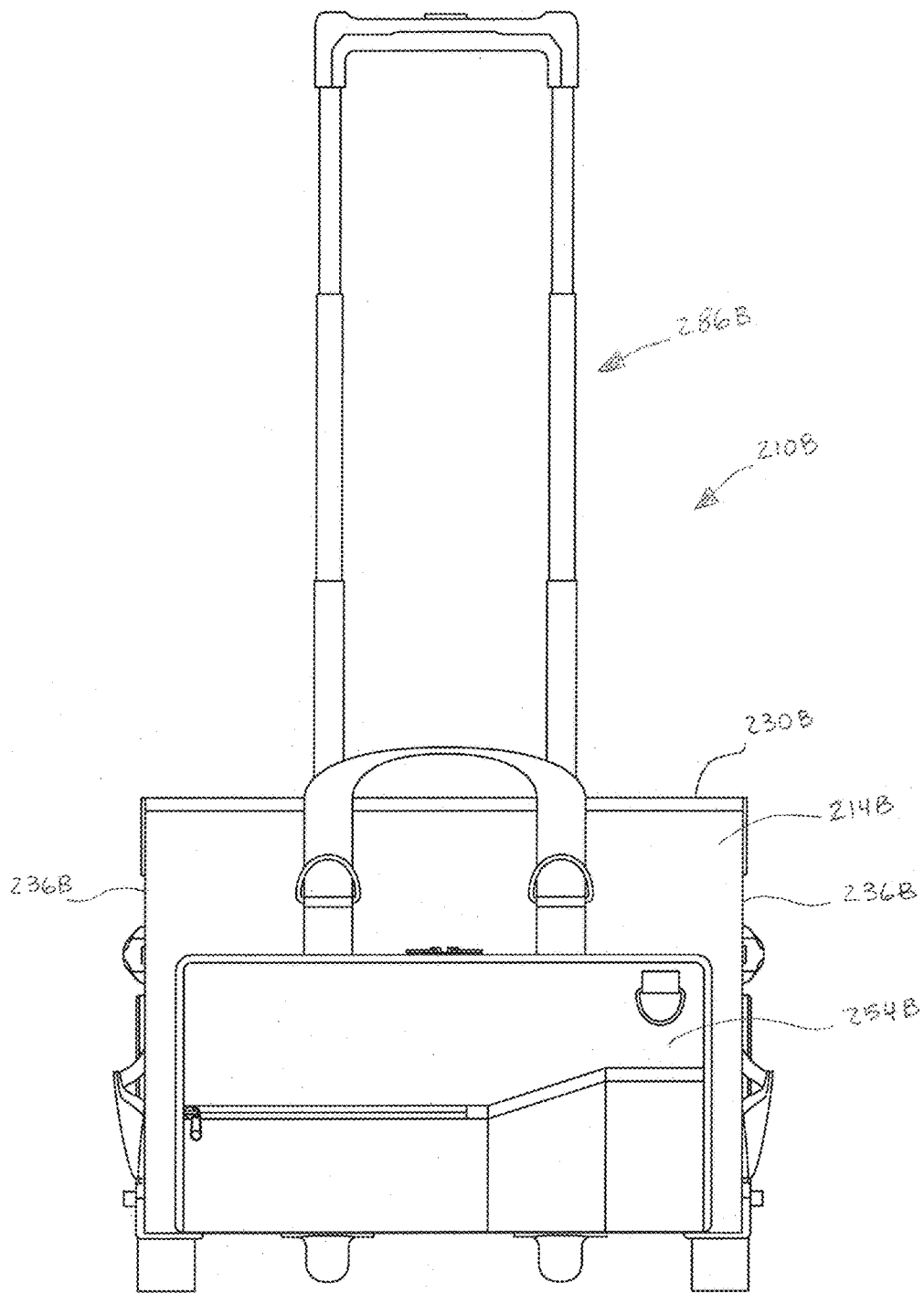
FIG. 22 is a front view of the tool storage device of FIG. 20.
Figure 23:
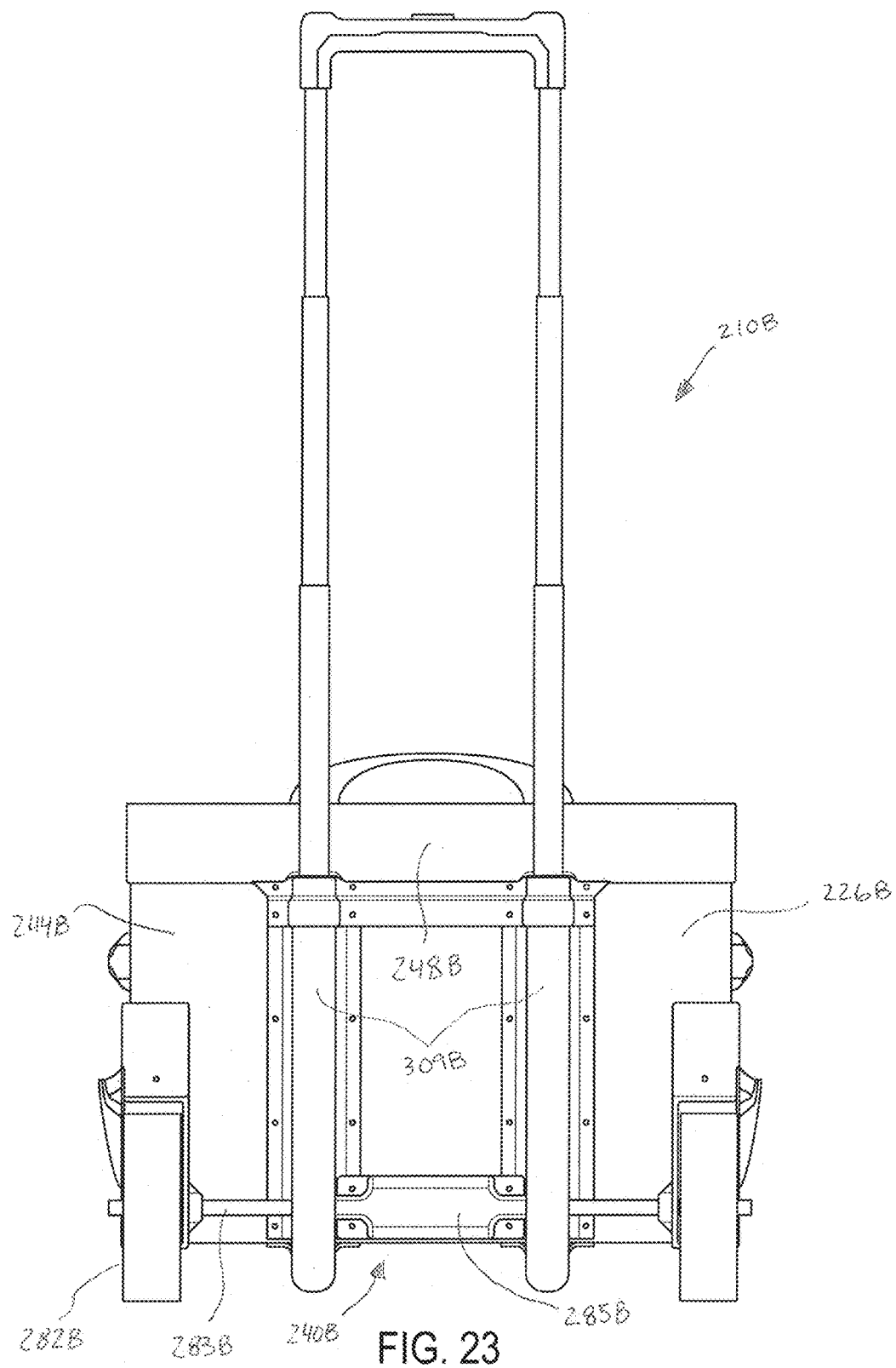
FIG. 23 is a rear view of the tool storage device of FIG. 20.
Figure 24:
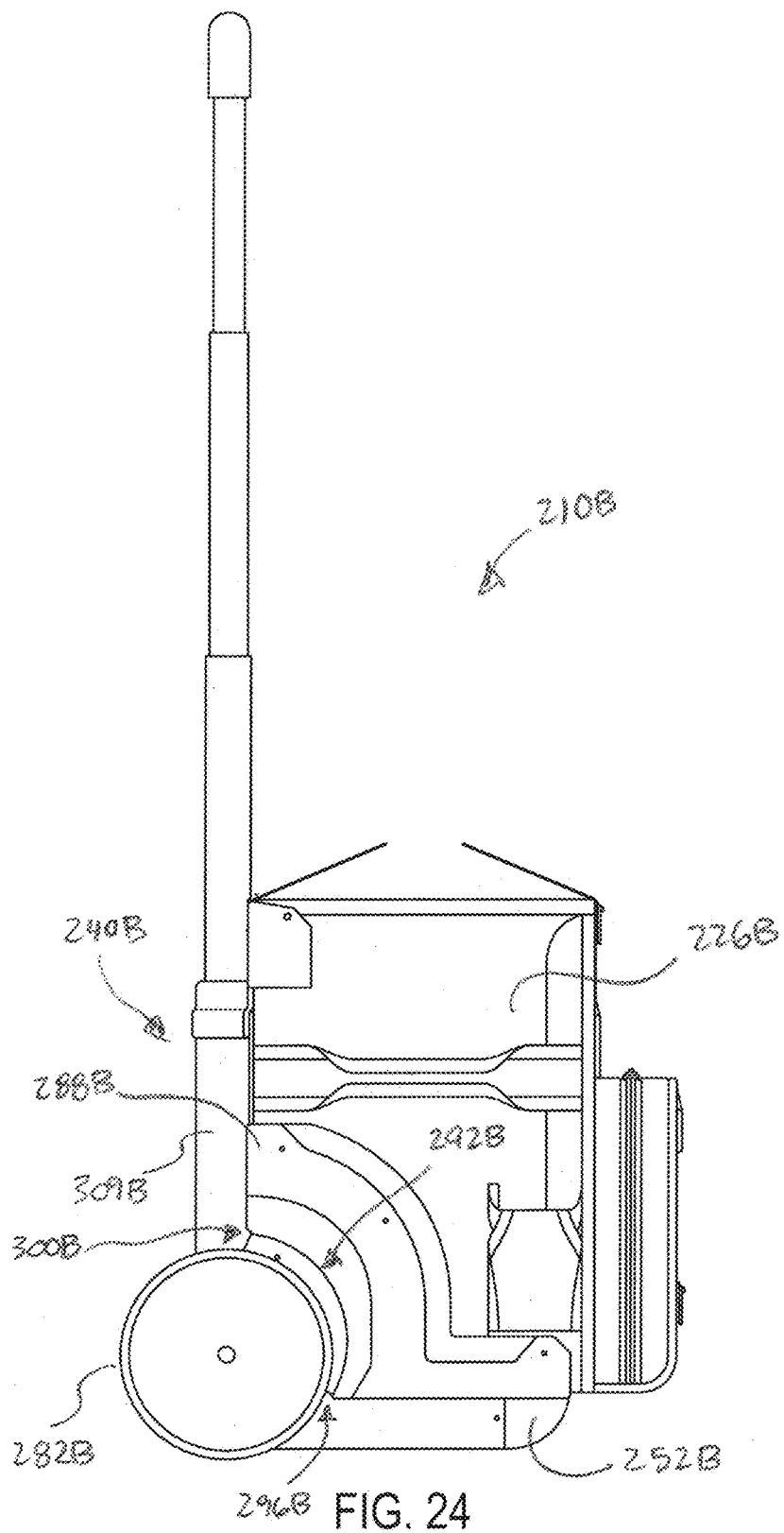
FIG. 24 is a left side view of the tool storage device of FIG. 20.
Figure 25:
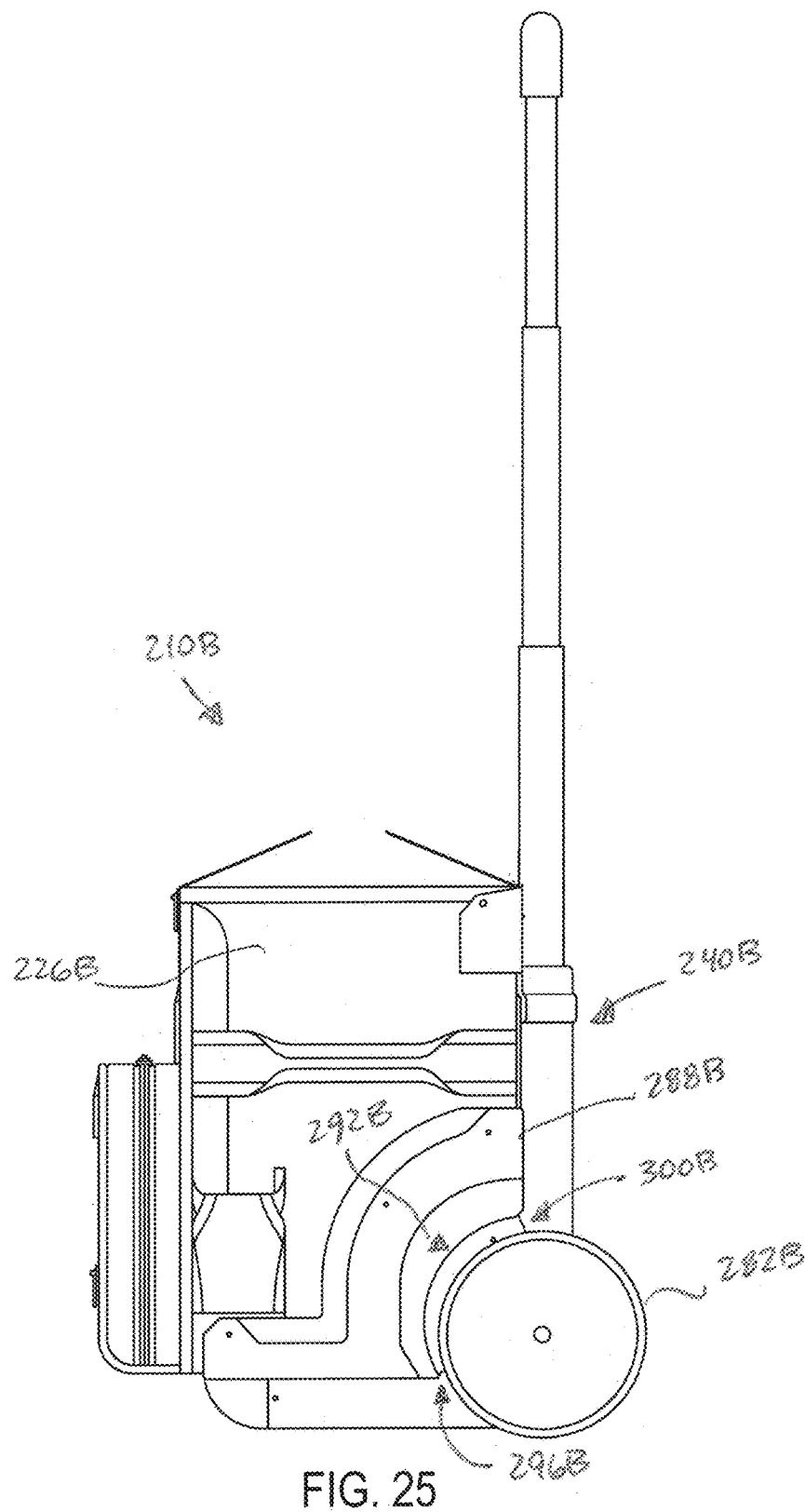
FIG. 25 is a right side view of the tool storage device of FIG. 20.
Figure 26:
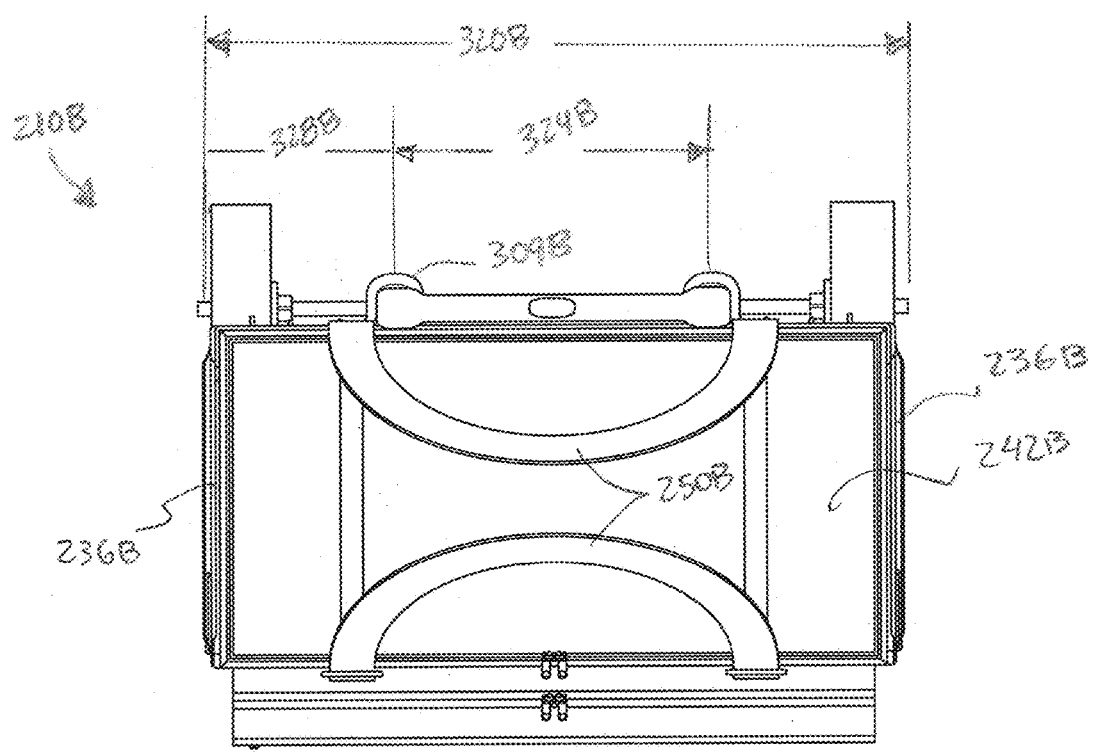
FIG. 26 is a top view of the tool storage device of FIG. 20.
Figure 27:
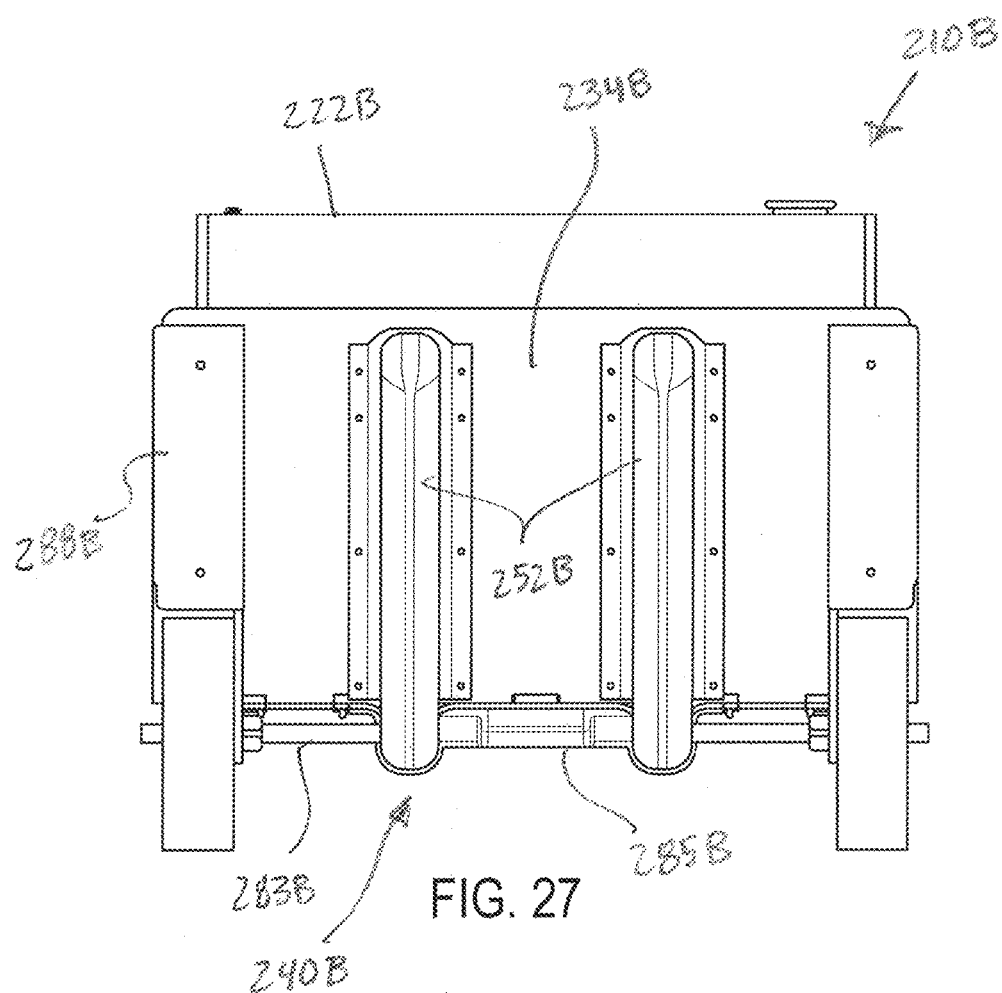
FIG. 27 is a bottom view of the tool storage device of FIG. 20.

The main frame portion 248 and the cover 256 include inter-engaging stop surfaces 264, located proximate the hinge portions 260. The stop surfaces 264 are engageable in the closed position to inhibit further movement of the cover 256 beyond the closed position (e.g., downwardly), thus allowing a load to be carried on the cover 256 in the closed position. In some embodiments (see, e.g., FIGS. 20 and 26), a cover 242 is made of a flexible material with an internal support frame to allow the cover 242 to carry a load like the rigid cover 256.

Figure 5:
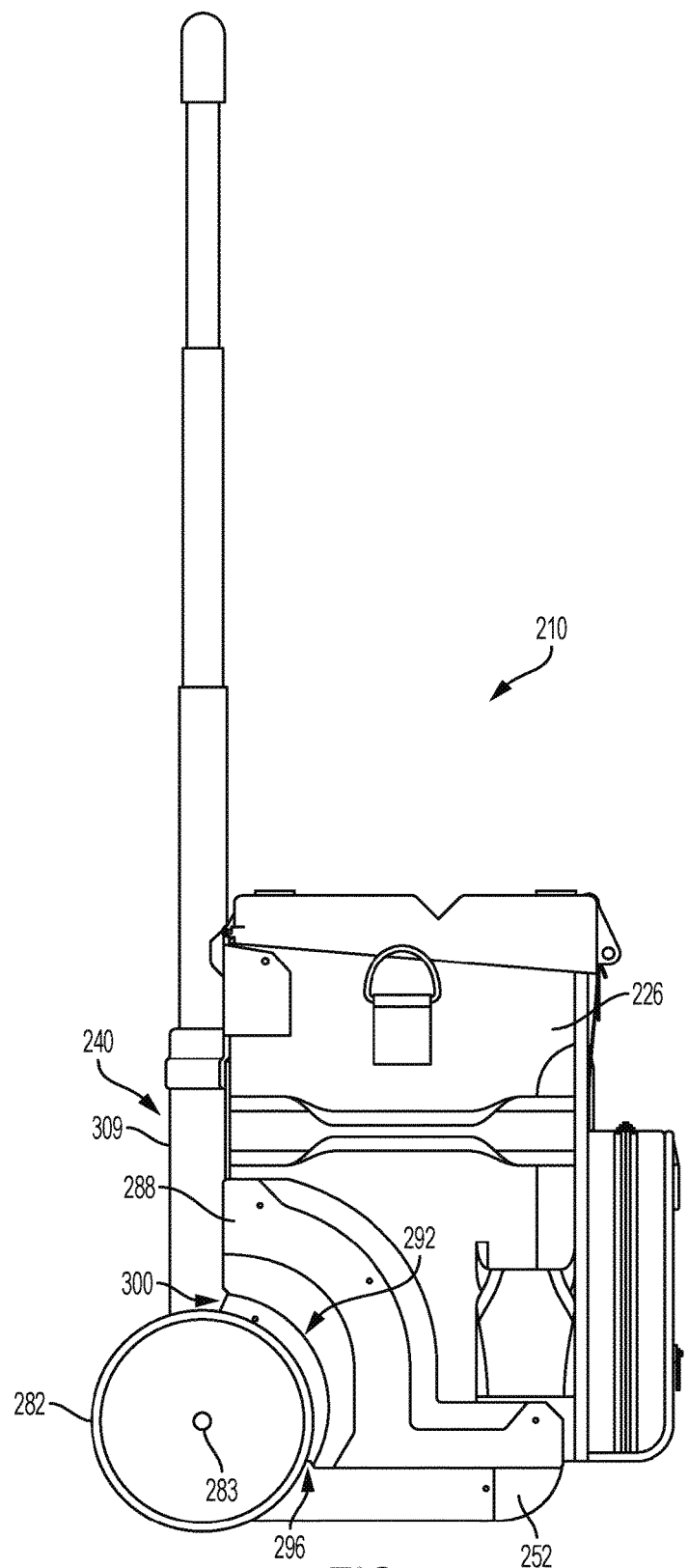
FIG. 5 is a left side view of the tool storage device of FIG. 1.
Figure 6:
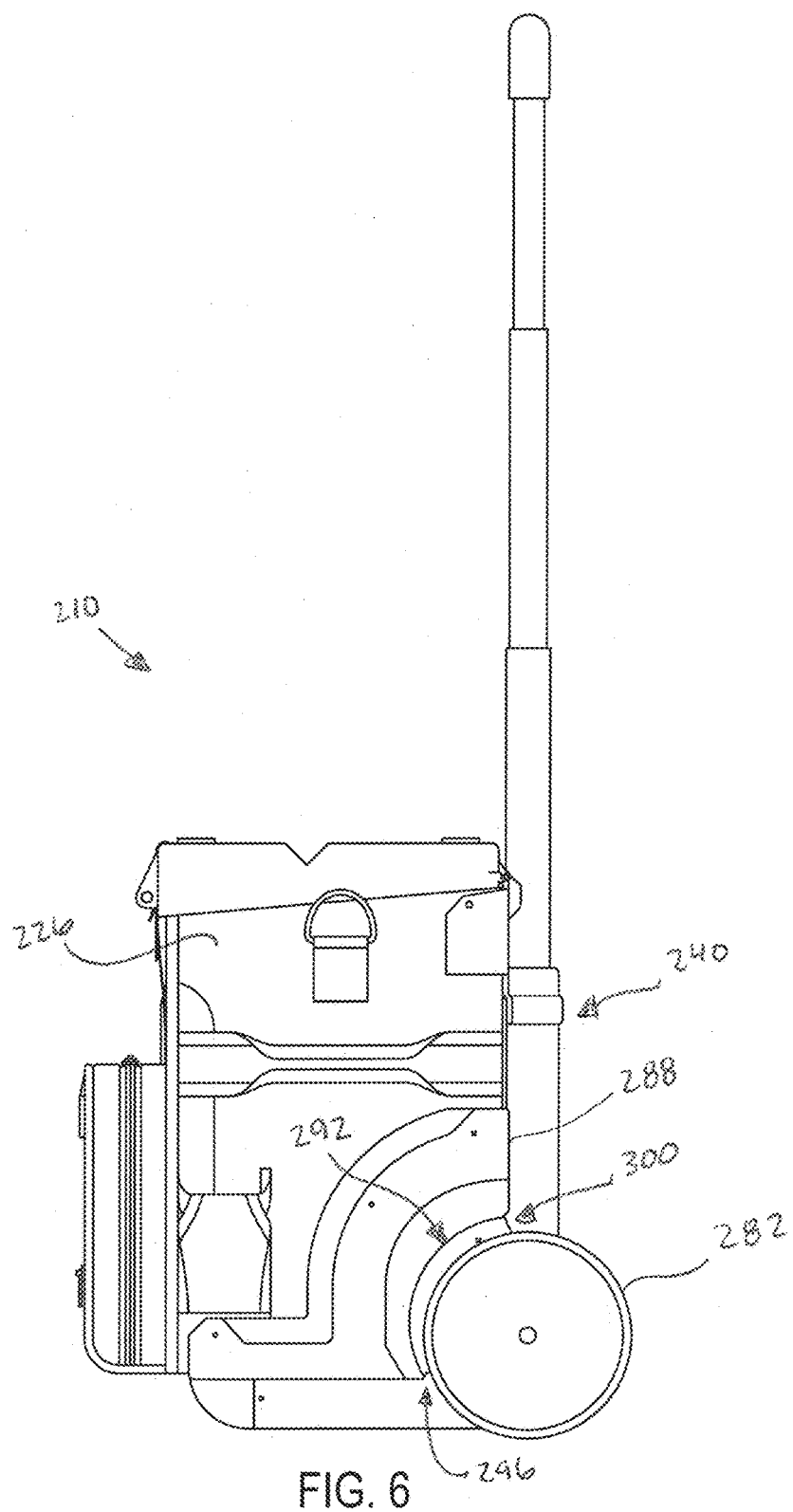
FIG. 6 is a right side view of the tool storage device of FIG. 1.

With reference to FIG. 5, the bag 210 includes a cover locking assembly 268 to secure the cover 256 in the closed position. The cover locking assembly 268 includes a pair of recesses 272 defined in the cover 256. Each recess 272 is engageable by a locking member (e.g., a hook buckle 276). The hook buckle 276 is adjustably coupled to a strap 280 extending from the front 222. Each strap 280 can be tightened once the hook buckle 276 engages the associated 272 to secure the cover 256 in the closed position.

In the illustrated construction (see FIGS. 1, 7, 12, 15 and 19), ears 277 with openings 277A are positioned proximate the location of the hook buckle 276 when in the locked position. A separate locking device (e.g., a bolt, a padlock, etc. (not shown)) may be installed to through the openings 277A to prevent the hook buckle 276 from being disengaged from the recess 272.

Figure 15:
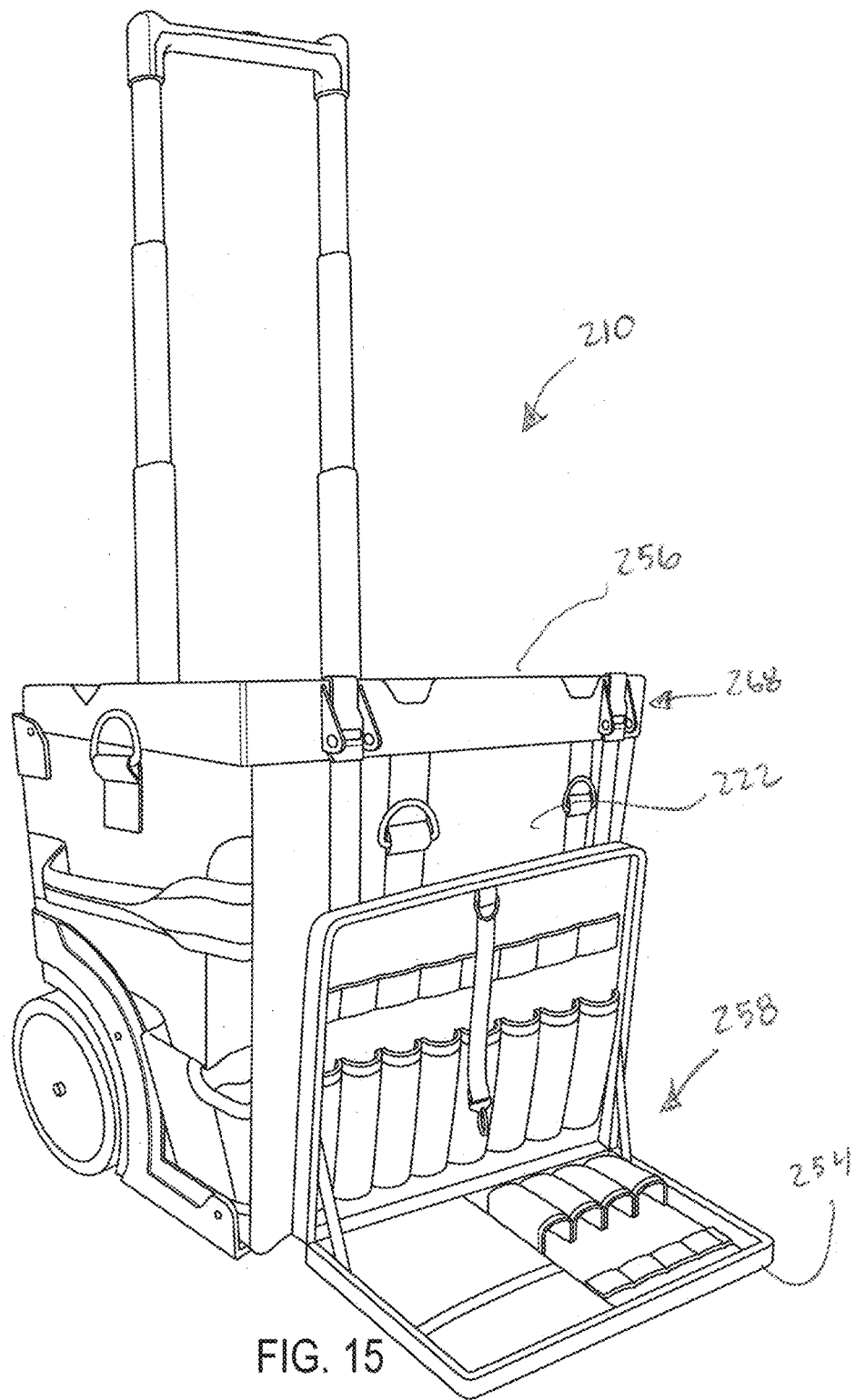
FIG. 15 is a front perspective view of the tool storage device of FIG. 1 with the front panel open.
Figure 16:
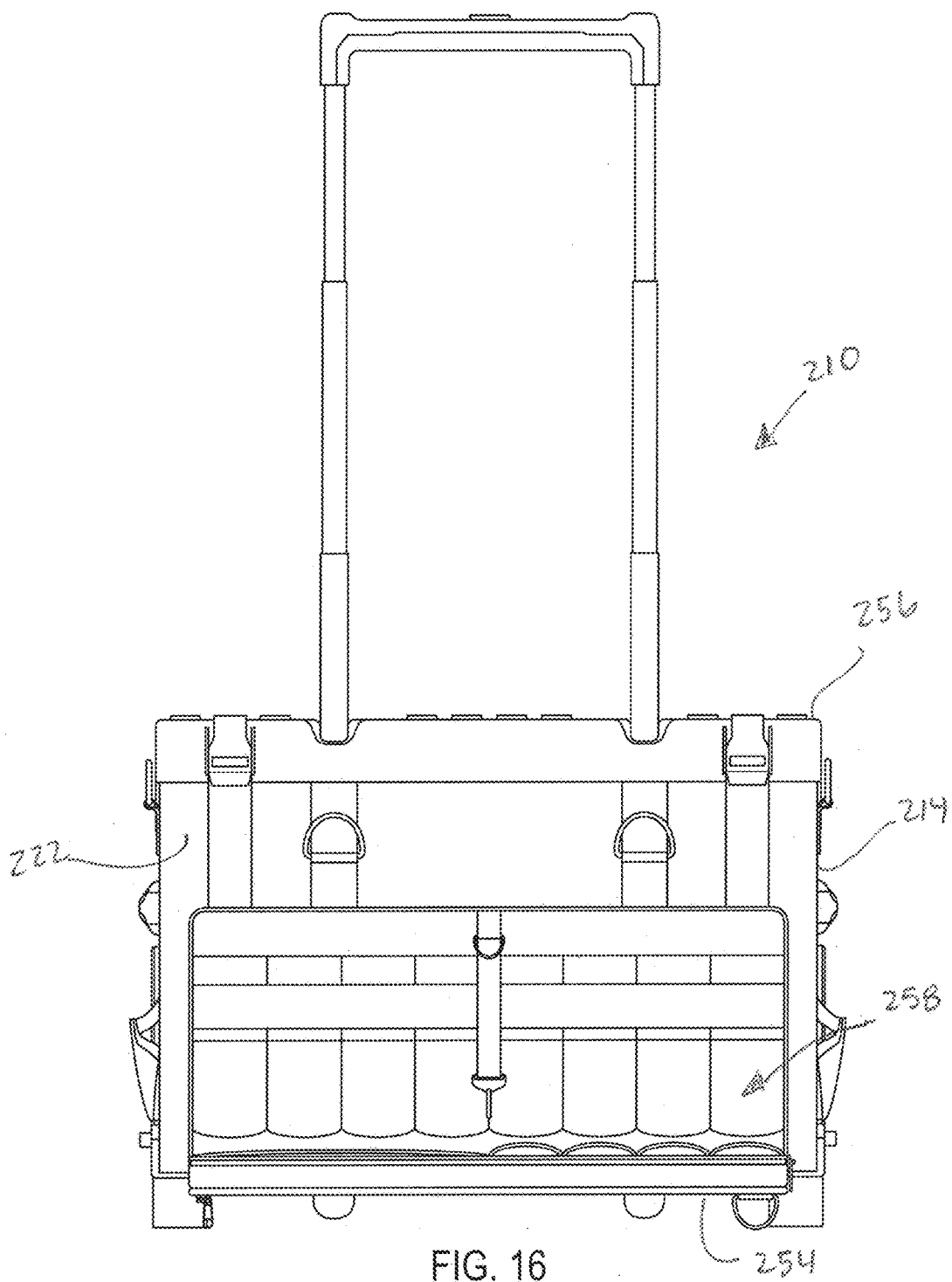
FIG. 16 is a front view of the tool storage device as shown in FIG. 15.
Figure 17:
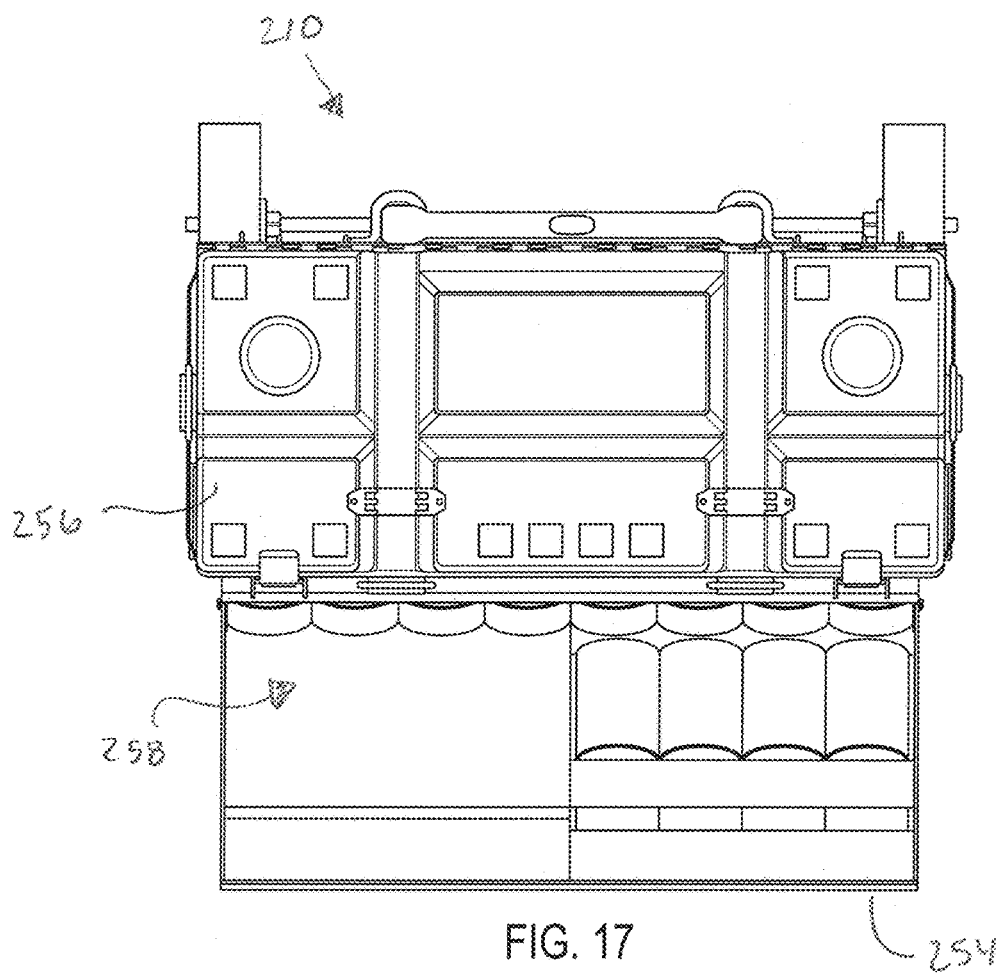
FIG. 17 is a top view of the tool storage device as shown in FIG. 15.

An openable front panel 254 provides a front storage space 258 (FIGS. 15-17). A zipper 262 (e.g., a waterproof zipper) about three sides permits access to the front storage space 258. When the front panel 254 is unzipped, the front storage space 258 is accessible to insert or remove tools and accessories. A plurality of pockets or other organizers are provided to receive different types of tools, bits, or other devices. One or more other panels of the bag 210 may be adapted to provide access to the interior storage space 218 via a zipper.

A plurality of metal rings 266 is secured to the exterior of the bag 210. The rings 266 can be used to attach a carrying strap to the bag 210, to hang the bag 210, to attach other items to the bag 210 (e.g., ID tags, keys, lanyards, carabiners, etc.). As illustrated in FIG. 40, the rings 266 provide mounting points for bungee cords 270 or other straps, allowing external items 274 to be secured to the top of the bag 210.

Wheels 282 are located proximate the rear 226 of the bag 210 to increase portability. The wheels 282 are located on the opposite sides 236. The wheels 282 are rotatably supported on an axle 283 defining a wheel axis A and supported by an axle support 285 of the frame assembly 240. The axle support 285 is connected to and provides support to the wall 244 (e.g., proximate the bottom edge of the rear 226).

Each wheel 282 is at least partially encompassed by a wheel well portion 288 of the frame assembly 240. The wheel well portions 288 are connected to and provide support to the wall 244 (e.g., each side 236 and the rear 226). Each wheel well portion 288 defines an opening receiving the axle 283.

As more clearly illustrated in FIGS. 1-2 and 4-5, each wheel well portion 288 extends and covers the axial width of the wheel 282. Each wheel well portion 288 also encompasses a portion of the circumference of the wheel 282 (e.g., over an arc of 100° in the illustrated construction). In other constructions, the arc of the may have a lesser extent (e.g., at least about 60°, 90°, etc.) or a greater extent (at least about 110°, 120°, etc.).

Figure 4:
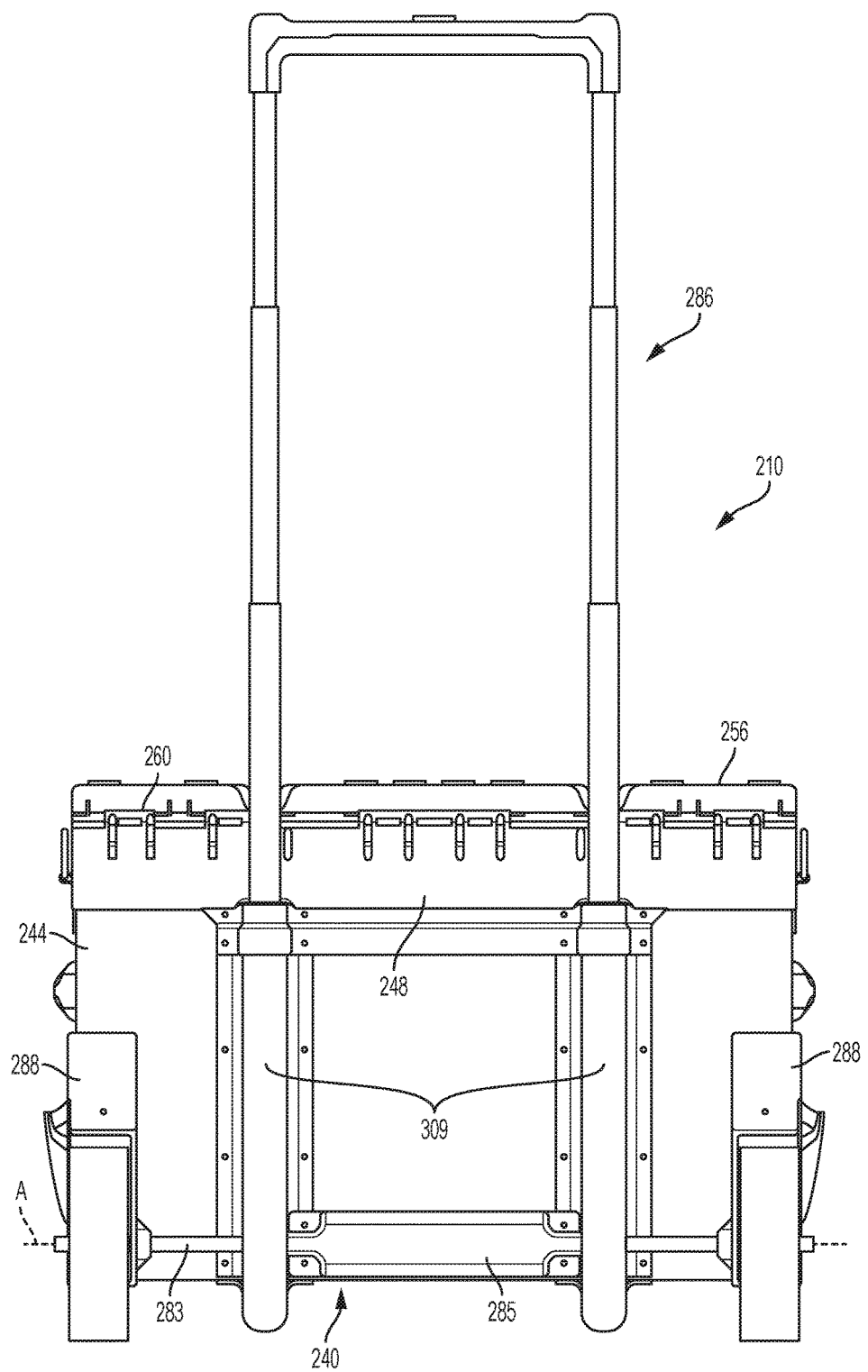
FIG. 4 is a rear view of the tool storage device of FIG. 1.

At a lower end, the wheel well portion 288 extends below the axis A. In the illustrated construction, the lower end of the wheel well portion 288 is about 15° below the axis A when the bag 210 is in an upright position (as shown in FIGS. 4-5). With the illustrated arrangement, when the bag 210 is tilted for normal travel (see FIG. 33), the lower end of the wheel well portion 288 will be below or at the height of the axis A. In other constructions, the lower end may be at a different angular position (e.g., below the axis A (about 10°, 20° below), at the level of the axis A, or above the axis A).

A gap or radial clearance 292 is defined between the wheel well portion 288 and the wheel 282. In the illustrated construction, the gap 292 has a varying width increasing from a lower gap opening 296 to an upper gap opening 300. With this arrangement, if debris enters the lower gap opening 296, it will not become wedged in the gap 292 but instead will be ejected through the upper gap opening 300 as the wheels 282 rotate.

In the illustrated construction, the lower gap opening 296 has a radial width of about 0.25 inches (e.g., the dimension of the tip of a tool, such as a screwdriver (not shown), to be inserted to dislodge any wedged debris), and the upper gap opening 300 has a radial width of about 0.8 inches. In other constructions, the lower gap opening 296 may have a radial width of no more than 0.5 inches (e.g., between about 0.1 inches and about 0.4 inches), and the upper gap opening 300 may be no more than about 1.0 inch. In other constructions (not shown), the gap 292 may not vary in width.

With reference to FIGS. 1-7, the bag 210 also includes a handle assembly 304 to facilitate maneuvering. The illustrated handle assembly 304 includes a pair of parallel support arms 308 telescopingly received by corresponding support arm receiving portions 309 of the frame assembly 240. In the illustrated construction, the axle support 285 is connected between the support arm receiving portions 309.

A handle portion with a gripping area 302 extends between the support arms 308 and is sized and shaped to receive a user's hand. Each support arm 308 includes telescoping support arm sections of decreasing cross-sectional area, and the handle assembly 304 is adjustable between an extended, use position (see FIGS. 1-7) and a retracted, stowed position (not shown).

In the extended position, the support arms 308 of the handle assembly 304 extend upwardly from the body 214, in a direction substantially parallel to the rear 226. In this position, the handle assembly 304 is at its maximum length and may be grasped by a user to facilitate tilting and rolling the bag 210 along a surface (e.g., the ground) in a direction transverse to the wheel axis A.

In the refracted position, the support arms 308 are collapsed into the support arm receiving portions 309 so that the handle assembly 304 (e.g., including the gripping area 302) does not extend above the top 230. The stowed position thus provides a relatively compact configuration in which the handle assembly 304 does not interfere with carrying the bag 210 (e.g., by the fabric handles 250), storing the bag 210, covering the bag 210 with the rain cover 278, use of the cover 254 to support an object, a work piece for working, a tool, etc.

With reference to FIG. 1A, each support arm 308 has a substantially rectangular cross section with first walls 312 oriented transverse to the rear 226 and to the axis A and second walls 316 oriented parallel to the rear 226 and to the axis A. The first walls 312 have a greater width than the pair of second walls 316. This arrangement provides increased strength, rigidity, etc. to the support arms 308 in a direction transverse to back side 226 and to the axis A where bending occurs while rolling the bag 210. This arrangement may also provide increased walking room clearance for a user while rolling the bag 210.

In the illustrated construction, the ratio of the width of the first walls 312 to the width of the second walls 316 is about 1.6:1 (e.g., the first walls 312 have a width of about 1.6 inches while the second walls 316 have a width of about 1 inch). In other words, the width of the first walls 312 is about 60% greater than the width of the second wall 316. In other constructions, the ratio of the width of the first walls 312 to the width of the second walls 316 may be between about 1.5:1 and about 4:1 (with the width of the first walls 312 being between about 50% and about 400% greater than the width of the second walls 316).

In the illustrated construction, the width 324 of the handle portion (in a direction parallel to the wheel axis A) is at least about 50% of the width 320 of the body 214. In the illustrated construction, the handle width 324 is about 12.5 inches, and the body width 320 is about 25 inches. Based on the body width 320 (e.g., between about 20 inches and about 30 inches) the handle width 324 may be between about 10 inches and about 17.5 inches or more.

Also, in the illustrated construction, a distance 328 between each side of the handle assembly 304 and a plane of the corresponding side 236 of the body 214 is no more than about 7 inches (e.g., about 6.25 inches). If the body width 320 is significantly wide (e.g., at least wider than 18 inches), then the distance 328 should be significantly narrow (e.g., no more than 7 inches (e.g., about 6 inches)) allowing a user's hand to fall naturally to the user's side while pulling the tool bag 210. This arrangement allows the user to walk outside the path of the tool bag 210, as shown in FIG. 33. In contrast (see FIG. 34), if the handle width 324 is too small relative to the body width 320 and/or the distance 328 is too large, the user will have to extend their arm and/or their feet or legs will collide with tool bag 210 while walking.

As described above, the illustrated frame assembly 240 includes the main frame portion 248, the axle support 285 and the support arm receiving portions 309, connected as a unit and connected to and providing support to the wall 244. The frame assembly 240 also includes the wheel well portions 288 connected through the axle 283 to the unit of the other frame portions 248, 285 and 309 and also connected to and providing support to the wall 244.

In other constructions (see, e.g., FIGS. 9-11), the frame assembly 240 and/or two or more of the components of the frame assembly 240 may be formed as an integral assembly.

In such constructions (see FIGS. 9-11), material may be removed to provide openings (e.g., as shown on the rear 226 and the bottom 234) to minimize the weight of the frame assembly 240 and the bag 210, to reduce the cost of materials of the bag 210, etc., while still providing the desired structural support for the wall 244 and the bag 210.

Figure 3:
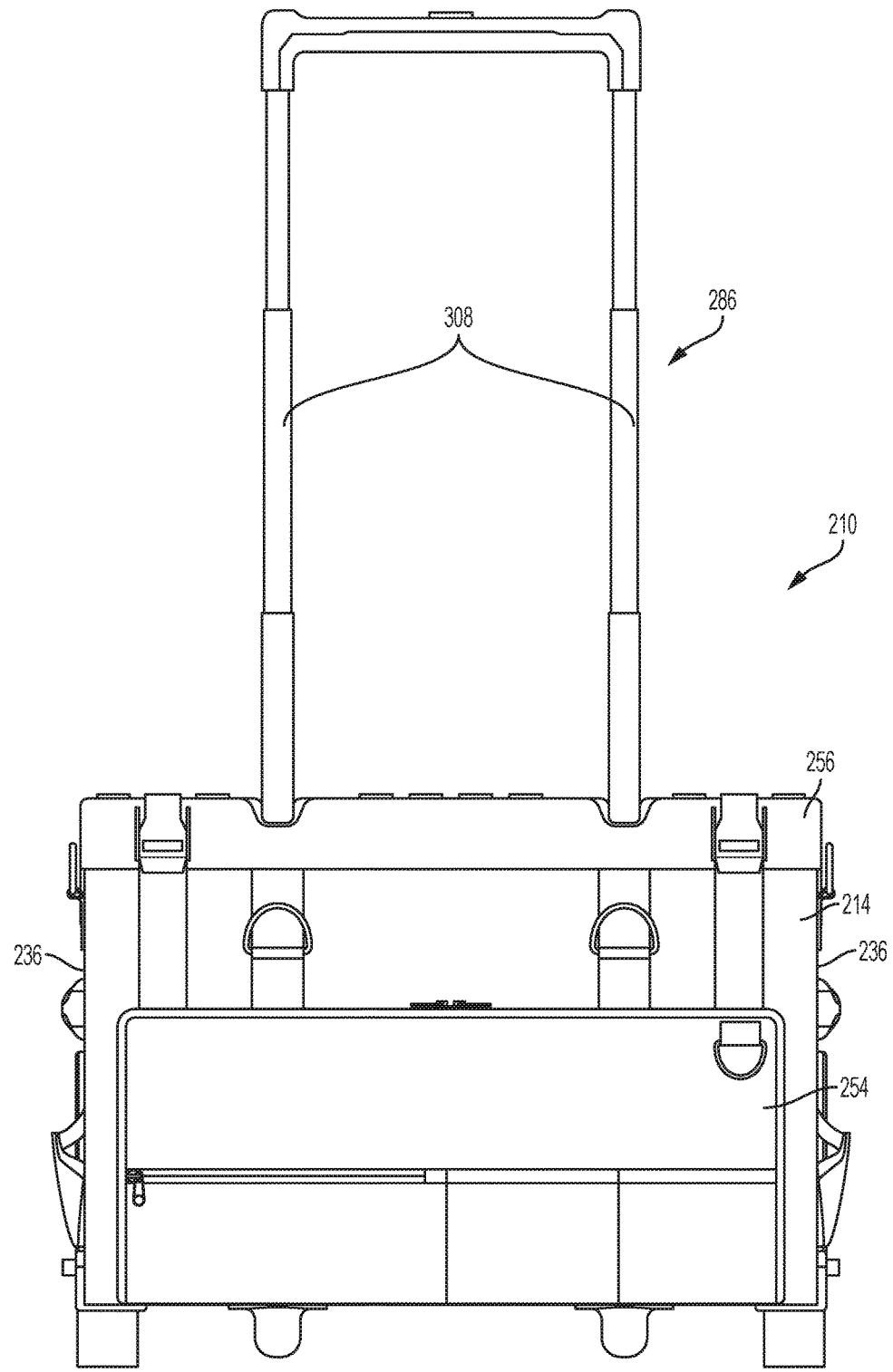
FIG. 3 is a front view of the tool storage device of FIG. 1.
Figure 7:
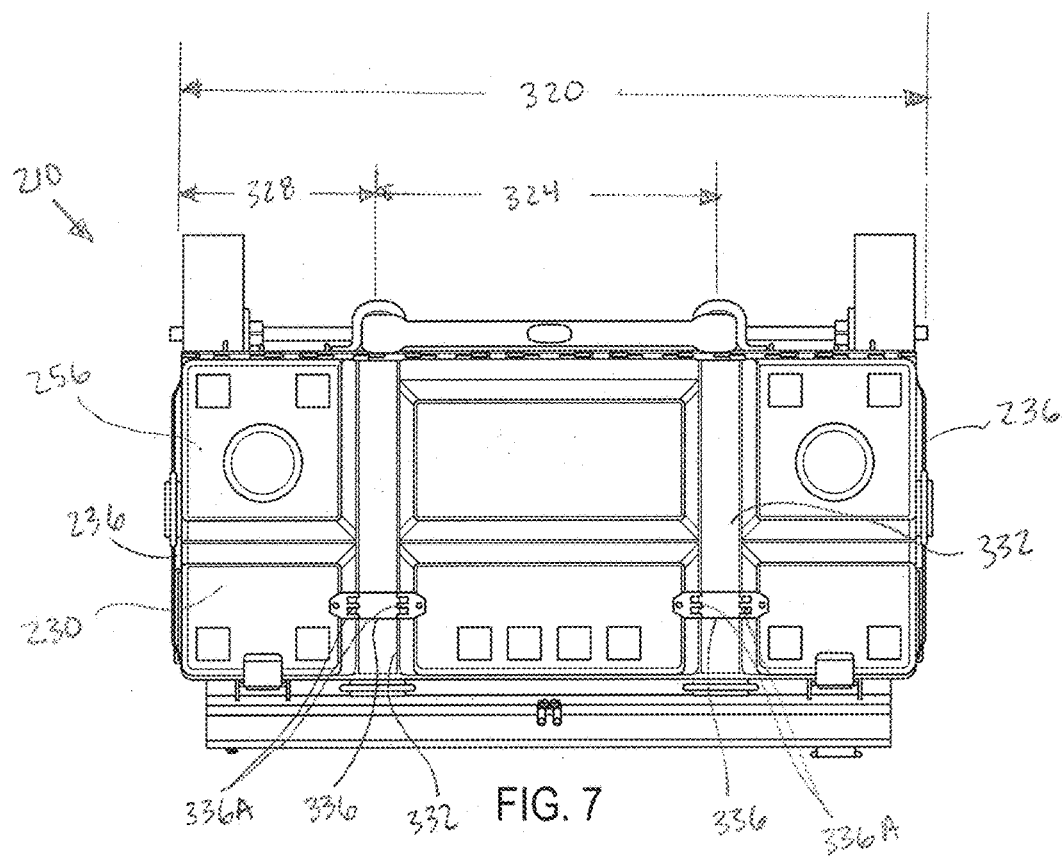
FIG. 7 is a top view of the tool storage device of FIG. 1.
Figure 8:
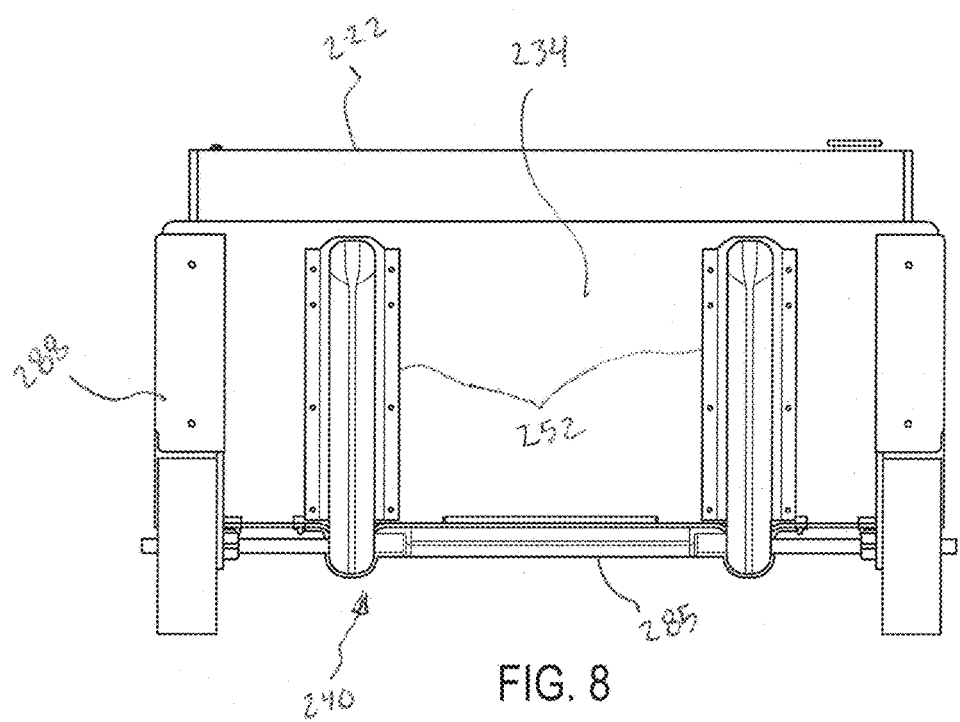
FIG. 8 is a bottom view of the tool storage device of FIG. 1.
Figure 18:
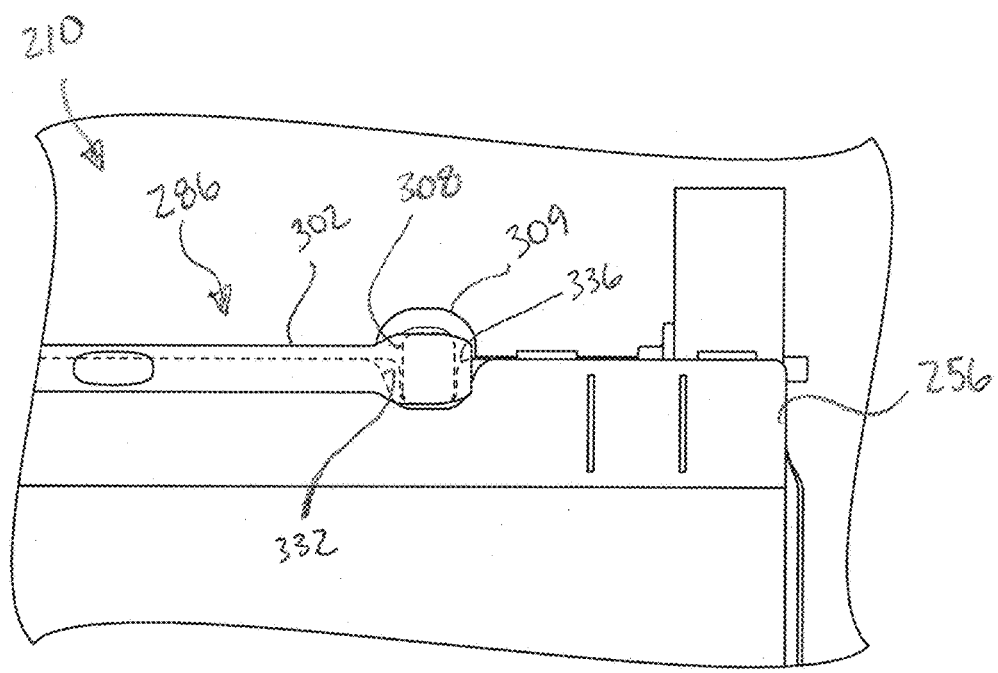
FIG. 18 is an enlarged view of a portion of the tool storage device of FIG. 1, illustrating the cover engaging the support arm.
Figure 19:
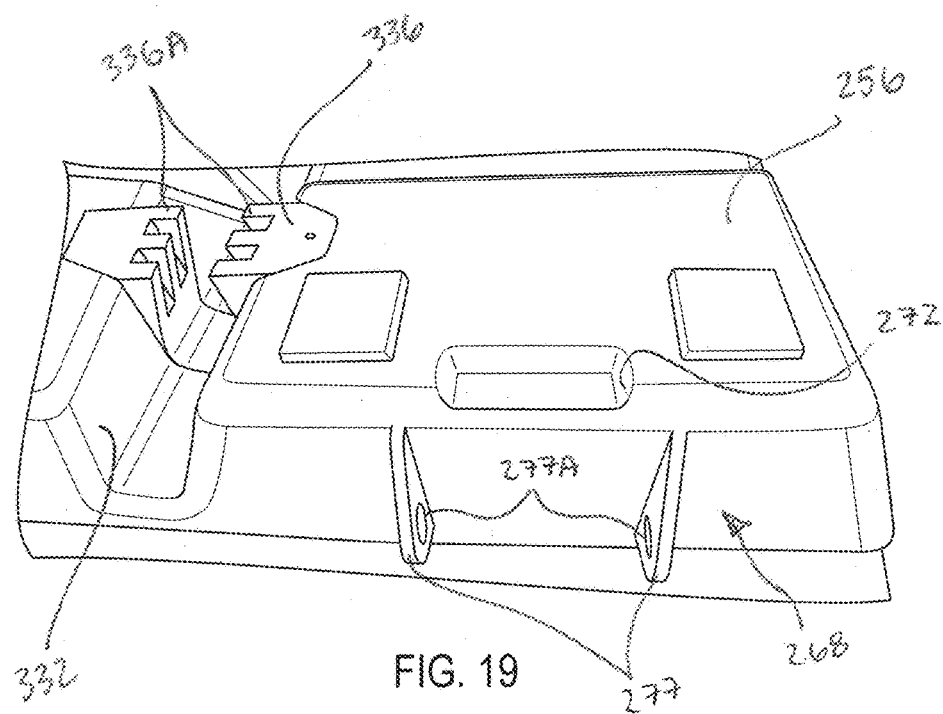
FIG. 19 is an enlarged front perspective view of a portion of the cover of the tool storage device of FIG. 1.

With reference to FIGS. 3, 7 and 17, the cover 256 defines a pair of grooves 332 extending transverse to the wheel axis A and configured, when the cover 256 is open and the handle assembly 304 is in the extended position, to receive the support arms 308. An insert 336 with resilient fingers 336A is positioned within each groove 332 to securely grasp the associated support arm 308 and releasably hold the cover 256 in the open position (see FIG. 18).

FIGS. 35-40 illustrate another embodiment of a tool storage device, such as a rolling bag 210A, similar to the bag 210. Common components have the same reference numbers with the letter "A", and only differences between the two embodiments will be described in detail.

Figure 35:
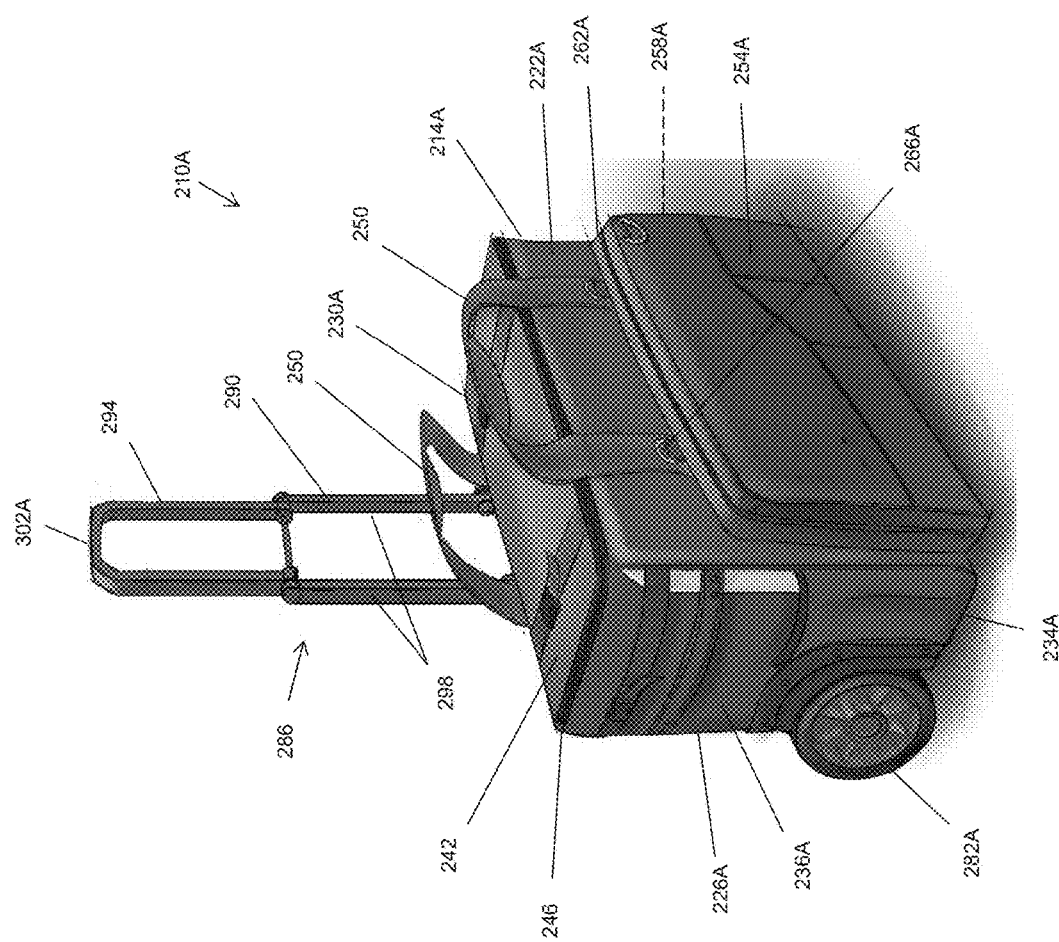
FIG. 35 is a front perspective view of an alternative construction of a tool storage device, such as a rolling bag.

With reference to FIGS. 35-36, the bag 210A includes an openable flap or soft cover 242 on the top 230A to provide access to the storage space 218A. A zipper 246 (e.g., a waterproof zipper) can secure the flap 242 closed against the body 214. The zipper 246 is located at the perimeter of the top 230A so that there is no loss of interior capacity when the flap 242 is closed. Although illustrated as a zipper 246, another suitable closure mechanism (e.g., snaps, buttons, buckles, other fasteners) may be used. One or more other panels of the bag 210A may be adapted to provide access to the interior storage space 218A. The soft cover 242 may include internal frame for carrying a load on top, as described above with the cover 256.

Two handles 250 are affixed to the body 214A of the bag 210A at an upper portion. The illustrated handles 250 are made of a fabric material, such as nylon, stitched to the body 214A. Alternatively, the handles 250 may be affixed to the body 214A by rivets, adhesive, or other suitable means. In some embodiments, the handles 250 may include a plastic, rubber, or elastomeric overlay to facilitate grasping and carrying the bag 210A.

As shown in FIG. 36, the bag 210A further includes a removable laptop sleeve 238 for storing a laptop, tablet, etc. As illustrated in FIG. 40, the rings 266A provide mounting points for bungee cords 270 or other straps, allowing external items 274 to be secured to the top of the bag 210A.

With reference to FIG. 37, a rain cover 278 can be deployed to substantially cover the bag 210A. The rain cover 278 is made of a substantially impermeable material to protect the bag 210A and its contents from water. When not in use, the rain cover 278 is stored within a pocket (e.g., a zip pocket (not shown)) located on the rear 226A. In some embodiments, a portion of the rain cover 278 may be affixed to the pocket so that the rain cover 278 is not entirely removed from the bag 210A when deployed.

With reference to FIG. 38, a skid plate 284, made of metal, impact-resistant plastic (e.g., ABS), or another suitably durable material, is disposed between the wheels 282A on the rear 226A. The skid plate 284 provides protection against abrasion and debris impacts when the bag 210 is rolled in the direction of arrow X.

With reference to FIGS. 35-39, the bag 210A includes a folding handle 286, rather than the telescoping handle assembly 304 of FIGS. 1-6. The handle 286 is pivotable between an upright position (see FIG. 35), a stowed position (see FIG. 38), and a securing position (see FIG. 39).

The handle 286 includes a first portion 290 pivotally coupled to the body 214 and a second, generally U-shaped portion 294 pivotally coupled to the first portion 290 at a distal end. The first portion 290 includes a pair of parallel arms 298. The second portion 294 is received between the arms 298 and provides a gripping area 302A sized and shaped to receive a user's hand. The first portion 290 of the handle 286 is pivotable relative to the body 214 about a first axis 306, and the second portion 294 is pivotable relative to the first portion 290 about a second axis 310 parallel to and offset from the first axis 306.

In the upright position (see FIG. 35), the first and second portions 290, 294 of the handle 286 extend upward from the body 214A, in a direction substantially parallel to the rear 226. The second portion 294 extends beyond the first portion 290 such that the handle 286 is at its maximum length and may be grasped by a user to facilitate tilting and rolling the bag 210A along a surface. As shown in FIG. 39, a removable storage insert 314 may be coupled to handle 286 between the spaced arms 298 of the first portion 290 to provide barrel tool storage when the handle 286 is in the upright position.

In the stowed position (see FIG. 38), the first portion 290 is pivoted downward to be parallel to and adjacent the rear 226A. The second portion 294 nests within the first portion 290 such that the handle 286 does not extend beyond the top 230A. The stowed position thus provides a relatively compact configuration where the handle 286 does not interfere with carrying the bag 210A (e.g., by the fabric handles 250), storing the bag 210A, covering the bag 210A with the rain cover 278, supporting an object, work piece or tool on top, etc.

In the securing position (a second stowed position; see FIG. 39), the first portion 290 is pivoted to substantially span the flap 242 and the top 230A of the body 214A. The second portion 294 is pivoted downwardly to overlie the front 222A of the body 214A. In this position, the handle 286 may act as a rigid frame, allowing the user to stack additional bags or other items on top of the bag 210A while protecting the contents of the bag 210A from the weight. In this position, the handle 286 may provide mounting points for securing bags or other items, may secure the contents of the bag 210A, limiting access through the flap 242 or to the front panel 254A, etc.

FIGS. 20-27 illustrate another embodiment of a tool storage device, such as a rolling bag 210B, similar to the bag 210, 210A. Common components have the same reference numbers with the letter "B", and only differences between the two embodiments will be described in detail.

The tool storage device 210B includes a soft cover 242B substantially similar to the soft cover 242 of the tool storage device 210A shown in FIGS. 35-40. In the illustrated construction, the handle width 324B is between about 60% and 80% (e.g., about 70%) of the body width 320B. The distance 328B defined between each side of the handle and the plane of the corresponding side 236B is between about 10% and 20% (e.g., about 15%) of the body width 320B. Similar to the bag 210 of FIGS. 1-8, the body width 320B is significantly wider than the distance 328B in order for a user's hand to fall naturally to the user's side while pulling the tool bag 210B by the handle assembly 304B.

Figure 9:
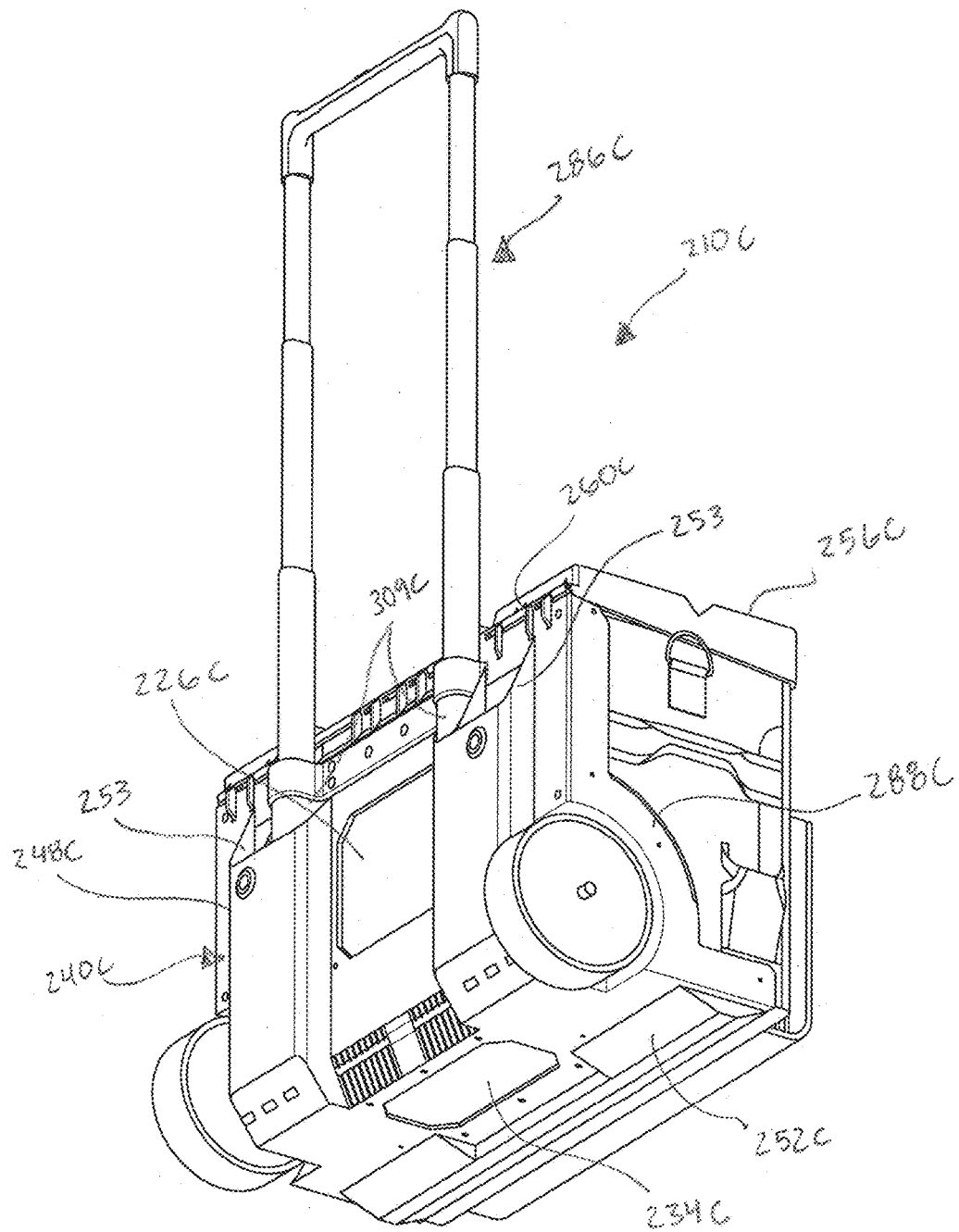
FIG. 9 is a rear perspective view of an alternative construction of a tool storage device, such as a rolling bag.
Figure 10:
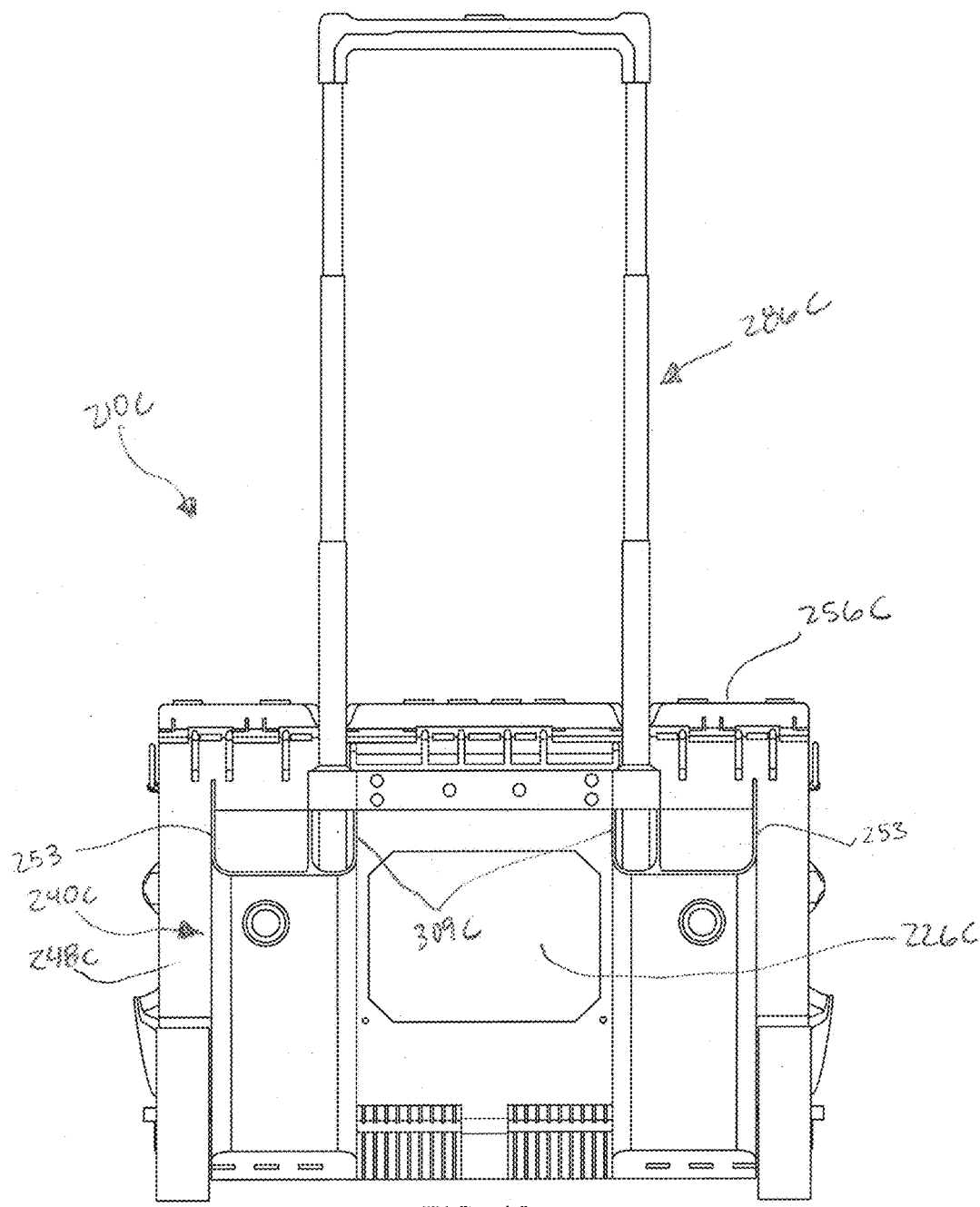
FIG. 10 is a rear view of the tool storage device of FIG. 9.
Figure 11:
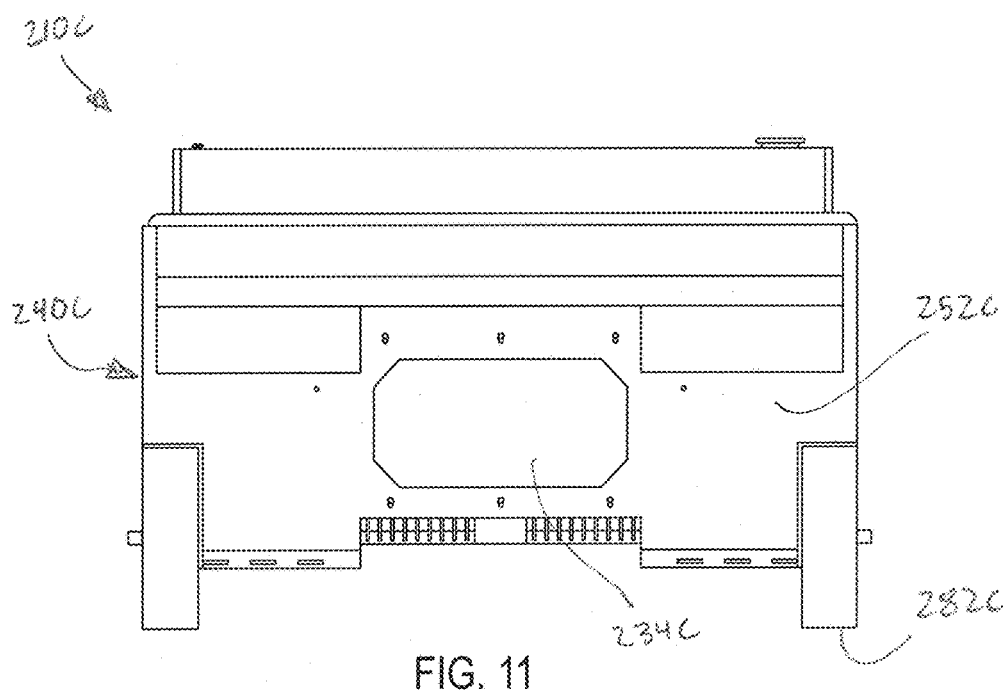
FIG. 11 is a bottom view of the tool storage device of FIG. 9.
Figure 12:
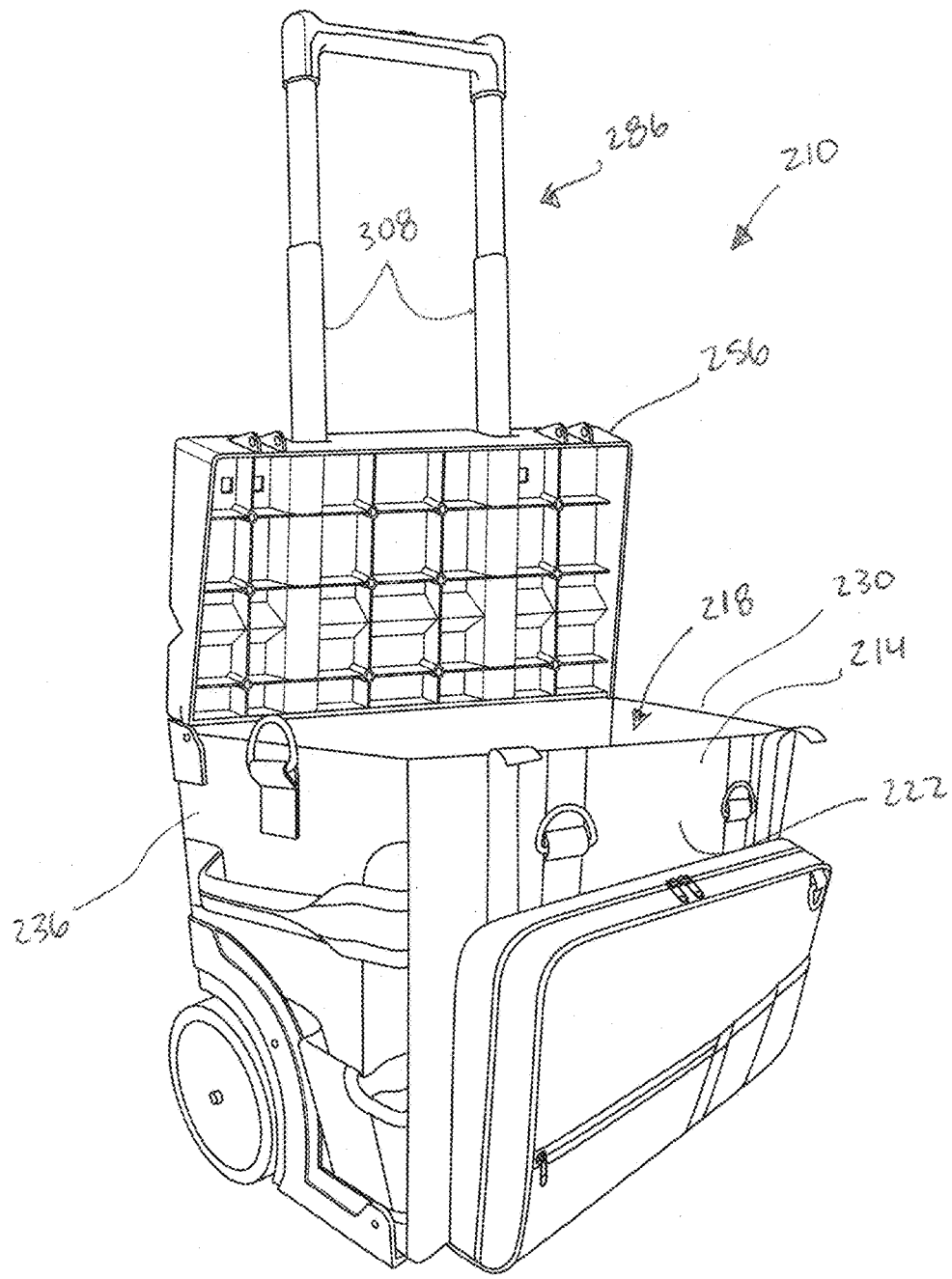
FIG. 12 is a front perspective view of the tool storage device of FIG. 1 with the cover open.
Figure 13:
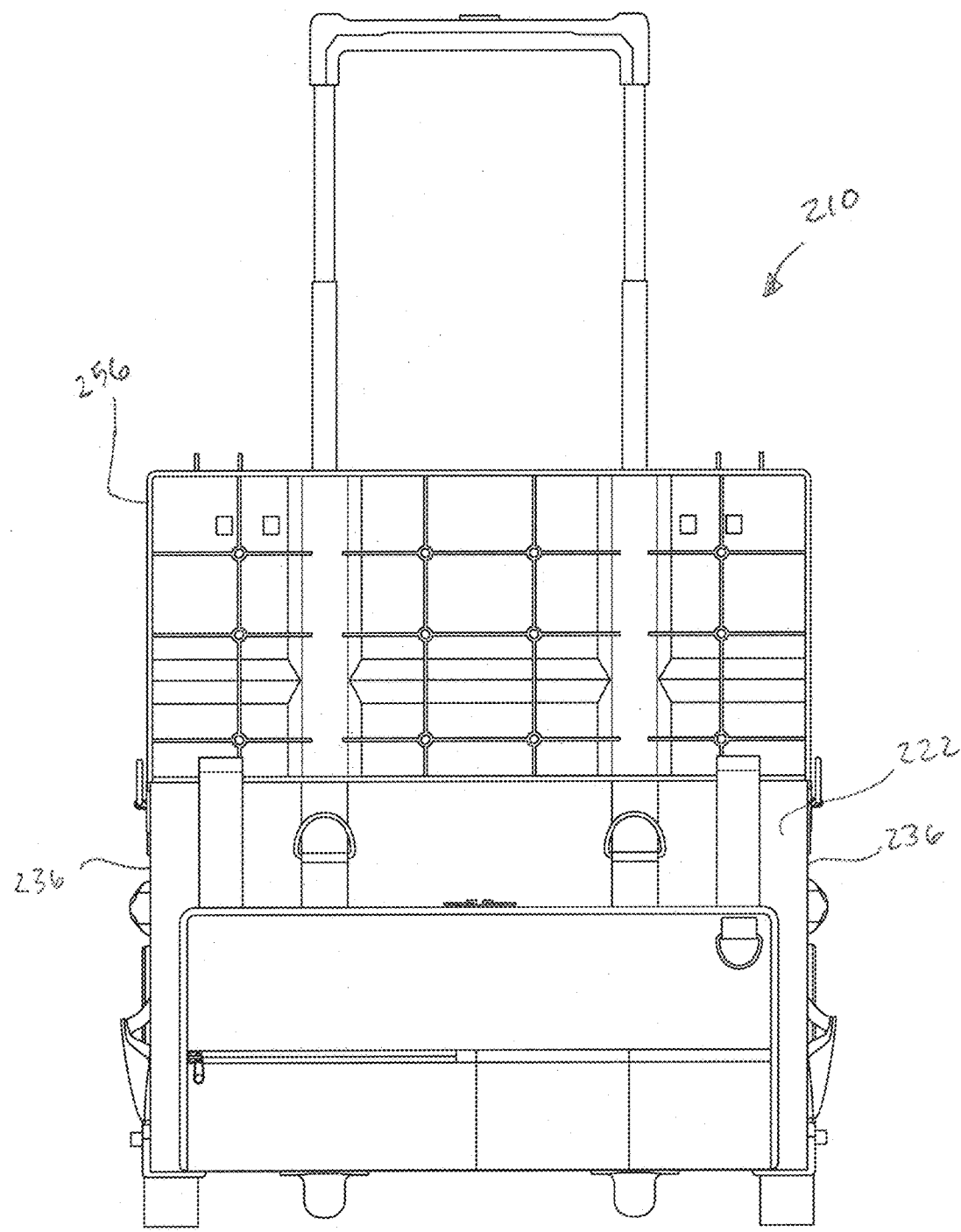
FIG. 13 is a front view of the tool storage device as shown in FIG. 12.
Figure 14:
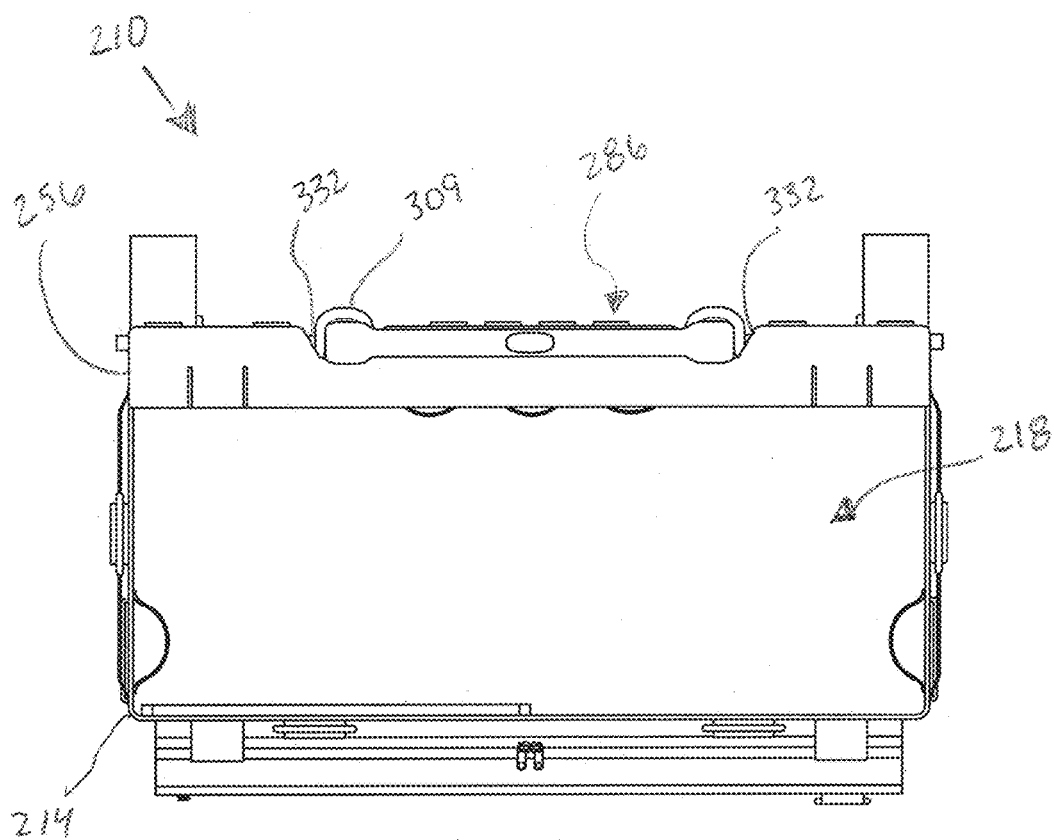
FIG. 14 is a top view of the tool storage device as shown in FIG. 12.
Figure 28:
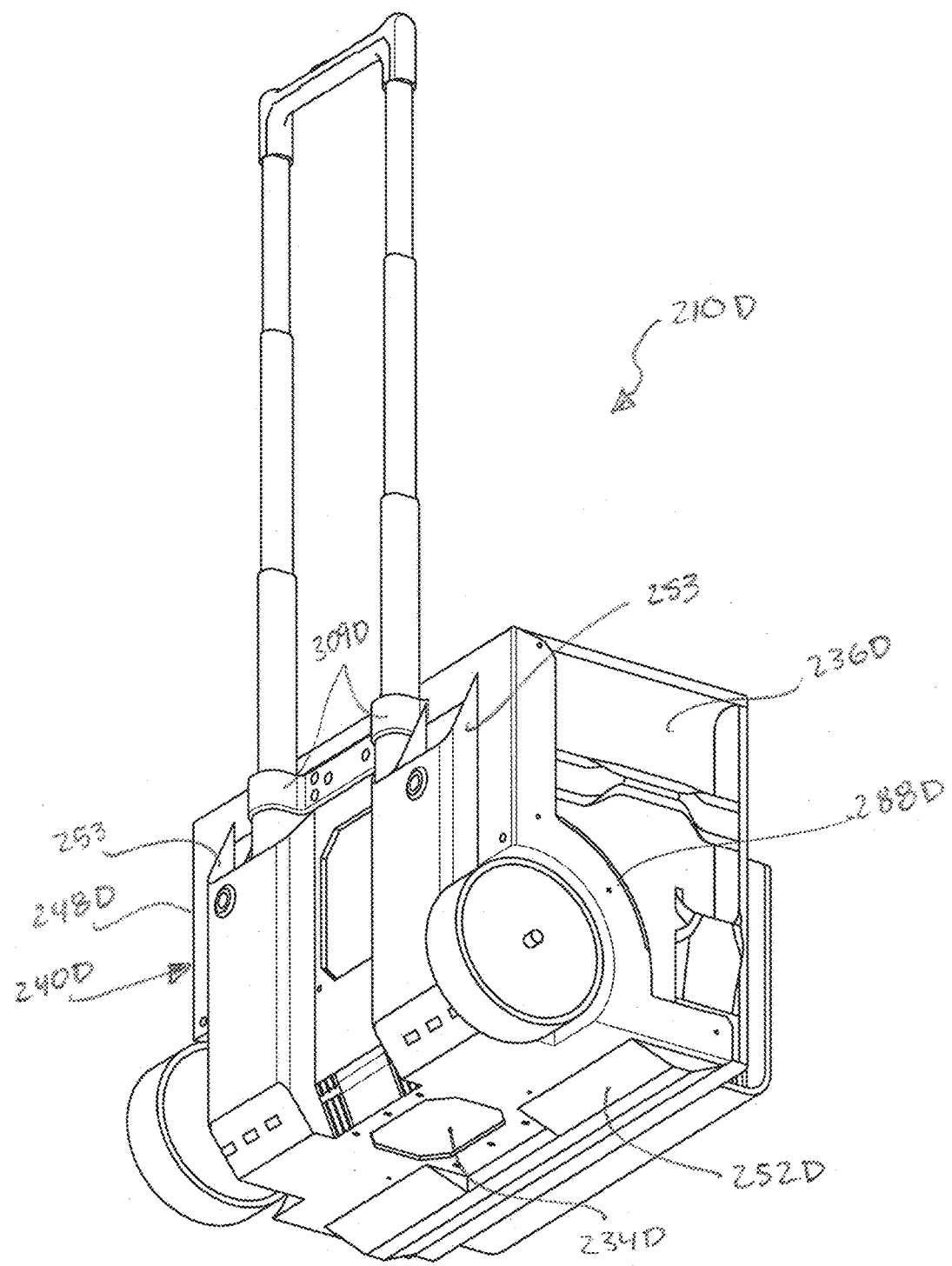
FIG. 28 is a rear perspective view of yet another alternative construction of a tool storage device, such as a rolling bag.
Figure 29:
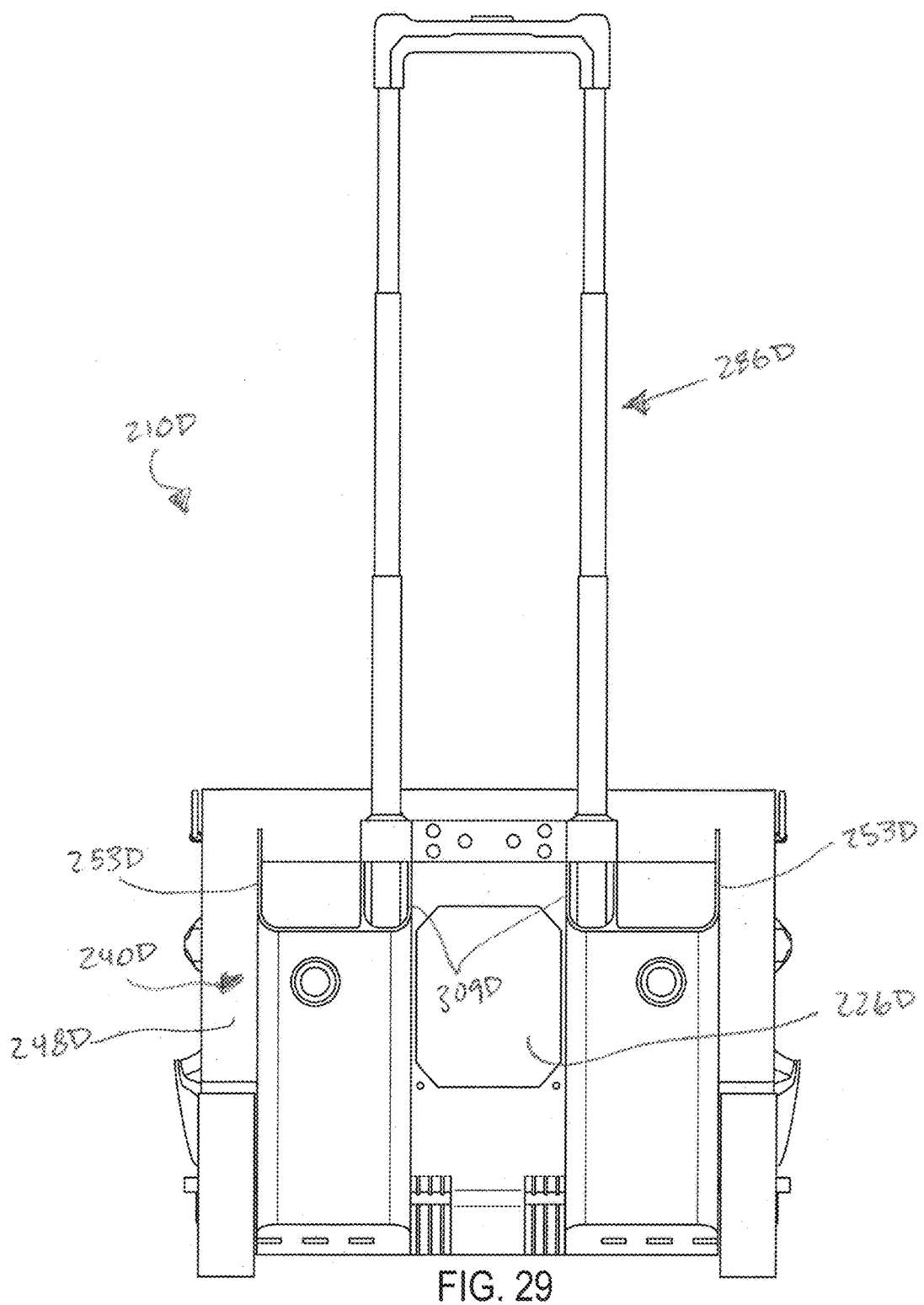
FIG. 29 is a rear view of the tool storage device of FIG. 28.
Figure 30:
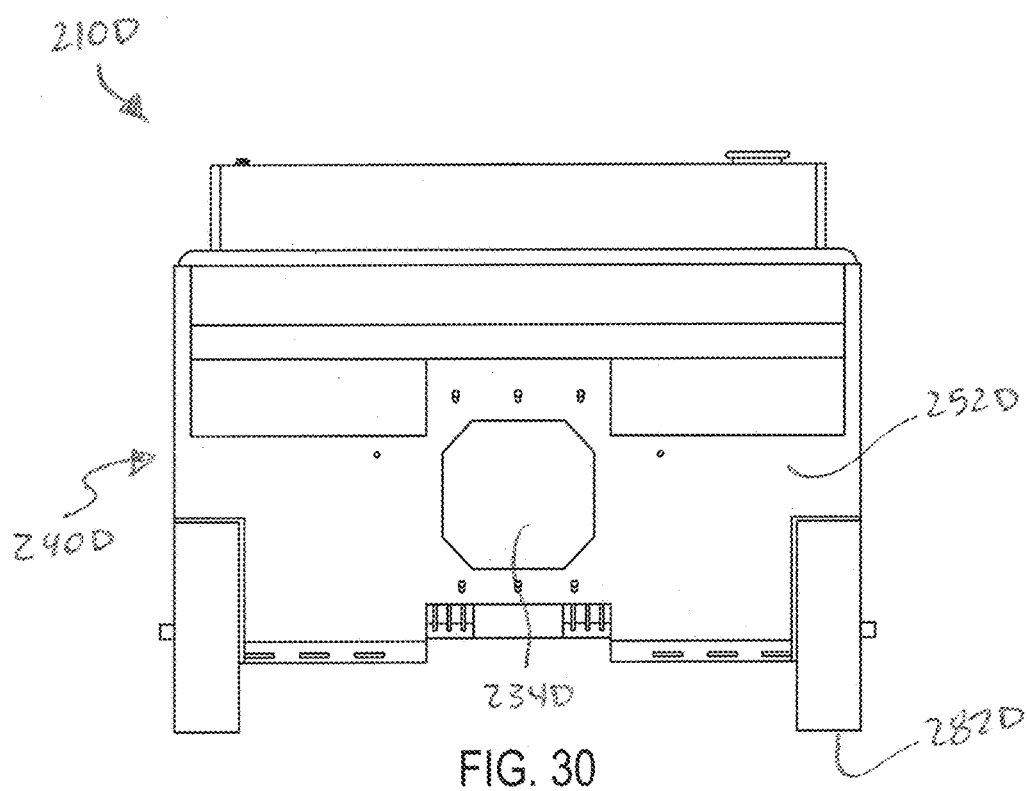
FIG. 30 is a bottom view of the tool storage device of FIG. 28.
Figure 31:
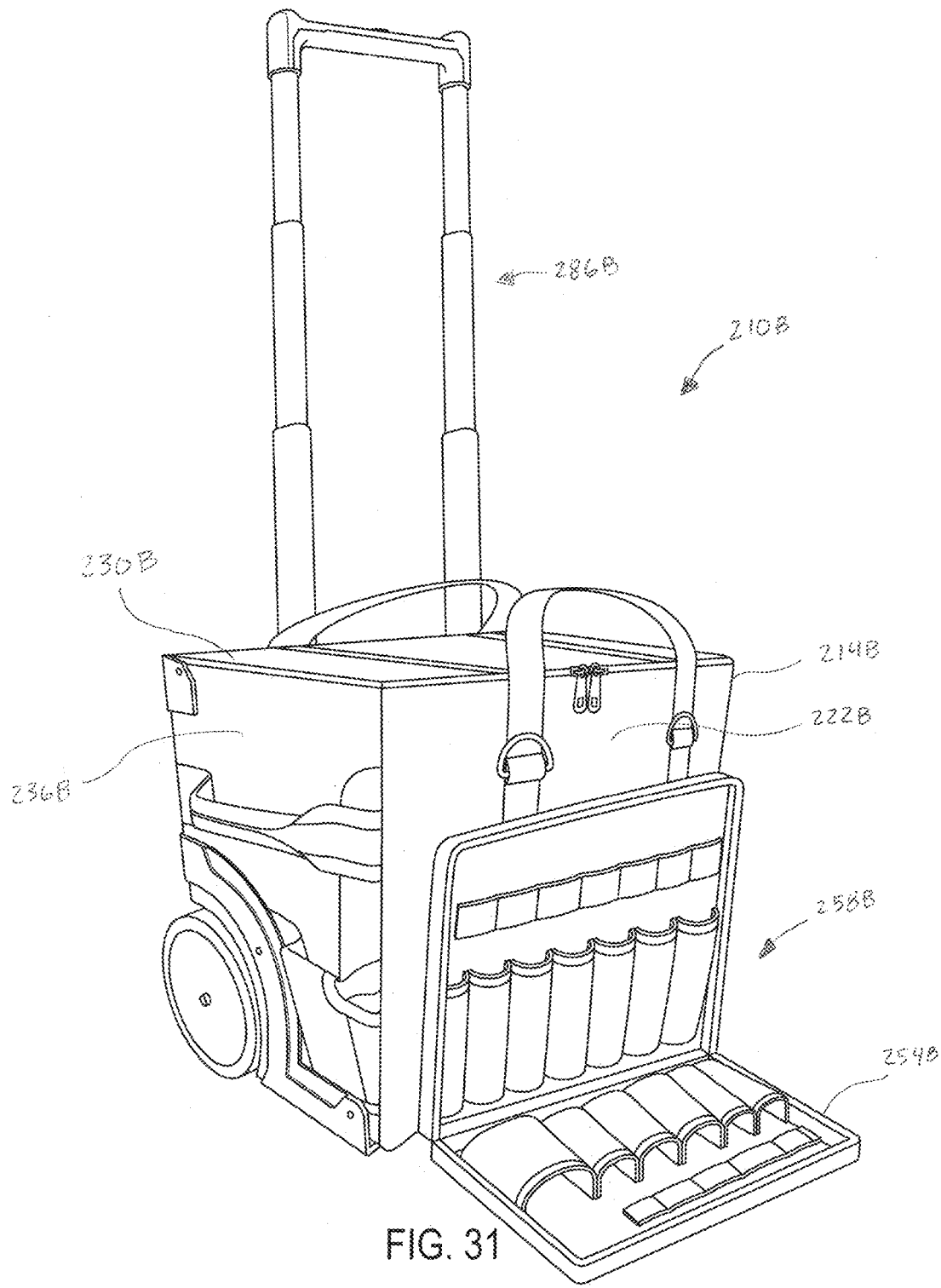
FIG. 31 is a front perspective view of the tool storage device of FIG. 28 with the front panel open.
Figure 32:
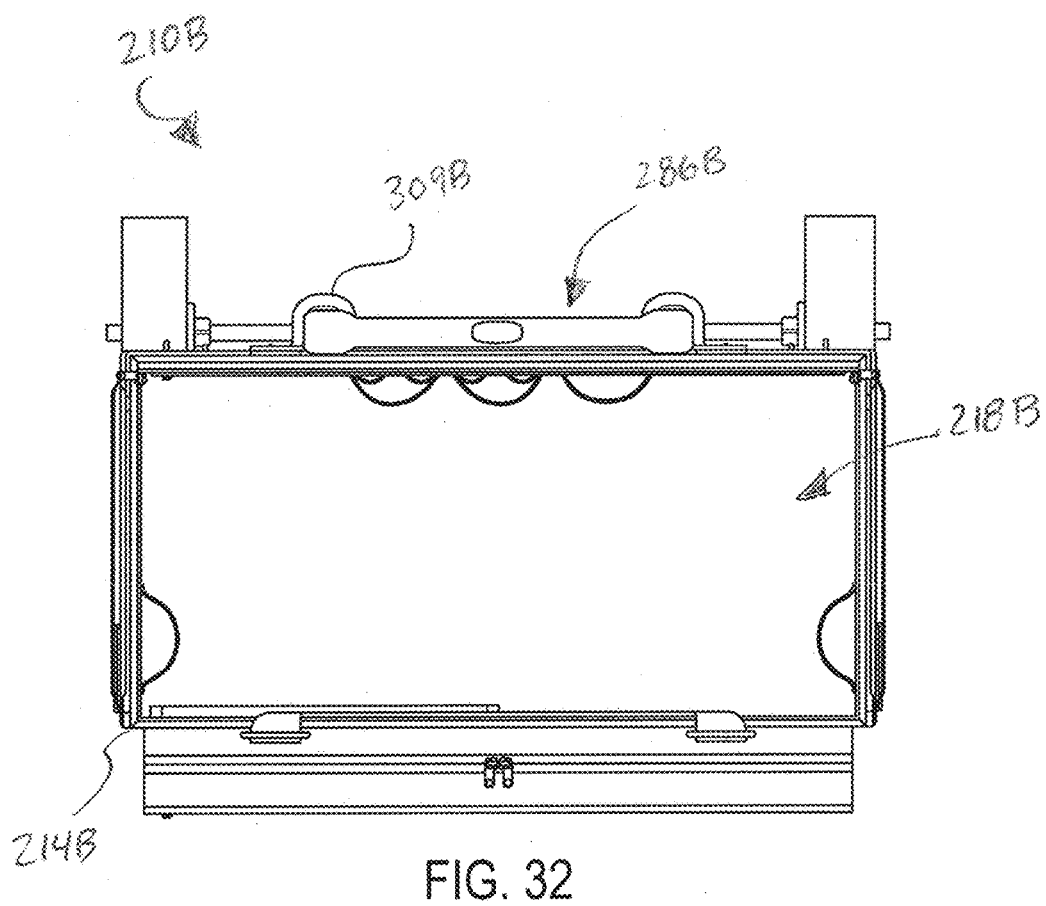
FIG. 32 is a top view of the tool storage device of FIG. 28 with the top cover open.

In an alternate embodiment (see FIGS. 28-30 in which common components have common reference numbers with a letter "D"), a tool storage device, such as a rolling bag 210D, includes a frame assembly 240D, substantially similar to the frame assembly 240C of the rolling bag 210C shown in FIGS. 9-11.

FIGS. 41-47 illustrate a tool storage device, such as a portable tool bag 10, transportable between and around worksites (e.g., construction sites, garages, etc.) and capable of storing tools and accessories in an organized manner.

With reference to FIGS. 42-47, the tool bag 10 includes a soft-sided body 14 defining an interior storage space 18. The storage space 18 is generally sized and shaped to receive a laptop computer, tablet, or other portable electronic device (not shown). Padding (e.g., ethyl vinyl acetate (EVA)-based foam, polyurethane-based foam, neoprene, etc.) may be included in one or more walls of the body 14 to provide additional protection for the portable electronic device(s). The storage space 18 includes a pocket 22 particularly suited for storing a power supply (e.g., an AC adapter) of the portable electronic device. A pass-through opening 26 allows a cord 30 from the power supply to extend through the body 14, enabling the power supply to be plugged into an external power outlet, such as a wall outlet, USB port, 12-volt outlet, etc., while the power supply remains stored in the pocket 22. The opening 26 may include one or more sleeves, covers, or other water-proofing features to inhibit the ingress of water, dust, or debris through the opening 26.

With continued reference to FIGS. 42-47, the bag 10 includes a flap 34 that may be opened to provide access to the storage space 18. A zipper (e.g., a waterproof zipper) can secure the flap 34 closed against the body 14 of the bag 10. The zipper is located at the perimeter of the bag top so there is no loss of interior capacity when the flap 34 is closed. In other embodiments, another suitable closure mechanism (e.g., snaps, buttons, buckles, other fasteners) may be used. One or more other panels of the bag 10 may be adapted to provide access to the storage space 18. In the illustrated embodiment, an inner side of the flap 34 includes zippered accessory pockets 38 for storing small items.

Figure 41:
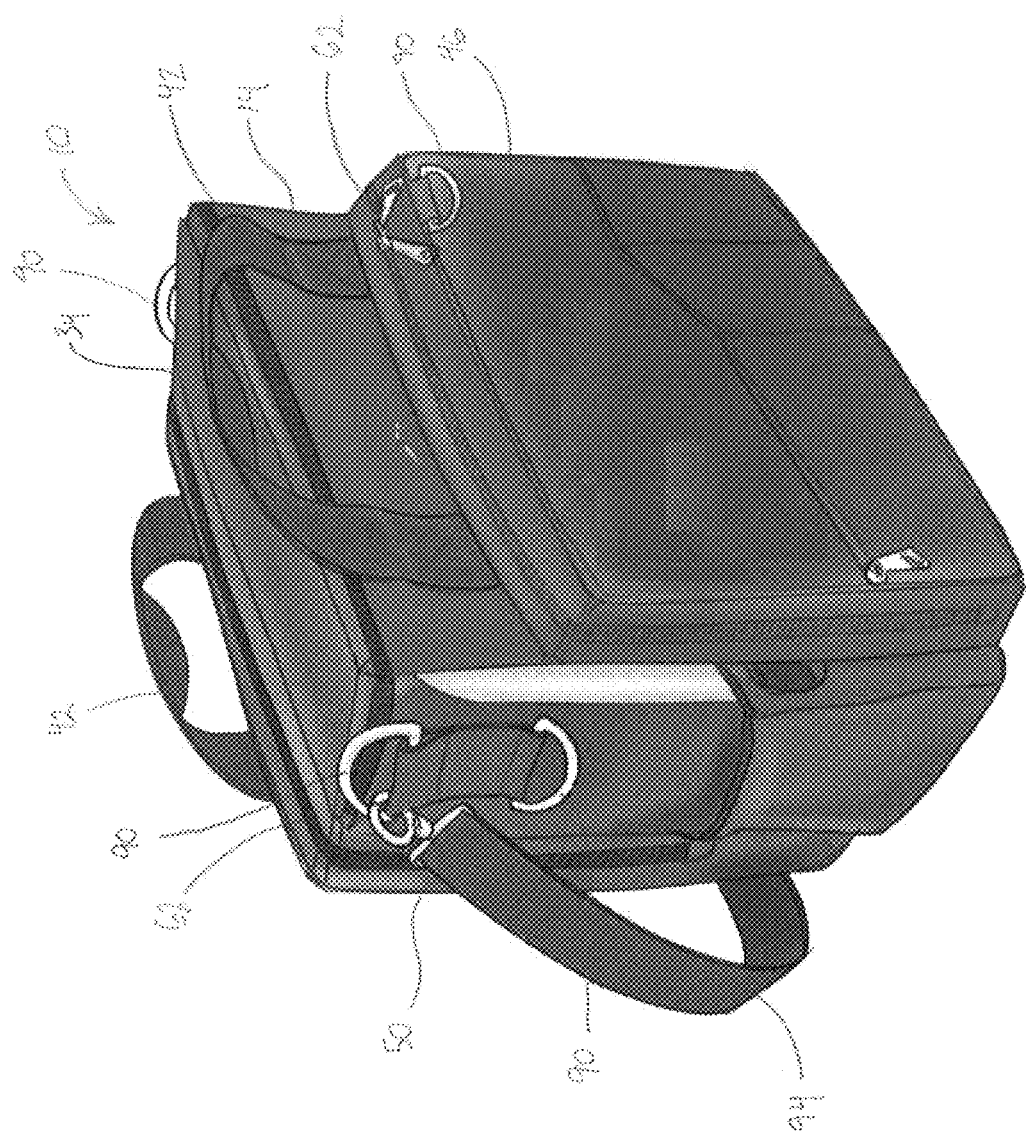
FIG. 41 is a front perspective view of another tool storage device, such as a tech bag.

Referring also to FIG. 41, two handles 42 are affixed to the body 14 of the bag at an upper portion thereof. The illustrated handles 42 are made of a fabric material, such as nylon, stitched to the body 14. Alternatively, the handles 42 may be affixed to the body 14 by rivets, adhesive, or other suitable means. In some embodiments, the handles 42 may include a plastic, rubber, or elastomeric overlay to facilitate grasping and carrying the bag 10.

The bag 10 further includes openable front and rear panels 46, 50 providing additional storage spaces 54, 58. Each panel 46, 50 includes a zipper 62 (e.g., a waterproof zipper) about three sides to permit exposure of the respective front and rear storage spaces 54, 58. When the front panel 46 is unzipped, the front storage space 54 is accessible to insert or remove tools and accessories. Likewise, when the rear panel 50 is unzipped, the rear storage space 58 is accessible to insert or remove tools and accessories. Each storage space 54, 58 includes a plurality of pockets to receive different types of tools, bits, or other devices.

As shown in FIG. 47, the illustrated bag 10 also includes a removable tool organizer 66 received within the front storage space 58. The tool organizer 66 is a generally planar panel including a plurality of pockets to receive different types of tools, bits, or other devices. The tool organizer 66 is removably mounted within the front storage space 58 by openings 70 that receive rivets, hooks, bosses, or other projections. The organizer 66 can be made primarily of fabric, plastic, or a combination thereof. In the illustrated embodiment, the organizer 66 includes a rigid or semi-rigid base portion 74 to allow the organizer 66 to stand on its own when removed from the front storage space 58.

With reference to FIG. 40, the bag 10 further includes a rain cover 78 that can be deployed to substantially cover the bag 10. The rain cover 78 is made of a substantially impermeable material to protect the bag 10 and its contents from water. When not in use, the rain cover 78 is stored within a pocket 82 (e.g., a zip pocket) located on the rear panel 50. In some embodiments, a portion of the rain cover 78 may be affixed to the pocket 82 so that the rain cover 78 is not entirely removed from the bag 10 (FIG. 39).

With reference to FIG. 36, an elongate pocket 86 extends along the rear panel 50 for holding a relatively long tool, such as a hacksaw (not shown). The elongate pocket 86 provides easy and quick accessibility to the long tool.

Figure 51:
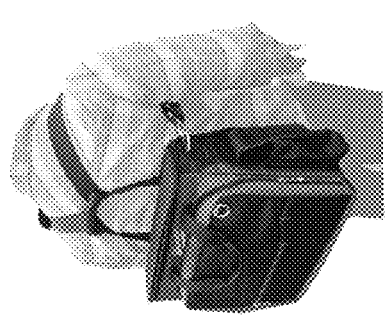
FIG. 51 is a front perspective view of the tool storage device of FIG. 48, illustrating the tool storage device being carried by backpack straps.
Figure 50:
FIG. 48-50 are views of an alternative construction of a tool storage device, such as a tech bag.
Figure 49:
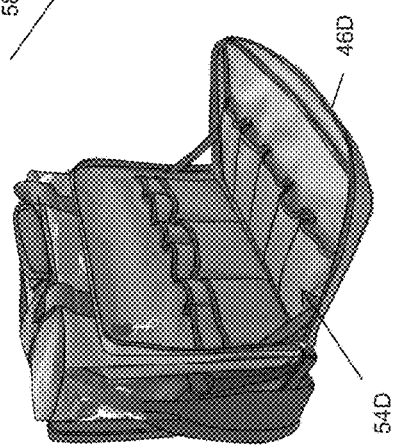
Figure 48:
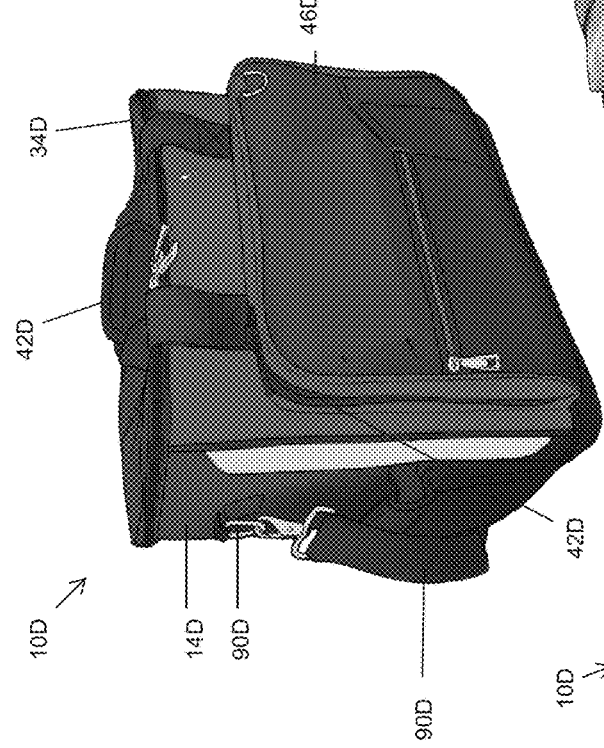
Figure 52:
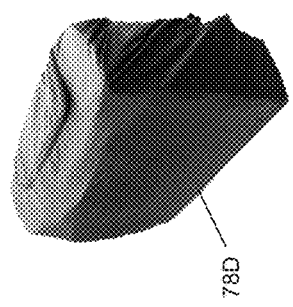
FIG. 52 is a perspective view of the tool storage device of FIG. 48, illustrating a rain cover.
Figure 53:
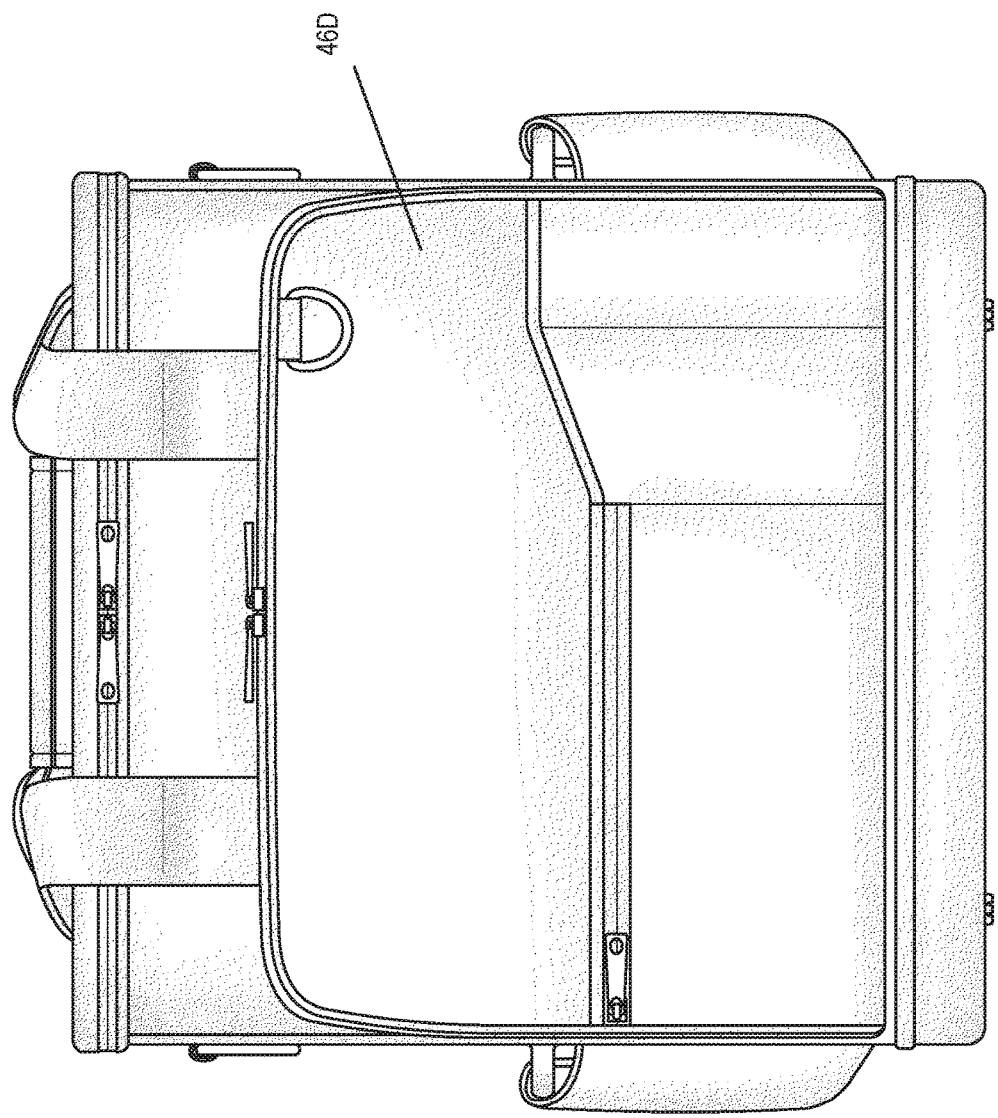
FIG. 53-58 are additional views of the tool storage device of FIG. 48.
Figure 54:
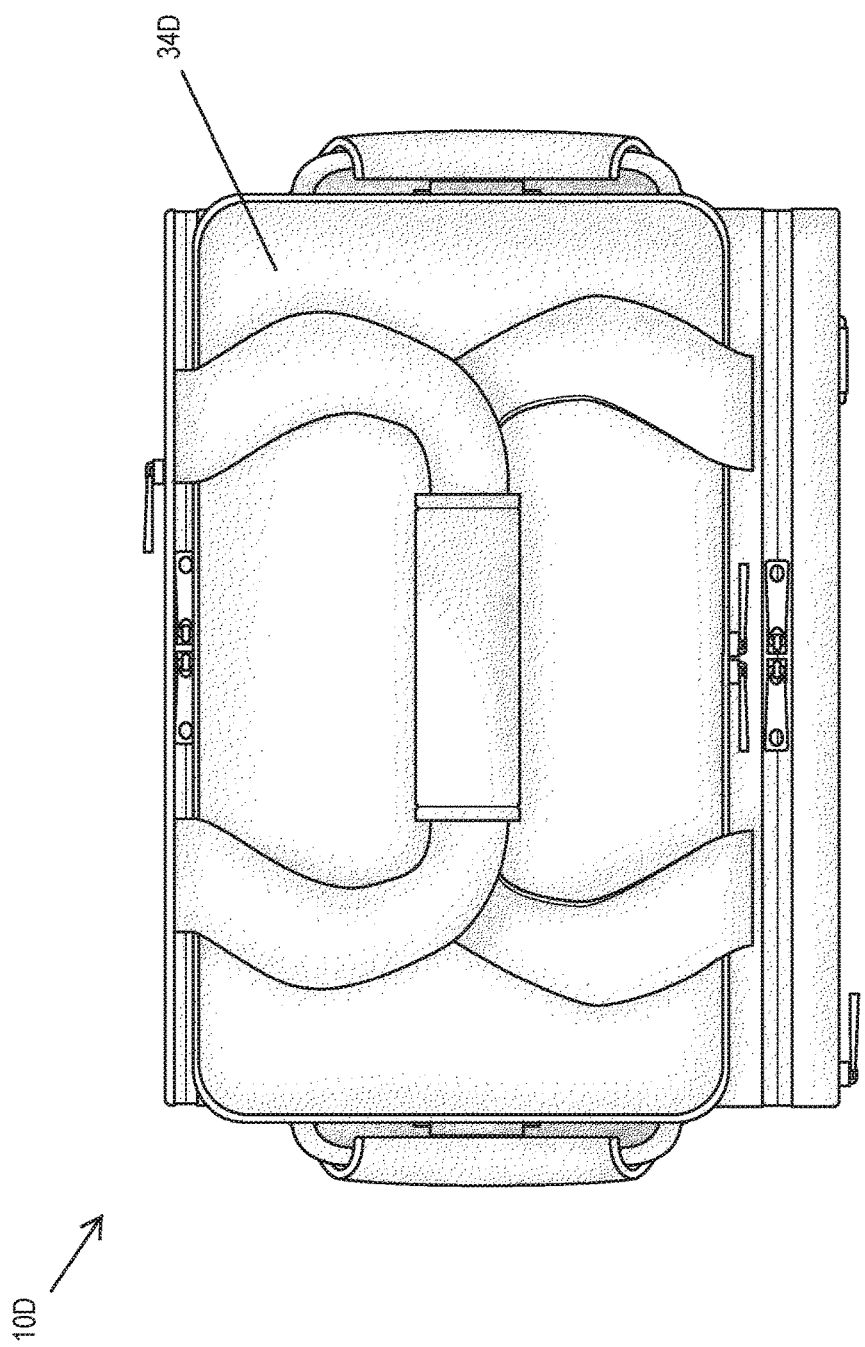
Figure 55:
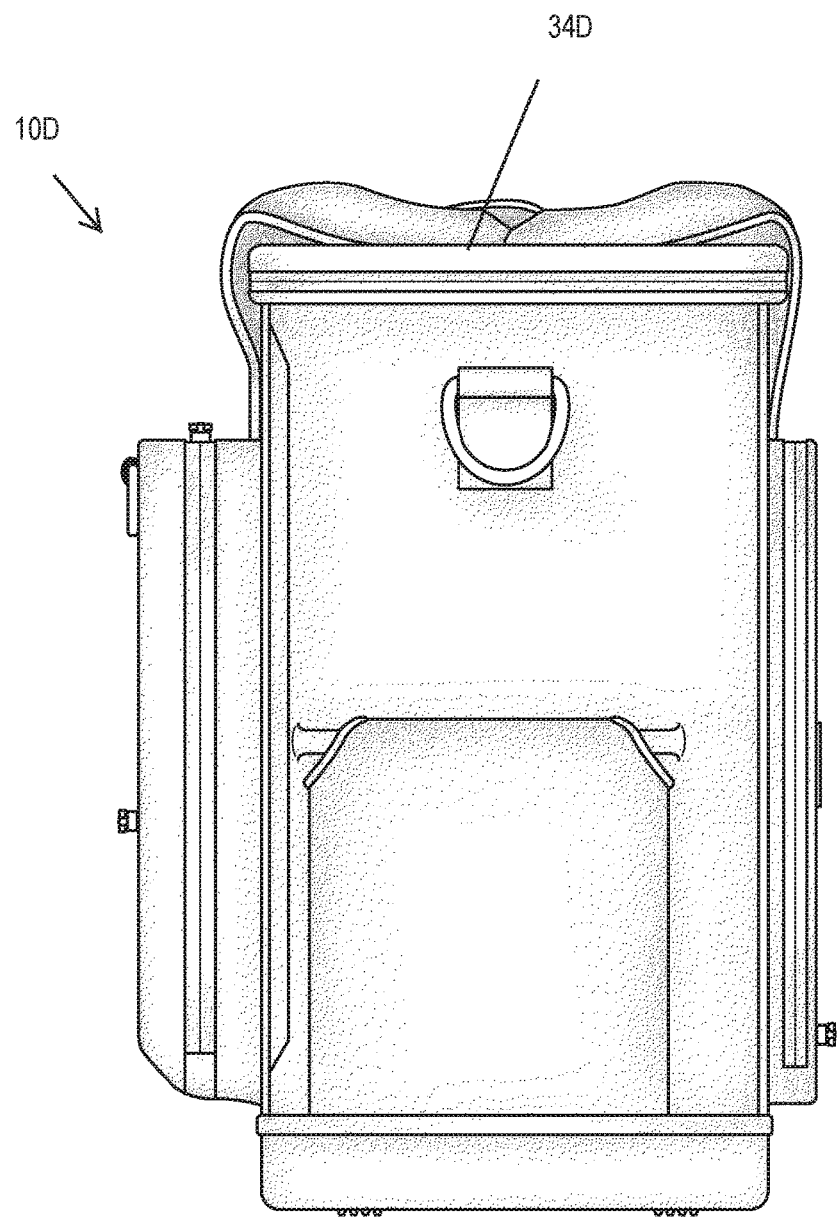
Figure 56:
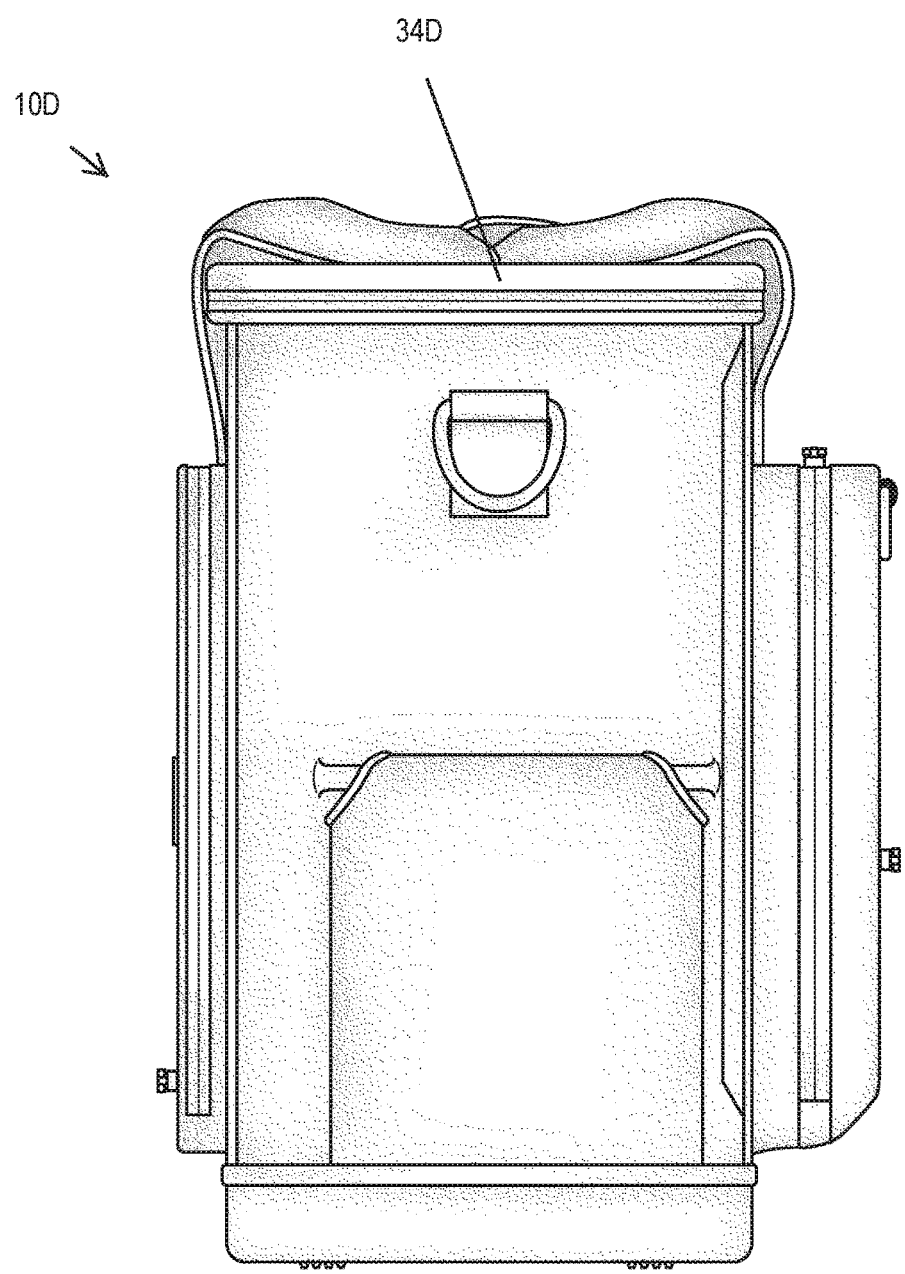
Figure 57:
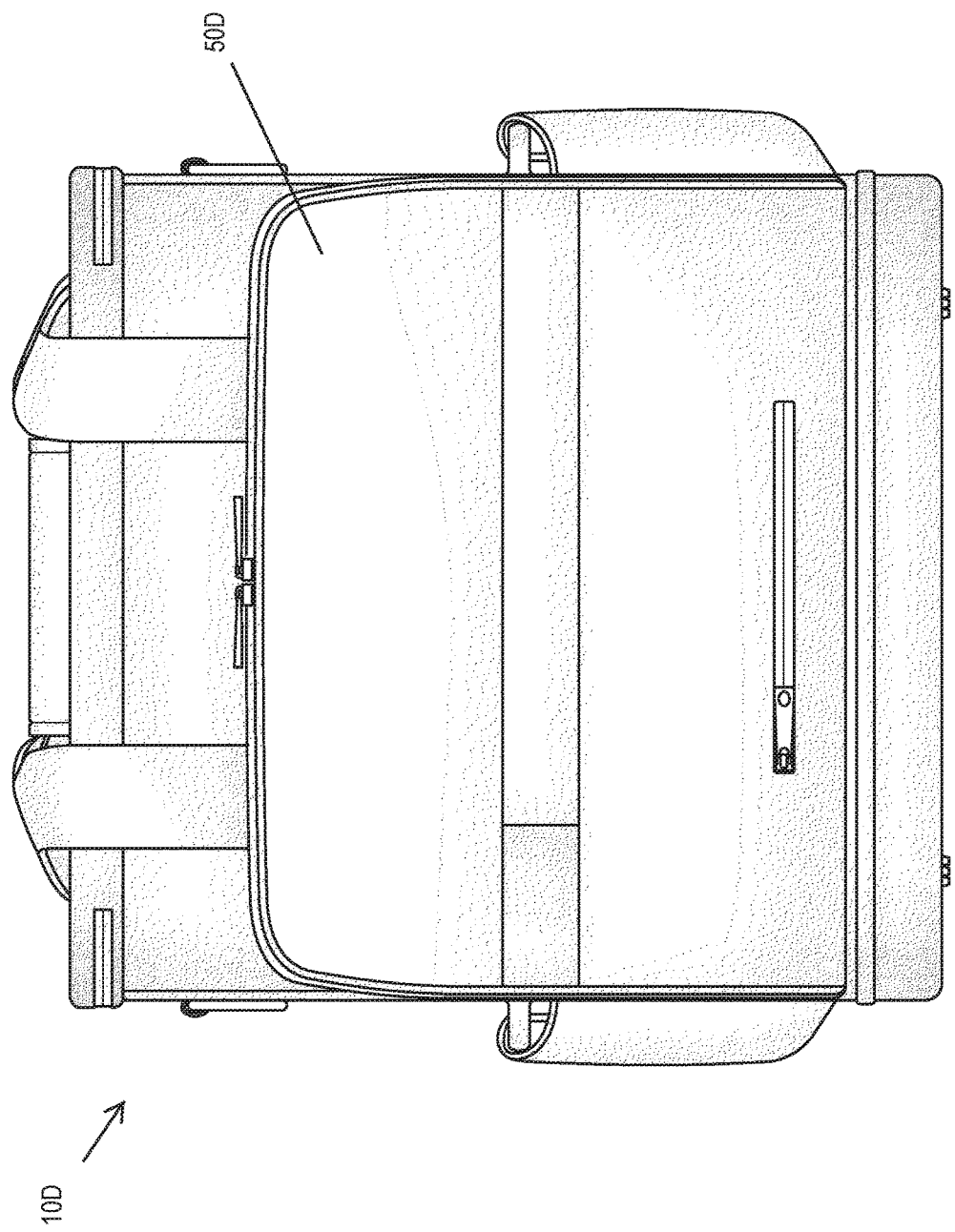
Figure 58:
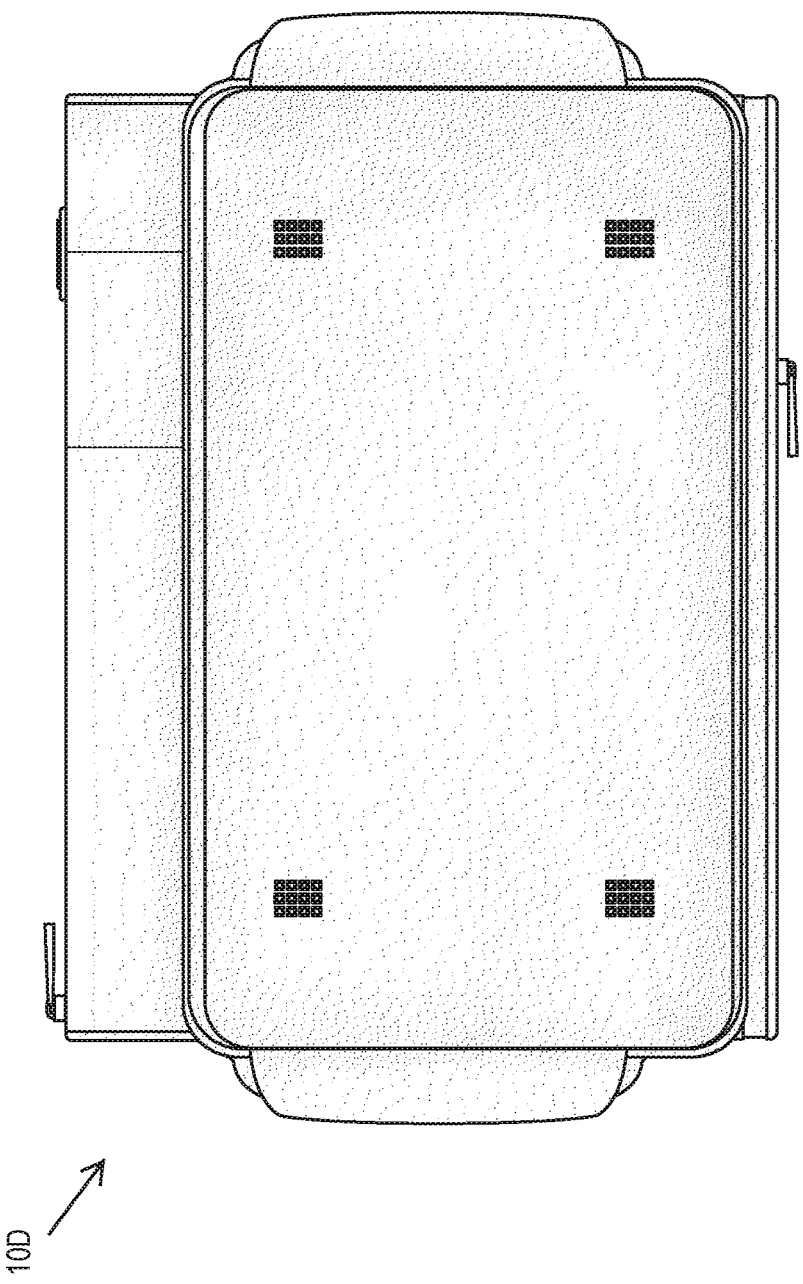
Figure 63:
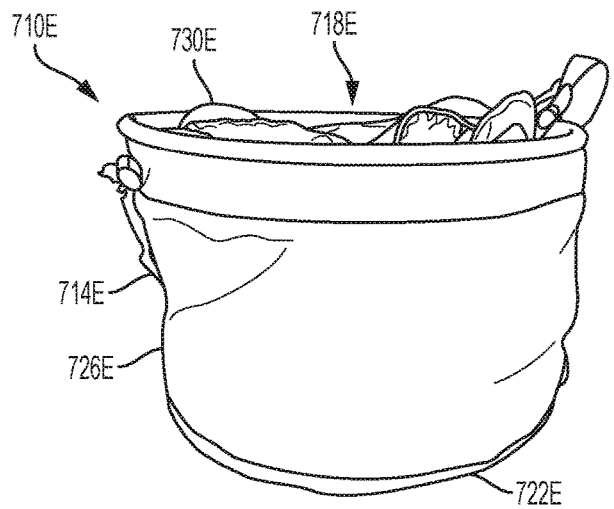
FIG. 63-73 are views of an alternative construction of a tool storage device, such as a parachute tool bag.
Figure 65:
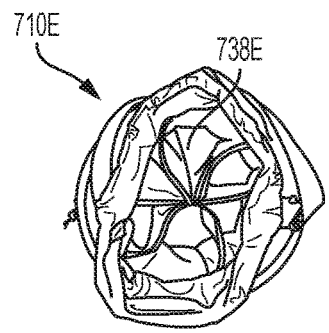

Referring to FIG. 42, the bag 10 includes a plurality of metal rings 90 secured to its exterior. The rings 90 can be used to attach a shoulder strap 94 to the bag 10, to hang the bag 10, or to attach other items to the bag 10 (e.g., ID tags, keys, lanyards, carabiners, etc.). In addition, the shoulder strap 94 may be attached to the metal ring 90 and to one of the handles 42 and configured such that the bag 10 may be worn like a backpack, as shown in FIG. 51.

FIGS. 48-58 illustrate another embodiment of a tool storage device, such as a portable tool bag 10D, similar to the bag 10. Common components have the same reference numbers with the letter "D".

FIGS. 59-62 illustrate a tool storage device, such as a portable tool bag 710, transportable between and around worksites (e.g., construction sites, garages, etc.) and capable of storing tools and accessories in an organized manner.

The tool bag 710 includes a generally cylindrical, soft-sided body 714 formed of a flexible fabric material and defining an interior storage space 718 therein (FIG. 60). The body 714 includes a bottom wall 722 and a side wall 726 extending from bottom wall 722 and terminating at an open upper end 730, providing access to the interior storage space 718. A central support 734 extends upwardly from the bottom wall 722 of the body 714. The illustrated storage space 718 is divided into number of (e.g., six) sections 738 by flexible dividers 742. The dividers 742 extend radially outwardly from the central support 734 to the side wall 726. In the illustrated embodiment, an upper surface of the central support 734 includes labels or other indicia 746 to indicate the contents of each of the respective sections 738.

A handle 750 is affixed to and extends upward from the central support 734. The illustrated handle 750 is made of a fabric material, such as nylon, and includes a plastic, over-molded overlay 754 to facilitate grasping and carrying the bag 710. The handle 750 includes a buckle 758 on one side, allowing the handle 750 to be secured around a rail, other support, etc. to facilitate hanging the bag 710. For example, as illustrated in FIG. 62, the handle 750 may be used to hang the bag 710 from a rail 1004 of a lift machine 1000.

A cinch strap 762 is threaded through grommets 766 disposed about the open upper end 730 of the side wall 726 (FIG. 59). The cinch strap 762 allows the side wall 726 to be drawn in at the upper end 730 to narrow or close the open upper end 730. The bag 710 also includes a plurality of external pockets 770 located around the outer circumference of the side wall 726 to provide additional tool storage, bit storage, etc. In some embodiments, the bag 710 may have an overall diameter between about 9 inches and about 12 inches so that the bag 710 may fit snugly inside a standard 5-gallon bucket 774 (see FIG. 61).

FIGS. 63-73 illustrate another embodiment of a tool storage device, such as a portable tool bag 710E, similar to the bag 710. Common components have the same reference numbers with the letter "E", only differences between the two embodiments will be described in detail.

Figure 66:
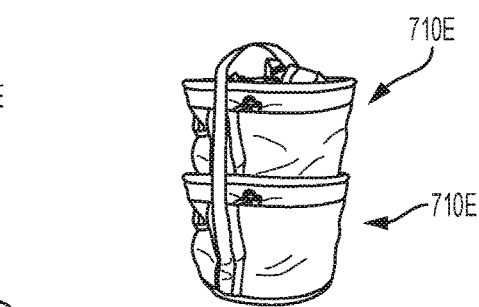
Figure 64:
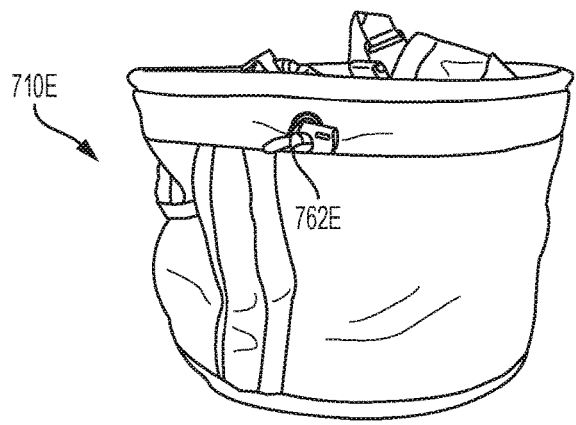
Figure 67:
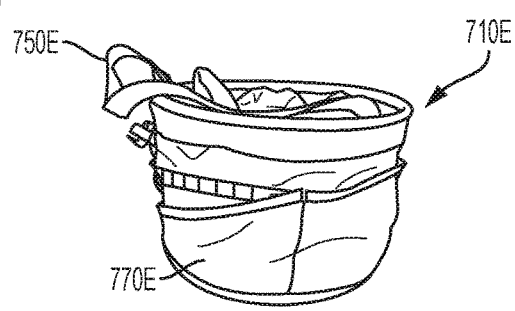
Figure 68:
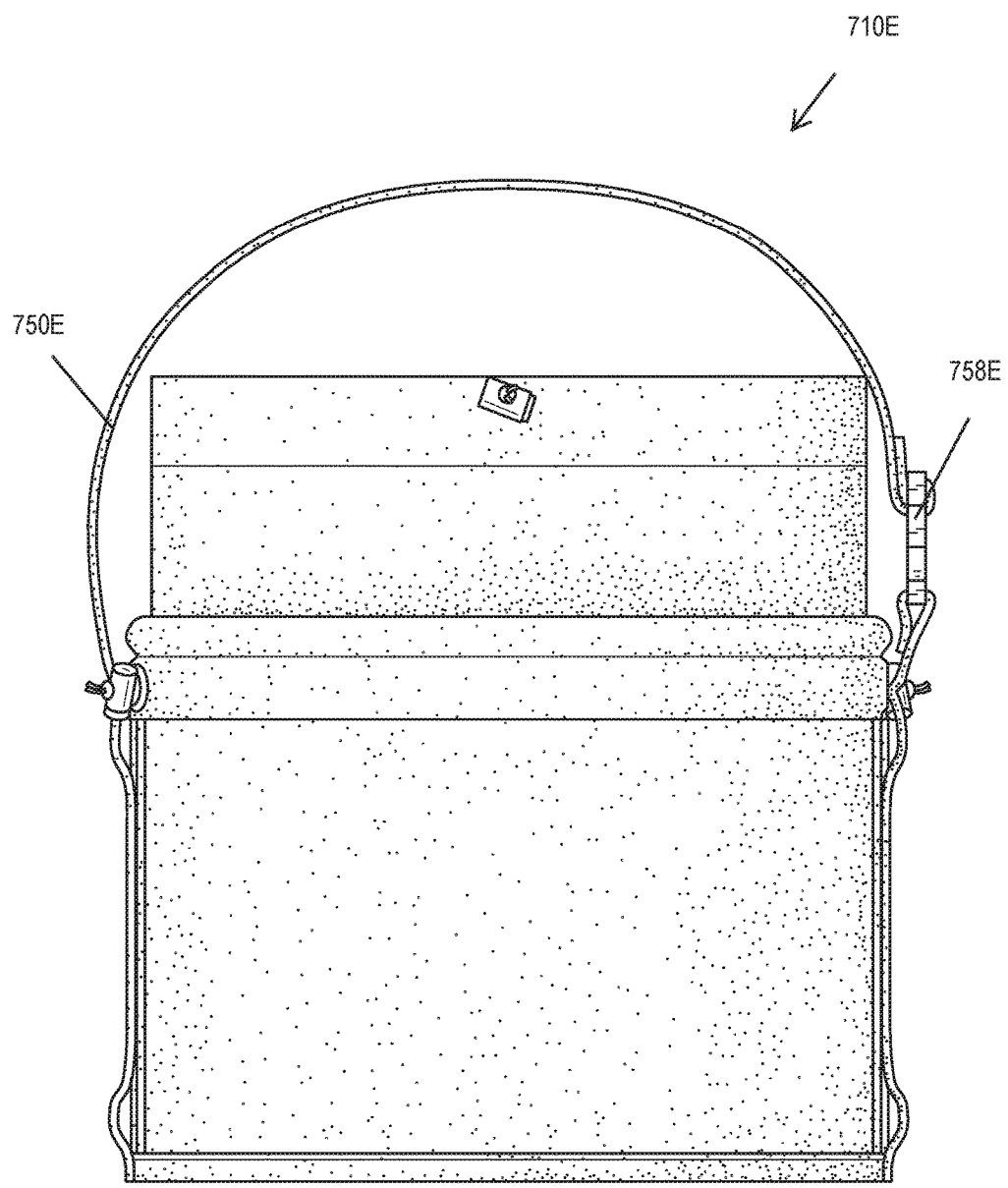
Figure 69:
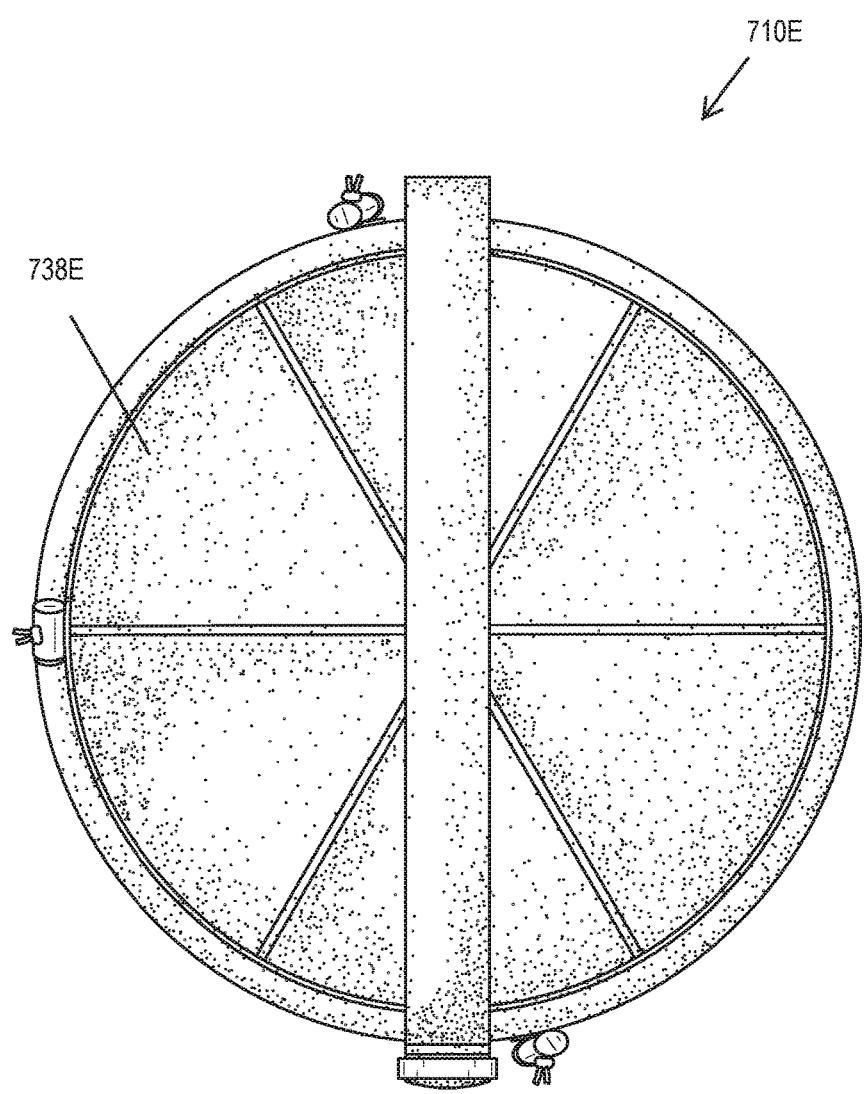
Figure 70:
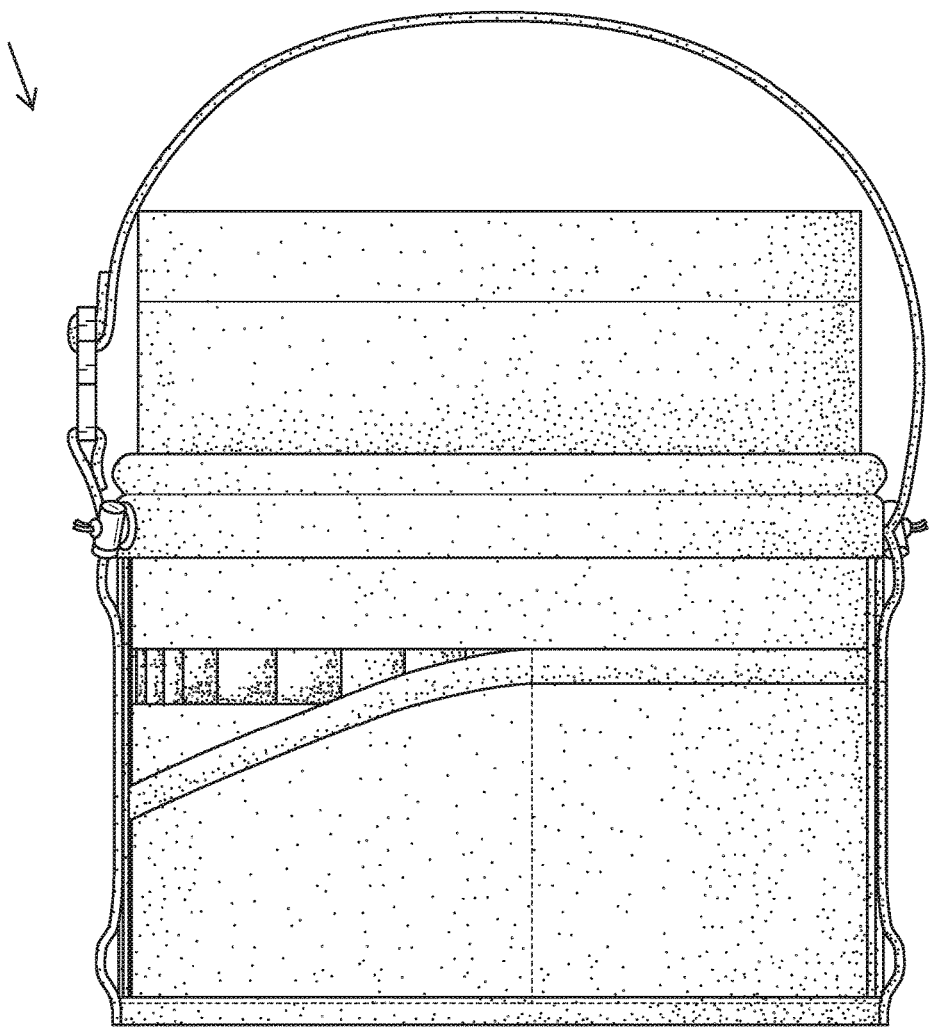
Figure 71:
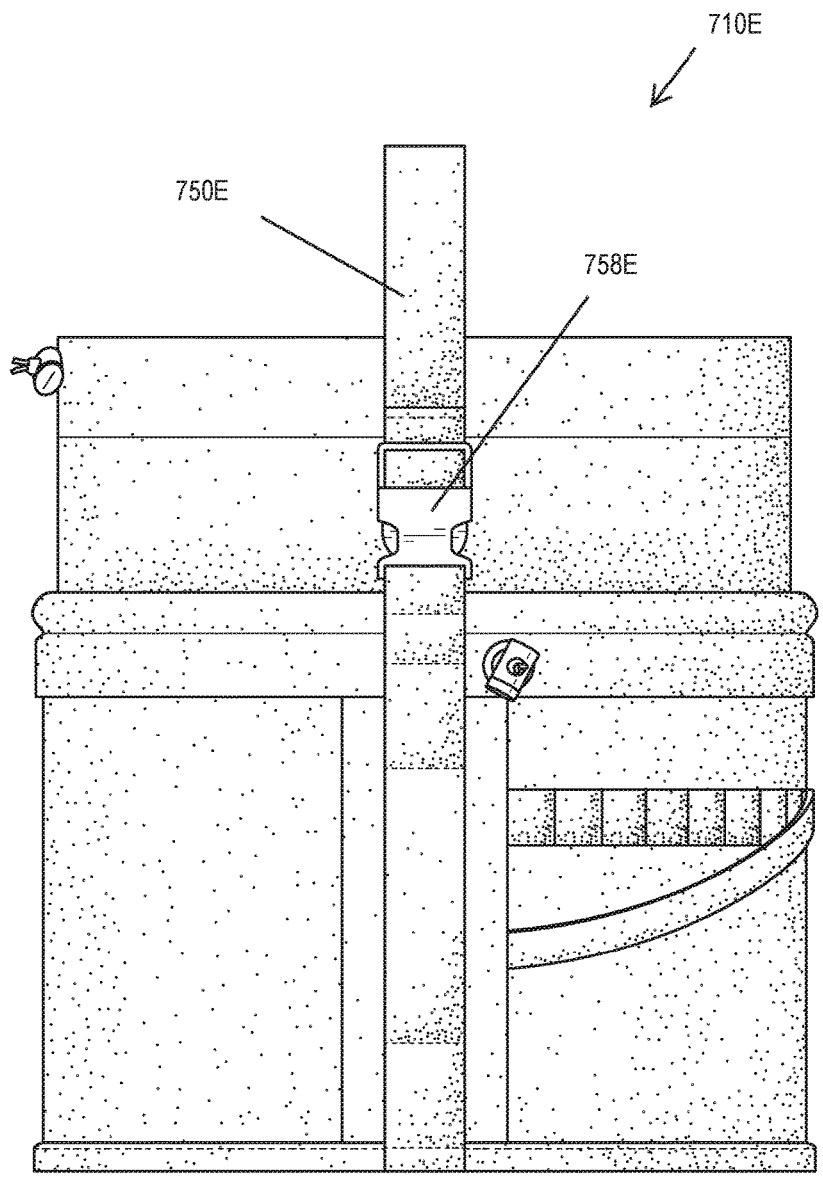
Figure 72:
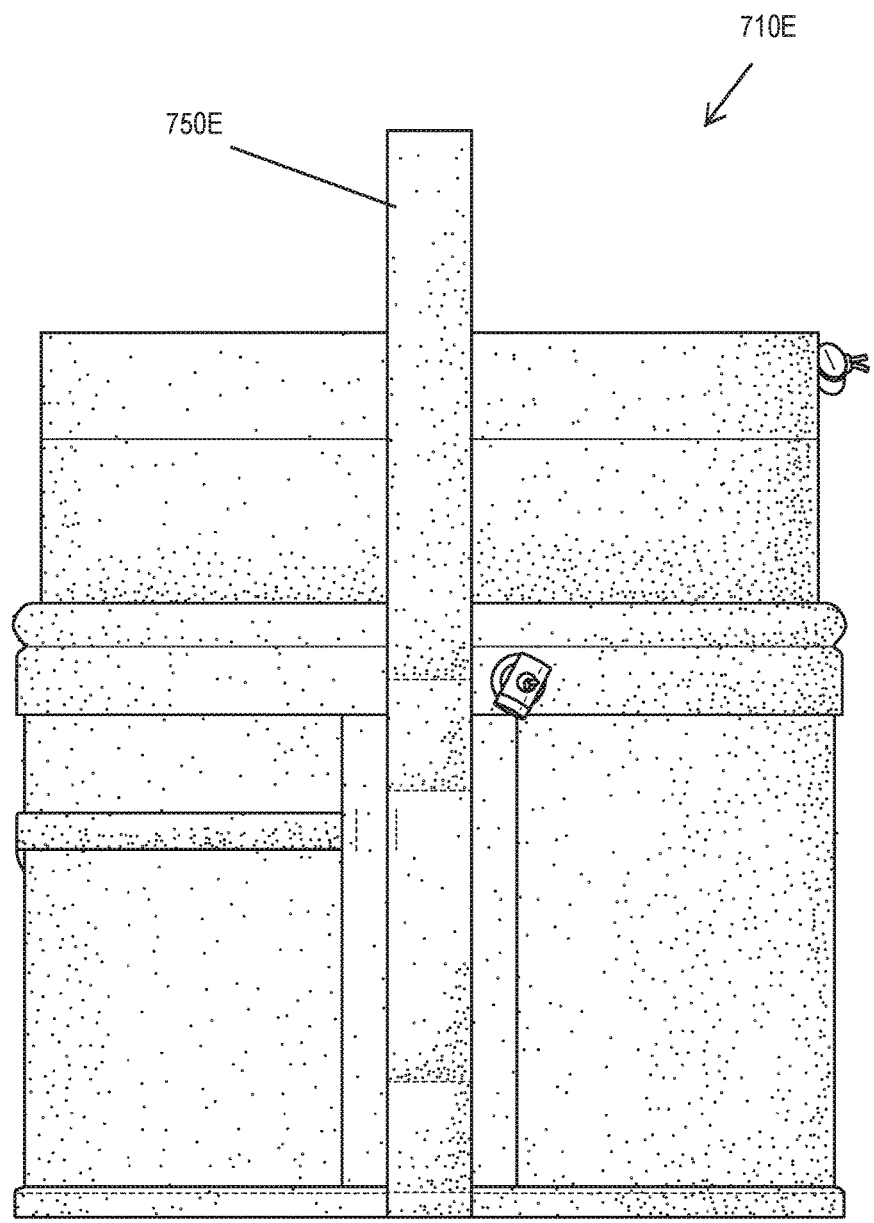
Figure 73:
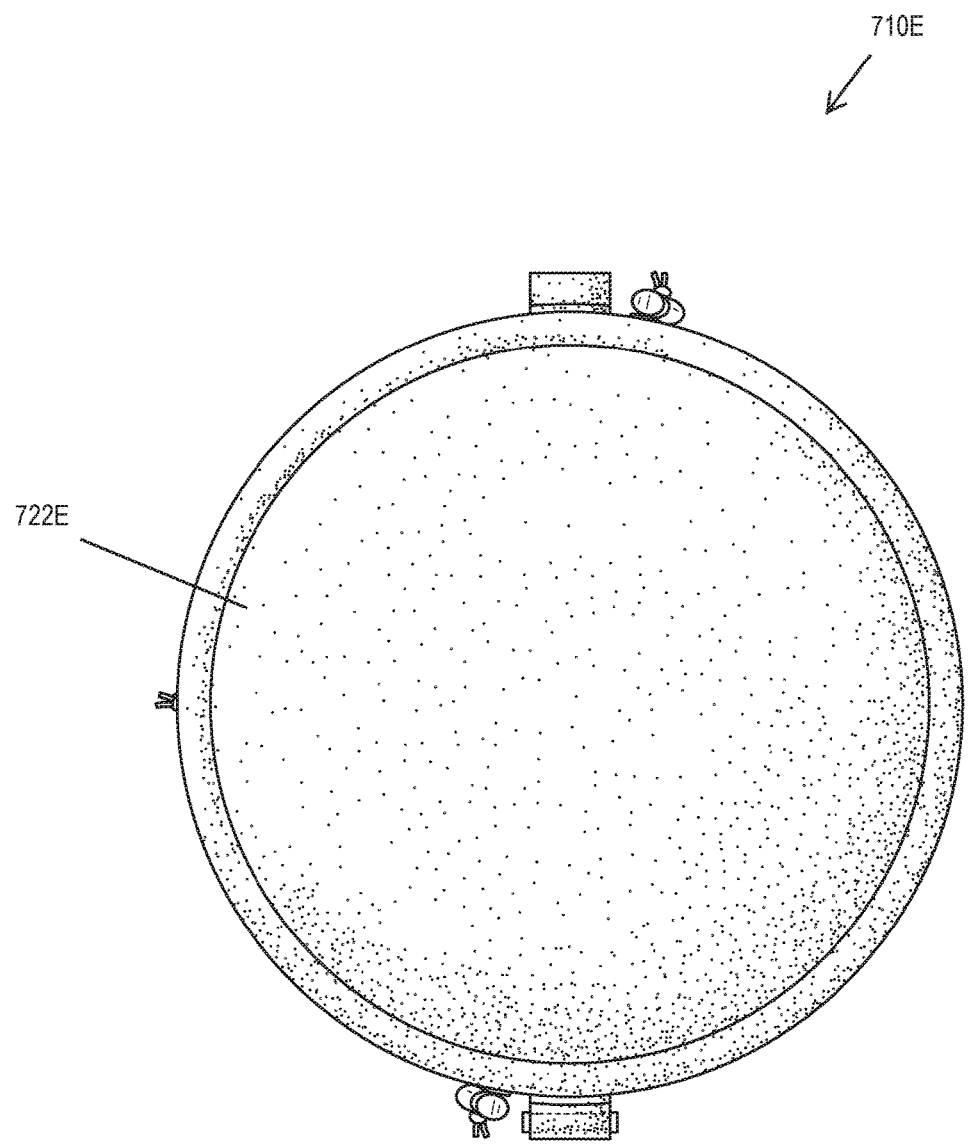

With reference to FIG. 68, the handle 750E is affixed to the side walls 726E adjacent the upper end 730E. As illustrated in FIG. 66, the bag 710E is configured such that multiple bags 710E may be stacked and the handles 750E, and hooks 758E may be used to link the bags 710E together.

FIG. 74-75 illustrates a tool storage device, such as a wearable garment illustrated in the form of a vest 110, capable of storing tools and accessories in an organized and easily-accessible manner. The vest 110 includes a front side 114 and a back side 118. In the illustrated embodiment, each of the sides 114, 118 includes reflective strips 122 to increase visibility of a user wearing the vest 110.

A plurality of pockets is integrated into the front side 114 of the vest 110. The plurality of pockets includes elongate pockets 126 suitable for storing writing utensils or barrel tools (e.g., screwdrivers), and a cellphone pocket 130 suitable for storing a cellular phone, PDA, music player, or other portable electronic device. The back side 118 of the vest 110 includes additional pockets 134 at a lower portion thereof. One or more of the pockets 126, 130, 134 can include an elastic material such that pockets 126, 130, 134 may stretch when items are inserted therein, helping to retain the items within the pockets 126, 130, 134.

Adjustable buckle straps 138 on the front side 114 of the vest 110 secure the vest 110 around a user's torso and permit size adjustments. The vest 110 further includes a handle 142 or hanging loop affixed to the back side 118. The illustrated handle 142 is made of a fabric material, such as nylon, stitched to the back side 118.

Figure 77:
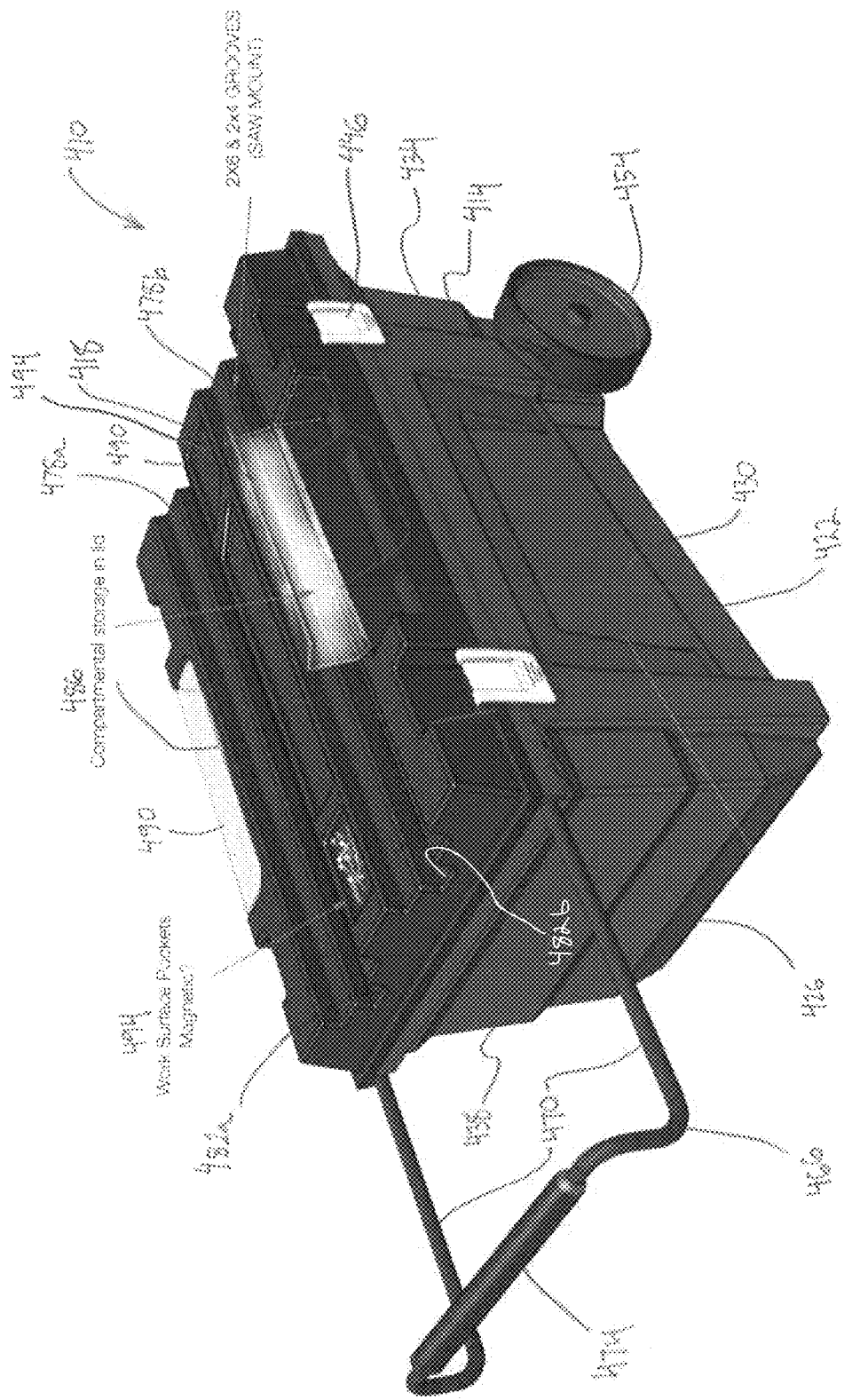
Figure 78:
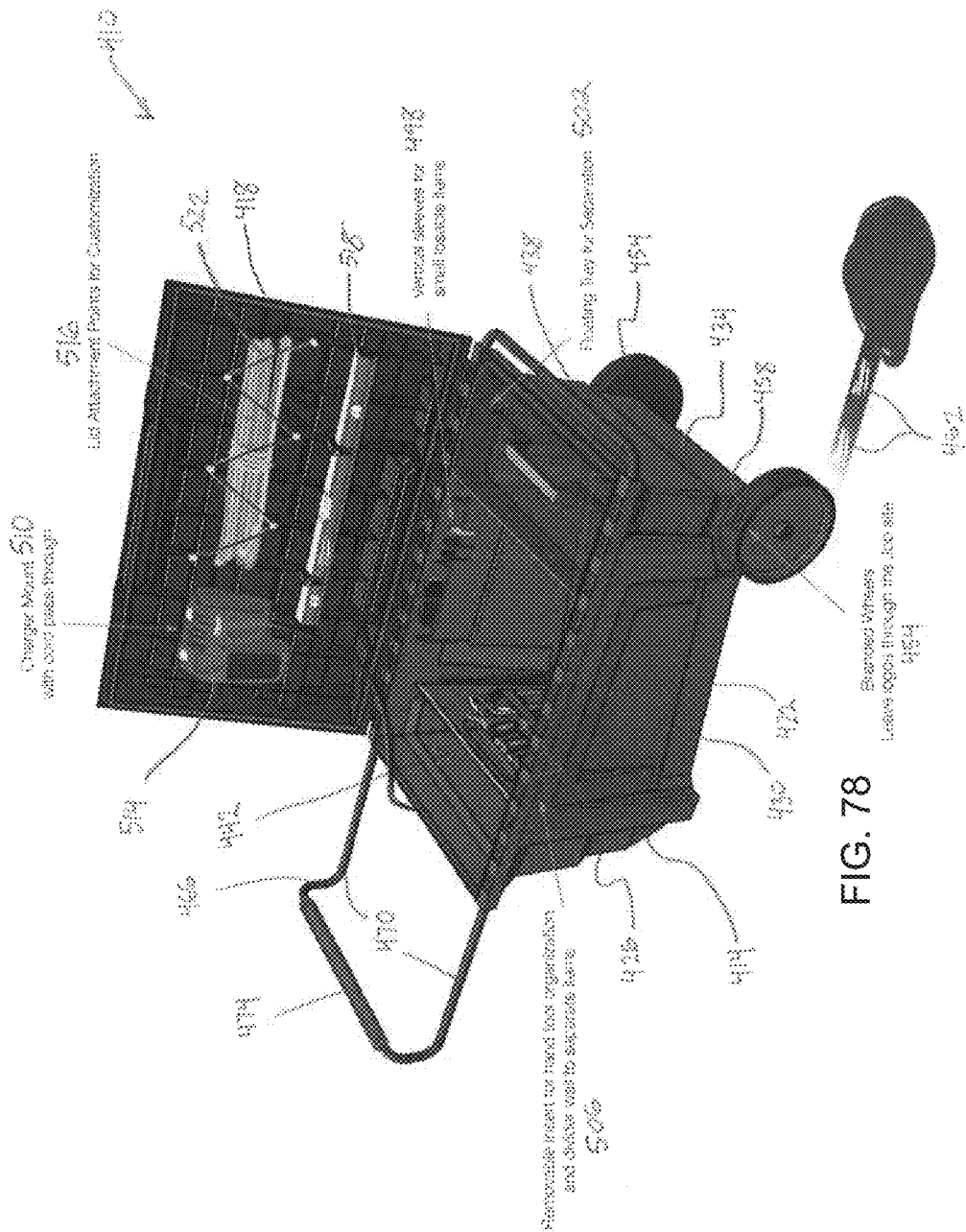
FIG. 78 is a perspective view of the tool storage device of FIG. 76 with a lid of the tool storage device in an open configuration.

FIGS. 76-78 illustrate a tool storage device, such as a generally rigid toolbox 410, transportable between and around worksites (e.g., construction sites, garages, etc.) and capable of storing tools and accessories in an organized manner.

The toolbox 410 includes a container 414 and a lid 418. The container 414, or base, includes a bottom wall 422 and four sidewalls 426, 430, 434, 438 extending generally perpendicularly from the bottom wall 422. The bottom wall 422 and the sidewalls 426, 430, 434, 438 together define a storage area 442 (FIG. 78) of the toolbox 410. The cover or lid 418 is pivotally coupled to the container 414 to open (FIG. 78) and close (FIGS. 76-77) the toolbox 410. A plurality of latches 446 selectively secures the lid 418 in the closed position. In the illustrated embodiment, the container 414 and the lid 418 are made of a rigid, molded plastic material but, in other constructions, may be made of other suitable materials, such as metal.

With reference to FIGS. 76-77, the illustrated toolbox 410 includes wheels 454 located proximate one end of the toolbox 410 to increase portability. In some embodiments, the wheels 454 may have a diameter between about 3 inches and about 12 inches. In the illustrated embodiment, the wheels have a diameter of about 8.5 inches. A buttressed axle (not shown) extends through at least a portion of the toolbox 410 to interconnect the wheels 454. The bottom wall 422 of the toolbox 410 is generally angled from a raised mounting location for the wheels 454 to a support portion for engaging the ground. The angled bottom wall 422 generally maximizes storage space and contributes to providing a flat upper surface on the toolbox 410.

Illustrated in FIG. 78, each of the wheels 454 may include raised and/or recessed indicia 458 (e.g., a company logo) located on its rolling surface. When rolled through a substance such as water, mud, dirt, and the like, the indicia 458 may retain the substance and redeposit the substance as the wheels continue rolling. Thus, an image or relief image 462 of the indicia 458 may be temporarily printed in the substance along the ground or floor.

The toolbox 410 also includes a telescoping handle 466 on the end opposite the wheels 454 to facilitate maneuvering the toolbox 410. The handle 466 is movable between a retracted position and an extended position (FIG. 76), and may be locked in place by a locking mechanism (not shown). The illustrated handle 466 is generally U-shaped, including a pair of spaced, parallel arms 470 and a gripping area 474 spanning between the arms 470. The gripping area 474 includes a padded and/or overmolded area to enhance user comfort.

Referring to FIG. 77, the lid 418 includes first and second parallel grooves 478a, 478b extending along the length of the lid 418, and third and fourth parallel grooves 482a, 482b extending along the length of the lid 418 within the first and second grooves 478a, 478b. In the illustrated embodiment, the first and second grooves 478a, 478b are about 6 inches wide, such that they may be used as guides to receive and facilitate cutting of 2×6 lumber (not shown). The third and fourth grooves 482a, 482b are about 2 inches wide, such that they may be used as guides to receive and facilitate cutting of 2×4 lumber (not shown). The lid 218 further includes a pair of storage compartments 486 for storing small items such as fasteners, bits, keys, etc. Each compartment 486 has a pivotally-connected cover 490 in order to retain the small items within the compartments 486. The illustrated covers 490 are substantially transparent to allow a user to see the small items within the compartments 486. The illustrated lid 418 also includes magnetic surface recesses 494 suitable for temporarily holding fasteners, bits, and other magnetic items for more convenient access.

FIG. 78 illustrates the toolbox 410 in an open position with a variety of tools stored within the container 414. The container 414 includes vertical sleeves 498 formed on an interior side of the sidewall 438. The sleeves 498 may be used to store paperwork, writing utensils, screwdrivers, wrenches, personal effects, and the like. The toolbox 410 also includes a removable storage tray 502 and a removable insert panel 506 positioned within the storage area 442 of the container 414. The storage tray 502 is supported on a lip of the container 414 near the uppermost portion of the storage area 442 (i.e., near the lid 418). The insert panel 506 is received within opposing grooves in the storage area 442 and includes a plurality of slots to receive tools and accessories, such as screwdrivers, pliers, wrenches, etc. The insert panel 506 also divides the storage area 442 into two sections in order to separate items within the storage area 442. The storage tray 502 and/or the insert panel 506 can be removed from the container 414 and repositioned within the container 414 in one or more other positions.

The lid 418 includes a mounting structure 510 for supporting a battery charger 514. The illustrated mounting structure 510 includes ribs extending from an inner surface of the lid 518. The ribs intersect at right angles to form a grid-like structure. Screw bosses (not shown) are formed at the intersections of some of the ribs. The screw bosses receive screws, or other fasteners, to mount the battery charger 514 to the lid 418. For example, the battery charger 514 may include two keyhole slots formed in a bottom surface and normally used to mount the battery charger 514 to a wall. The keyhole slots may engage two screws extending from the screw bosses of the lid 418 to mount the charger 514 to the lid 418. When mounted to the lid 418, the battery charger 514 moves (e.g., pivots) with the lid 418 relative to the container 414 but is still stored within the storage area 442 of the container 414 when the lid 418 is closed. The battery charger 514 can be removed from and repositioned on the lid 418, depending on the availability of other screw bosses.

The lid 418 may include additional internal mounting features 516 (e.g., hooks, projections, etc.) that facilitate storing additional items. For example, the illustrated lid 418 includes hooks to securely store a level 518, and a bungee grid to hold an extension cord 522.

In some embodiments, the toolbox 410 may a water-tight and, in such embodiments, may not include any ingress or egress holes. In addition, the container 414 and the lid 418 may be formed by a two-shot injection molding process to provide a relatively elastic material that creates a seal at an interface between the container 414 and the lid 418. Alternatively, the toolbox 410 may include an O-ring, gasket, or other elastomeric member located at the interface between the container 414 and the lid 418. In other embodiments, the toolbox 410 may not be water-tight such that water can flow out of the container 414 and air can circulate through the storage area 442.

FIGS. 79-83 illustrates a tool storage device, such as a generally rigid tool chest 610, transportable between and around worksites (e.g., construction sites, garages, etc.) and capable of storing tools and accessories in an organized manner.

The tool chest 610 includes a main container body 614 defining storage areas and having a front side 618, a back side 622, a top side 626, and a bottom side 630. A lid 634 pivotally coupled to an upper portion 636 of the container body 614 proximate the back side. A pair of cabinet doors 638 is pivotally coupled to a middle portion 642 of the container body 614 on the front side 618. A bin 646 is removably coupled to a bottom portion 650 of the container body 614 and is accessible via the front side 618. In the illustrated embodiment, the container body 614, the lid 634, the cabinet doors 638, and the bin 646 are made of rigid, molded plastic materials but, in other constructions, may be made of other suitable materials, such as metal.

The illustrated tool chest 610 includes wheels 654 located proximate the back side 622 of the tool chest 610 to increase portability. The wheels 654 may be connected to the body 614 by a split axle, or a single, buttressed axle may extend through at least a portion of the tool chest 610 to interconnect the wheels 654.

The tool chest 610 also includes a pivoting handle 658 on the back side 622 to facilitate maneuvering the tool chest 610. The handle 658 is generally U-shaped, having a pair of spaced, parallel arms 662 pivotally coupled to the body 614 and a transverse member 666 extending between the arms 662 and defining a gripping area 670 sized and shaped to receive one or both of a user's hands. The handle 658 is pivotable relative to the body 614 between a use position and a stowed position. The illustrated handle 614 is made of metal; however, in some embodiments, the handle 614 may be made of a rigid plastic or composite material. The gripping area 670 may include a padded and/or overmolded area (not shown) to enhance user comfort.

In some embodiments, the tool chest 610 may define an overall height, not including the handle 658, between about 24 inches and about 60 inches. In other embodiments, the overall height is between about 24 inches and about 48 inches. In the illustrated embodiment, the overall height is about 32 inches (FIG. 79).

Figures 79, 80, 81, 82, 83:
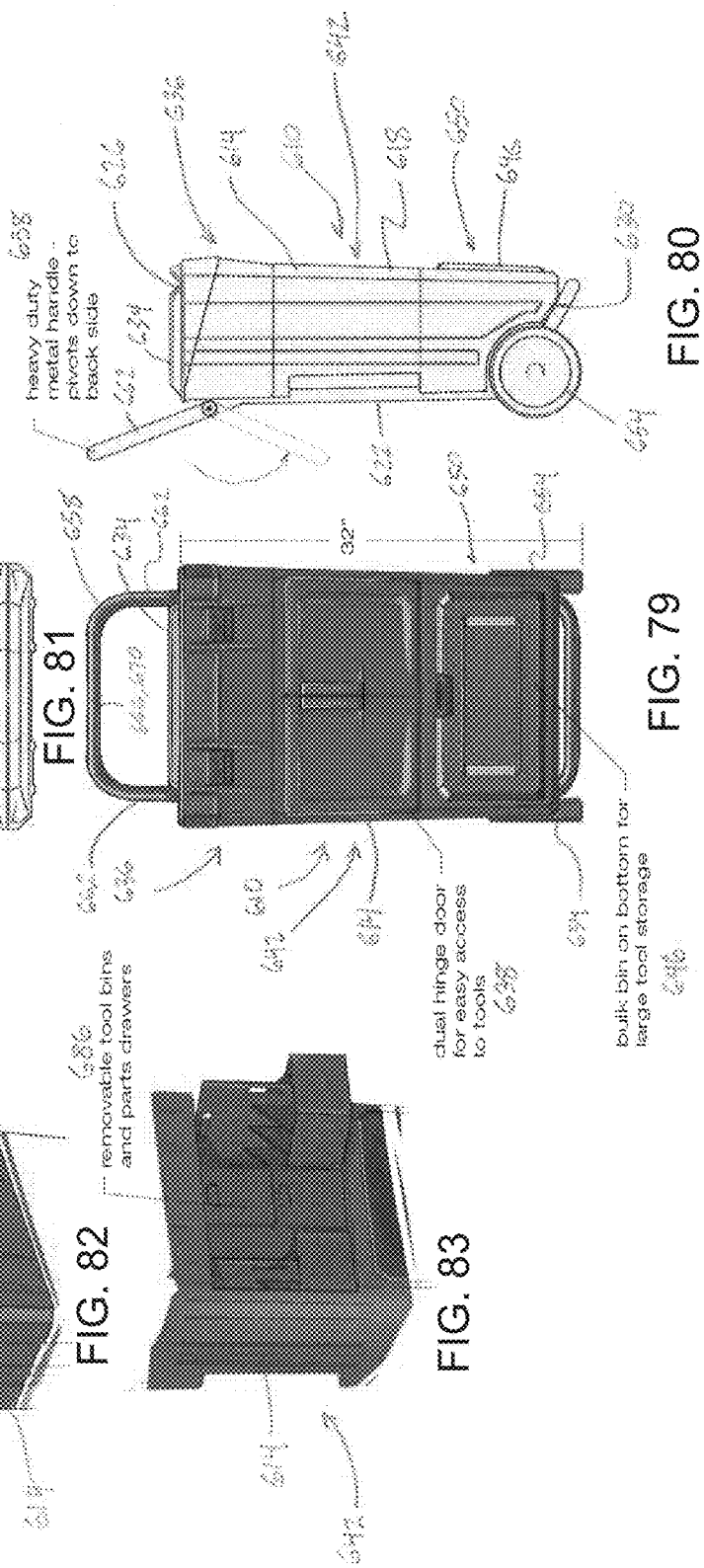
FIG. 79-81 are views of another tool storage device, such as a rolling work station.
FIG. 82 is a perspective of the tool storage device of FIG. 79 illustrating a removable parts tray.
FIG. 83 is a perspective view of the tool storage device of FIG. 79 illustrating removable tool bins and parts drawers.

Referring to FIG. 82, the upper portion 636 of the tool chest 610 includes plurality of vertical dividing walls 674 that form a grid. Tools and accessories may be stored in receptacles 678 defined between the dividing walls 674. A removable storage tray 682 is supported on the edges of the dividing walls 674. Now referring to FIG. 83, the middle portion 642 of the tool chest 610 includes a variety of removable organizers and drawers 686 for storing and organizing tools and other items. The bottom portion 650 of the tool chest 610 slidably receives the bin 646, which may be particularly suited for storing large items, such as power tools. The storage tray 682, organizers and drawers 686, and the bin 646 can each be removed for convenient and portable use, allowing the tool chest 610 to serve as a modular workstation, as shown in FIGS. 82-83.

It should be understood that, except when mutually exclusive or physically incompatible, features of any of the above-described tool storage devices may be used with others of the tool storage devices. Although the invention has been described in detail with reference to certain preferred embodiments, variations and modifications exist within the scope and spirit of one or more independent aspects of the invention as described or illustrated.

One or more independent features and/or independent advantages of the invention may be set forth in the claims.

What is claimed is:

1. A tool storage device comprising:
   a body defining a storage compartment;
   wheels supporting the body for movement over ground, the wheels being rotatable about an axis;
   a telescoping handle assembly including
      a handle portion engageable by a user to pull the storage device in a direction transverse to the axis, the handle portion having opposite ends,
      a first support arm connected between the body and one end of the handle portion, and
      a second support arm connected between the body and an opposite end of the handle portion, each of the first support arm and the second support arm having a substantially rectangular cross section oriented with first walls extending transverse to the axis having a greater width than second walls extending parallel to the axis; and
   a cover formed of a rigid material operable to selectively open and close the storage compartment, the cover defining a first groove and a second groove, in an open position of the cover, the first groove receiving a portion of the first support arm, and the second groove receiving a portion of the second support arm, engagement of the first support arm in the first groove and the second support arm in the second groove releasably retaining the cover in the open position.

2. The storage device of claim 1, wherein a ratio of a width of the first walls to a width of the second walls is between about 1.5:1 and about 4:1.

3. The storage device of claim 2, wherein the ratio is about 1.6:1.

4. The storage device of claim 1, wherein a width of the first walls is at least about 50% greater than a width of the second walls.

5. The storage device of claim 4, wherein the width of the first walls is about 60% greater than the width of the second walls.

6. A tool storage device comprising:
   a body defining a storage compartment;
   wheels supporting the body for movement over ground, the wheels being rotatable about an axis;
   a telescoping handle assembly connected to the body and engageable by a user to pull the storage device in a direction transverse to the axis, the handle assembly including a handle portion engageable by a user to pull the storage device in a direction transverse to the axis, the handle portion having opposite ends, a first support arm connected between the body and one end of the handle portion, and a second support arm connected between the body and an opposite end of the handle portion;
   wherein the body has a body width in a direction parallel to the axis, and the handle has a handle width in a direction parallel to the axis, the handle width being at least about 50% of the body width; and
   a cover formed of a rigid material operable to selectively open and close the storage compartment, the cover defining a first groove and a second groove, in an open position of the cover, the first groove receiving a portion of the first support arm, and the second groove receiving a portion of the second support arm, engagement of the first support arm in the first groove and the second support arm in the second groove releasably retaining the cover in the open position.

7. The storage device of claim 6, wherein the handle width is about 50% of the body width.

8. The storage device of claim 6, wherein the body has opposite side walls cooperating to partially define the compartment, wherein the handle has opposite ends, and wherein the handle is positioned relative to the body with a distance in a direction of the axis between each handle end and a plane of an associated side wall of the body being no more than about 50% of the handle width.

9. The storage device of claim 8, wherein the distance is about 50% of the handle width.

10. The storage device of claim 6, wherein the body has opposite side walls cooperating to partially define the compartment, wherein the handle has opposite ends, and wherein the handle is positioned relative to the body with a distance in a direction of the axis between each handle end and a plane of an associated side wall of the body being no more than about 7 inches.

11. The storage device of claim 10, wherein the distance is about 6.25 inches.

12. A tool storage device comprising:
   a body defining a storage compartment, the body having a front, a rear, opposite sides, a top and a bottom, the body including
      a frame assembly formed of a rigid material,
      a wall formed of a flexible material and at least partially defining the storage compartment with a top opening, the wall of flexible material providing the front, the rear, the opposite sides, and the bottom of the body, and
      a cover formed of a rigid material connected to the frame assembly and operable to selectively close the top opening, the cover providing the top of the body;
   wheels supporting the body for movement over ground; and
   a handle connected to the body and engageable by a user to pull the storage device, and
   wherein the frame assembly includes a main frame portion connected to and pivotally supporting the cover, the main frame portion being connected to and providing support to the wall, and an axle support connected to the main frame portion and to the wall, the axle support supporting the axle; and
   further comprising a handle assembly including the handle, a first support arm connected between the body and one end of the handle, and a second support arm connected between the body and an opposite end of the handle, and wherein the frame assembly further includes a first support arm receiving portion operable to receive the first support arm and a second support arm receiving portion operable to receive the second support arm, each of the first support arm receiving portion and the second support arm receiving portion being connected to the main frame portion and being connected to and providing support to the wall, the axle support being connected between the first support arm receiving portion and the second support arm receiving portion, and wherein the cover defines a first groove and a second groove, and wherein, in an open position of the cover, the first groove receives a portion of the first support arm, and the second groove receives a portion of the second support arm, engagement of the first support arm in the first groove and the second support arm in the second groove releasably retaining the cover in the open position.

13. The storage device of claim 12, wherein the frame assembly and the cover include inter-engaging hinge portions to pivotally support the cover on the frame assembly for movement between the open position and a closed position, and inter-engaging stop surfaces engageable in the closed position of the cover to inhibit further movement of the cover beyond the closed position, the stop surfaces being positioned proximate the hinge portions.

14. The storage device of claim 12, wherein a wheel is supported proximate each opposite side, each wheel being rotatable about an axis and having a circumference and an axial width, wherein the storage device further comprises a rigid axle pivotally supporting both wheels, and wherein the frame assembly further includes a wheel well portion operable to receive each wheel, each wheel well portion defining an opening receiving the axle, each wheel well portion covering the width of the wheel and a portion of the circumference of the wheel, a radial clearance between the wheel and a lower end of the wheel well portion being no more than about 0.25 inches, each wheel well portion being connected to the wall.

15. The storage device of claim 12, wherein the frame assembly further includes a bottom support portion connected to and providing support to the wall, the bottom support portion being connected to the support arm receiving portions, the bottom support portion being engageable with the ground in an upright position of the storage device.

16. A tool storage device comprising:
a body defining a storage compartment
wheels supporting the body for movement over ground, each wheel being rotatable about an axis and having a circumference and an axial width;
a wheel well portion operable to receive each wheel, each wheel well portion covering the width of the wheel and a portion of the circumference of the wheel, a radial clearance between the wheel and a lower end of the wheel well portion being no more than about 0.5 inches, each wheel well portion being connected to the body; and
a handle connected to the body and engageable by a user to pull the storage device, and
wherein a radial clearance between the wheel and the wheel well increases from the lower end of the wheel well portion to an upper end of the wheel well portion.

17. The storage device of claim 16, wherein the radial clearance between the wheel and the lower end of the wheel well portion is about 0.25 inches.

18. The storage device of claim 16, wherein a radial clearance between the wheel and the upper end of the wheel well portion is no more than about 1 inch.

19. The storage device of claim 16, wherein each wheel well portion covers a portion of the circumference of the wheel over an arc of at least about 90°.

20. The storage device of claim 16, wherein the storage device is pivotable about the axis between an upright position and a tilted, travel position, wherein, in the upright position, the lower end of each wheel well portion extends at least about 10° below the axis.

21. The storage device of claim 16, wherein the body has opposite sides, wherein a wheel is supported proximate each opposite side, wherein the storage device further comprises a rigid axle pivotally supporting both wheels, and wherein each wheel well portion defines an opening receiving the axle.

* * * * *